United States Patent
Trépanier et al.

(10) Patent No.: US 11,600,166 B1
(45) Date of Patent: Mar. 7, 2023

(54) OCCURRENCE-RECORD DRIVEN MONITORING SYSTEM AND METHOD OF USE THEREOF

(71) Applicant: GENETEC INC., Montréal (CA)

(72) Inventors: Jean-David Trépanier, St-Hubert (CA); Sean Lawlor, Dollard-des-Ormeaux (CA)

(*) Notice: Subject to any disclaimer, the term of this patent is extended or adjusted under 35 U.S.C. 154(b) by 0 days.

(21) Appl. No.: 17/514,355

(22) Filed: Oct. 29, 2021

Related U.S. Application Data

(60) Provisional application No. 63/272,619, filed on Oct. 27, 2021.

(51) Int. Cl.
| | |
|---|---|
| G06T 7/292 | (2017.01) |
| G08B 25/00 | (2006.01) |
| G06V 20/40 | (2022.01) |
| G06V 20/62 | (2022.01) |

(52) U.S. Cl.
CPC ........... G08B 25/006 (2013.01); G06V 20/40 (2022.01); G06V 20/62 (2022.01); G06V 20/44 (2022.01); G06V 20/625 (2022.01)

(58) Field of Classification Search
CPC ...... G08B 25/006; G06V 20/40; G06V 20/62; G06V 20/44; G06V 20/625
See application file for complete search history.

(56) References Cited

U.S. PATENT DOCUMENTS

| | | |
|---|---|---|
| 6,529,136 B2 | 3/2003 | Cao et al. |
| 7,015,817 B2 | 3/2006 | Copley et al. |
| 7,579,965 B2 | 8/2009 | Bucholz |
| 8,781,169 B2 | 7/2014 | Jackson et al. |
| 8,878,681 B2 | 11/2014 | Gehrke et al. |
| 8,924,872 B1 | 12/2014 | Bogomolov et al. |
| 8,937,559 B2 | 1/2015 | Ioli |
| 9,715,668 B1 | 7/2017 | Brandt et al. |
| 9,852,606 B1 | 12/2017 | Heier et al. |
| 10,126,740 B2 | 11/2018 | Jackson et al. |
| 10,514,837 B1 | 12/2019 | Li et al. |
| 10,796,567 B1 * | 10/2020 | Tang ................. G08G 1/207 |
| 2004/0034666 A1 | 2/2004 | Chen |

(Continued)

FOREIGN PATENT DOCUMENTS

| | | |
|---|---|---|
| CN | 103366579 A | 10/2013 |
| CN | 110889964 A | 3/2020 |
| GB | 2536153 A | 9/2016 |

OTHER PUBLICATIONS

Hargrove, Stephanie R. "Commerical Vehicle Enforcement using License Plate Recognition Technology." (2007). Master Theses, University of Tennessee—Knoxville.

(Continued)

*Primary Examiner* — An T Nguyen

(57) ABSTRACT

Systems and methods for monitoring event through the use of occurrence records in order to take one or more actions are described herein. An occurrence record is received and processed. The occurrence record includes one or more parameters and are indicative of an event of a given type. The received occurrence record is compared to one or more trigger-based rules. When a trigger condition of a trigger-based rule is met, the trigger-based rule is executed. When one or more other conditions of the executed trigger-based rule is met, a command for an action is generated.

22 Claims, 33 Drawing Sheets

(56) References Cited

U.S. PATENT DOCUMENTS

| | | |
|---|---|---|
| 2014/0169634 A1* | 6/2014 | Prakash .................. H04N 5/44 |
| | | 382/105 |
| 2016/0098610 A1 | 4/2016 | Prakash et al. |
| 2017/0131115 A1 | 5/2017 | Park |
| 2017/0223314 A1 | 8/2017 | Collings, III |
| 2018/0003513 A1 | 1/2018 | Guzik et al. |
| 2018/0011670 A1 | 1/2018 | Oyenan et al. |
| 2018/0082202 A1 | 3/2018 | Vepakomma |
| 2018/0210892 A1 | 7/2018 | Stayner et al. |
| 2018/0253617 A1 | 9/2018 | Tsai et al. |
| 2019/0050473 A1 | 2/2019 | Bhattacharya et al. |
| 2019/0164246 A1 | 5/2019 | Ferranti et al. |
| 2019/0347353 A1 | 11/2019 | Lawlor et al. |
| 2019/0347809 A1* | 11/2019 | Sato ....................... G06V 20/00 |
| 2020/0134947 A1 | 4/2020 | Costello et al. |

OTHER PUBLICATIONS

Eman Mohamed Abd El-Aziz, et al., "GIS-based decision support system for criminal tracking." In 2012 22nd International Conference on Computer Theory and Applications (ICCTA), pp. 30-34. IEEE, 2012. (Year: 2012).

* cited by examiner

OCCURRENCE-RECORD DRIVEN MONITORING SYSTEM AND METHOD OF USE THEREOF

The present application claims priority from U.S. provisional patent application No. 63/272,619, filed on Oct. 27, 2021, incorporated herein by reference.

TECHNICAL FIELD

The present disclosure relates to event monitoring systems, and more particularly to trigger-based event monitoring systems.

BACKGROUND

To improve safety within a city or other jurisdiction, information about events relating to criminal activity may be gathered and stored by a relevant authority. For instance, security cameras and licence plate readers may be used to collect information about traffic violations. Another example is collecting information about the nature and timing of 911 calls, recorded gunshot sounds, or the like, in a database or via a computer-aided dispatch system. Still another example involves compiling information about the location and identity of known or suspected criminals. The information may be gathered from disparate sources, in differing formats, and may also be stored in separate repositories.

It may be desirable to analyze the information to identify patterns of activity, to link events together, or to develop improved responses to different events. However, it may be difficult for operators to fully synthesize the breadth of information gathered to draw appropriate conclusions. For instance, similar types of events may occur at disparate times, at disparate locations, or with different precursor events, leading to a difficulty in grasping any potential link therebetween. Additionally, given the quantity of data to analyze, identifying patterns of activity within the noise of all gathered information may result in certain patterns being overlooked, and thus with a failure to implement certain established procedures responsive to the patterns, had they been appropriately identified.

Therefore, approaches for addressing the above shortcomings may be desirable.

SUMMARY

The present disclosure relates to a monitoring system that harnesses, and may correlate, information received from one or more external data sources to respond to events that can be indicative of a surveillance issue in a given region. The incoming data to and from the data sources in the form of occurrence records may be correlated and applied to a trigger-based rule that is set to identify a culmination of events or indicators indicative of, e.g., suspicious activity that warrants further investigation. In response, further investigation may be prompted by causing an action, e.g., on one or more computing devices, e.g., of certain authorities (e.g. police officers, private security companies, ambulance drivers, hospital personnel, etc.) These actions may be in the form of an alert (e.g. a text message, an audio alert, etc.) provided on the one or more computing devices, as described herein.

A broad aspect is a method of alerting one or more portable computing devices of a presence of a nearby target vehicle by a monitoring system. The method includes receiving an occurrence record indicative of a license plate read event by a camera, the occurrence record including a geographic parameter corresponding to a location of the camera and a licence plate number of the license plate read event; determining that the licence plate number corresponds to a target licence plate number of a plurality of target license plate numbers corresponding to a plurality of target vehicles; searching for one or more portable computing devices that are within a pre-determined perimeter of the location of the camera and retrieving one or more identifiers corresponding to, respectively, each of one or more portable computing device that is identified within the pre-determined perimeter of the location of the camera; and transmitting a notification to each of the one or more portable computing devices corresponding to each of the one or more identifiers, the notification including the licence plate number, the notification is for a letting a recipient of the notification of a possible presence of the target vehicle in a vicinity of the recipient.

In some embodiments, each of the one or more portable computing devices may be configured for running an application associated with the monitoring system; and wherein transmitting the notification to each of the one or more portable computing devices may include transmitting the notification to each of the one or more portable computing devices through the application of each of the one or more portable computing devices.

In some embodiments, determining that the license plate number corresponds to the target license plate number may comprise comparing the occurrence record to a trigger-based rule comprising a trigger condition, wherein the trigger condition may be met by the occurrence record when the occurrence record corresponds to a licence plate recognition event.

In some embodiments, comparing the first occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the licence plate number may correspond to the target licence plate number when the licence plate number is similar to the target licence plate number.

In some embodiments, the licence plate number may correspond to the target licence plate number when the licence plate number is identical to the target licence plate number.

In some embodiments, the perimeter may correspond to a radius from the location of the camera positioned in a center of a circle having the radius.

In some embodiments, the perimeter may correspond to a geographic range set by an operator by defining an area on a map appearing on a graphical user interface.

In some embodiments, the method may include receiving geolocation data from a plurality of mobile computing devices; and wherein searching for the one or more portable computing devices may comprise identifying, from the plurality of mobile devices, the one or more computing devices within the pre-determined perimeter of the location of the camera based on the geolocation data.

In some embodiments, the notification further may comprise at least one of: a license plate image of the license plate, a context image of a vehicle with the license plate, a make of the vehicle, a model of the vehicle, a year of the vehicle, a vehicle colour and a vehicle speed.

In some embodiments, the method may include, prior to the receiving, analyzing an image obtained from the camera to identify the licence plate number, and generating the occurrence record.

In some embodiments, the camera may be a licence plate recognition (LPR) camera.

In some embodiments, the one or more portable computing devices may include computing devices that are integrated or attached to a patrol vehicle.

Another broad aspect is a non-transitory computer-readable medium having stored thereon program instructions for alerting one or more portable computing devices of a presence of an event of interest, the program instructions executable by a processing unit for receiving an occurrence record indicative of a first event captured by a source device, the occurrence record including a geographic parameter corresponding to a location of the source device; determining that the first event corresponds to an event of interest; searching for at least one portable computing device that is within a pre-determined perimeter of the location of the source device and retrieving one or more identifiers corresponding to, respectively, each of one or more portable computing devices that are identified within the pre-determined perimeter of the location of the source device; and transmitting a notification to each of the one or more portable computing devices corresponding to each of the one or more identifiers.

Another broad aspect is a method of generating an alert for a security event associated with one or more geographic areas of interest by a monitoring system. The method includes receiving a first occurrence record indicative of a computer-aided dispatch (CAD) call event, the first occurrence record including a first geographic parameter of the event, a first time parameter of the event, and a first priority parameter of the event; comparing the first occurrence record to a trigger-based rule comprising a trigger condition, wherein the trigger condition is met by the first occurrence record when the first priority parameter of the first occurrence record corresponds to a pre-defined priority level set by the trigger-based rule; generating at least one query according to one or more query conditions of the trigger-based rule, the at least one query including a temporal range, a geographic range defining one or more geographic areas of interest, and a priority value corresponding to the pre-defined priority level; receiving, in response to the at least one query, at least two occurrence records from one or more data sources, each occurrence record of the at least two occurrence records including a geographic parameter corresponding to a location within the geographic range, a time parameter within the temporal range and a priority parameter matching the priority value; and generating an alert indicative of a possible emergency incident in the one or more geographic areas of interest based on the at least two occurrence records received from the one or more data sources.

In some embodiments, the first occurrence record may be received from a first data source storing a plurality of occurrence records for CAD call events, the plurality of records for CAD call events including the first occurrence record; and wherein the one or more data sources include the first data source.

In some embodiments, the comparing the first occurrence record to the trigger-based rule may comprise comparing the first occurrence record to a plurality of trigger-based rules comprising the trigger-based rule, each trigger-based rule of the plurality of trigger-based rules comprising a respective trigger condition.

In some embodiments, the temporal range may be defined from the first time parameter of the first occurrence record.

In some embodiments, the temporal range may be defined from a current time.

In some embodiments, the first occurrence record may include an audio file for the CAD call event.

In some embodiments, the first occurrence record may include a string of characters that is a transcript for the CAD call event.

In some embodiments, the one or more geographic areas of interest may correspond to one or more airports.

In some embodiments, the pre-defined priority level may be a highest priority level of a set of priority levels that can be assigned to CAD calls.

In some embodiments, the alert may include a message that is sent to one or more computing devices.

Another broad aspect is a non-transitory computer-readable medium having stored thereon program instructions for generating an alert for a security event associated with one or more geographic areas of interest, the program instructions executable by a processing unit for receiving a first occurrence record indicative of an event, the first occurrence record including a first geographic parameter of the event, a first time parameter of the event, and a first priority parameter of the event; comparing the first occurrence record to a trigger-based rule comprising a trigger condition, the trigger condition is met by the first occurrence record when the first priority parameter of the first occurrence record corresponds to a pre-defined priority level set by the trigger-based rule; generating at least one query according to one or more query conditions of the trigger-based rule, the at least one query including a temporal range, a geographic range defining one or more geographic areas of interest, and a priority value corresponding to the pre-defined priority level; receiving, in response to the at least one query, at least two occurrence records from one or more data sources, each occurrence record of the at least two occurrence records including a geographic parameter corresponding to a location within the geographic range, a time parameter within the temporal range and a priority parameter matching the priority value; and generating an alert indicative of a possible emergency incident in the one or more geographic areas of interest based on the at least two occurrence records received from the one or more data sources.

Another broad aspect is a method of generating an alert for a danger located in proximity to a location of interest using a monitoring system. The method includes receiving an occurrence record indicative of an event, wherein the occurrence record includes a first geographic parameter of the event; comparing the first occurrence record to a trigger-based rule comprising a trigger condition, the trigger condition is met by the occurrence record when the event corresponds to a gunshot event; generating at least one query according to one or more query conditions of the trigger-based rule, the at least one query including a geographic range from the first geographic parameter of the occurrence record; determining, in response to the at least one query, that at least one location record of a plurality of location records of at least one data source is indicative of the location of interest, the at least one location record comprising an identifier of the location of interest and a geographic parameter that is contained within the geographic range of the query; and generating an alert indicating a possible danger associated with the location of interest of the at least one location record.

In some embodiments, determining that the at least one location record is indicative of the location of interest may comprise receiving, in response to the at least one query, the at least one location record indicative of the location of interest from the at least one data source.

In some embodiments, the occurrence record may be received from a first data source; and wherein the at least one data source is different from the first data source.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the event of the occurrence record may be the gunshot event, the gunshot event being identified by a microphone-based gunshot detector.

In some embodiments, the at least one query may include at least one location type; and wherein the at least one location record is indicative of the location of interest corresponding to one of the at least one location type.

In some embodiments, the at least one location type may be one or more of a hospital and a school.

In some embodiments, the at least one data source that is queried may be set by the one or more query conditions of the trigger-based rule.

In some embodiments, the at least one data source may be a facility information management system.

In some embodiments, the alert may include a message that is sent to one or more computing devices.

Another broad aspect is a method of generating an alert for a danger located in proximity to a location of interest using a monitoring system. The method includes receiving an occurrence record indicative of an event, wherein the occurrence record includes a first geographic parameter of the event; comparing the first occurrence record to a trigger-based rule comprising a trigger condition, wherein the trigger condition is met by the occurrence record when the event corresponds to a fire event; generating at least one query according to one or more query conditions of the trigger-based rule, the at least one query including a geographic range from the first geographic parameter of the occurrence record; determining, in response to the at least one query, that at least one location record of a plurality of location records of at least one data source is indicative of a location of interest, the at least one location record comprising an identifier of the location of interest and a geographic parameter that is contained within the geographic range of the query; and generating an alert indicating a possible danger associated with the location of interest of the at least one location record.

In some embodiments, determining that the at least one location record is indicative of the location of interest may comprise receiving, in response to the at least one query, the at least one location record indicative of the location of interest from the at least one data source.

In some embodiments, the occurrence record may be received from a first data source; and wherein the at least one data source is different from the first data source.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the event of the occurrence record may be the fire event, and wherein the occurrence record may correspond to a computer-aided dispatch (CAD) call indicative of the fire event.

In some embodiments, the at least one query may include at least one location type; and wherein the at least one location record is indicative of the location of interest corresponding to one of the at least one location type.

In some embodiments, the at least one location type may be one or more of a hospital and a school.

In some embodiments, the at least one data source that is queried may be set by the one or more query conditions of the trigger-based rule.

In some embodiments, the at least one data source may be a facility information management system.

In some embodiments, the alert may include a message that is sent to one or more computing devices.

Another broad aspect is a method for detecting suspicious activity of a vehicle by a monitoring system. The method includes receiving a first occurrence record indicative of a first licence plate read event by a camera, the first occurrence record including a first geographic parameter of the first licence plate read event, a first time parameter of the first licence plate read event and a first licence plate number; generating at least one query for one or more data sources, the at least one query comprising criteria including a temporal range, a geographic range from the first geographic parameter and a target licence plate number corresponding to the first licence plate number of the first occurrence record, the one or more data sources storing a plurality of occurrence records indicative of respective licence plate read events and each occurrence record of the plurality of occurrence records including a geographic parameter, a time parameter and a licence plate number;

determining that a set of occurrence records of the plurality of occurrence records meet the criteria of the query and that a count of occurrence records in the set of occurrence records meets or exceeds a threshold number indicative of suspicious activity of a vehicle associated with the target licence plate number; and generating an alert indicative of the suspicious activity of the vehicle when the count meets or exceeds the threshold number.

In some embodiments, determining that the set of occurrence records meet the criteria of the query may comprise receiving, in response to the at least one query, the set of occurrence records from the one or more data sources that meet the criteria of the query.

In some embodiments, the query further may include the threshold number.

In some embodiments, the one or more data sources may be a first data source and wherein the first occurrence record is received from the first data source.

In some embodiments, the one or more data sources may comprise a plurality of data sources including a first data source and wherein the first occurrence record is received from the first data source.

In some embodiments, the method may include, prior to the generating, comparing the first occurrence record to a trigger-based rule comprising a trigger condition, wherein the trigger condition may be met by the first occurrence record when the first occurrence record corresponds to a licence plate read event, and wherein the generating may be performed upon determining that the trigger condition of the trigger-based rule is met.

In some embodiments, the comparing the first occurrence record to the trigger-based rule may comprise comparing the first occurrence record to a plurality of trigger-based rules comprising the trigger-based rule, each trigger-based rule of the plurality of trigger-based rules comprising a respective trigger condition.

In some embodiments, the threshold number may be at least 5.

In some embodiments, the alert may include a message that is sent to one or more computing devices, the message comprising the target license plate number.

In some embodiments, the suspicious activity may be a possible car theft incident.

Another broad aspect is a method of generating alert notifications for events of interest occurring in geographic regions of interest by a monitoring system. The method includes receiving an occurrence record indicative of a computer-aided dispatch (CAD) call event, the occurrence record comprising a geographic parameter of an incident associated with the CAD call event, a priority parameter of the CAD call event and information on the CAD call event; comparing the occurrence record to a trigger-based rule comprising a trigger condition, wherein the trigger condition is met by the occurrence record when the information on the CAD call event comprises a call type of interest, the priority parameter of the CAD call event corresponding to a predefined priority level, and the geographic parameter is associated with a location contained within a geographic region of interest; and generating an alert indicative of an event of interest occurring in the geographic region of interest.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the geographic area of interest may be set by an operator by defining an area on a map appearing on a graphical user interface.

In some embodiments, the call type of interest may be a call related to a bomb scare, an explosion or a gunshot.

In some embodiments, the geographic region of interest may correspond to a business district.

In some embodiments, the geographic region of interest may correspond to an airport.

In some embodiments, the alert may include a message that is sent to one or more computing devices.

Another broad aspect is a method of generating an alert for a power shortage associated with extreme temperature by a monitoring system. The method includes receiving an occurrence record indicative of an event, the occurrence record comprising a geographic parameter corresponding to the event; comparing the occurrence record to a trigger-based rule comprising a trigger condition, wherein the trigger condition is met by the occurrence record when the event corresponds to a power shortage event; generating a query with a geographic condition based on the geographic parameter, the query transmitted to a data source comprising temperature data; receiving target temperature data of at least one geographic location meeting the geographic condition; determining that the temperature data corresponds to an extreme temperature value or extreme temperature value range for the at least one geographic location; and generating an emergency action command upon determining that the temperature data corresponds to the extreme temperature value or extreme temperature value range.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the extreme temperature value or extreme temperature value range may be indicative of a cold temperature below a cold temperature threshold value or a hot temperature exceeding a hot temperature threshold value.

In some embodiments, the emergency action command may cause a transmission of a message to an ambulance intervention service to dispatch an emergency response to at least one geographic location.

In some embodiments, the emergency action command may cause a transmission of a message to a dispatch service to dispatch at least one bus to the at least one geographic location.

Another broad aspect is a method of coordinating a dispatch of emergency vehicles by a monitoring system. The method includes receiving an occurrence record indicative of an event, the occurrence record comprising a geographic parameter of the event; generating a query, comprising a geographic range based on the geographic parameter, to retrieve an availability metric of emergency vehicles in a region corresponding to the geographic range, the region including a location corresponding to the geographic parameter; comparing the availability metric to an emergency vehicle availability threshold value; determining that insufficient emergency vehicles are available in the region based on comparing the availability metric to the emergency vehicle availability threshold value; and generating an alert to an emergency operation service located outside of the region, the alert including the location corresponding to the geographic parameter.

In some embodiments, the event may be a computer-aided dispatch (CAD) event, and wherein the geographic parameter is of an incident associated with the CAD event.

In some embodiments, the method may include comparing the occurrence record to a trigger-based rule comprising a trigger condition, wherein the trigger condition may be met when the occurrence record corresponds to the CAD event; and wherein the query is generated upon determining that the condition of the trigger-based rule is met.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the emergency operation service may be located in proximity to the region.

In some embodiments, the method may include generating a query to retrieve addresses for one or more emergency operation services located in proximity to the region.

In some embodiments, the emergency vehicles may be ambulances.

Another broad aspect is a method of alerting for an absence of fire hydrants in a region associated with a fire by a monitoring system. The method includes receiving an occurrence record indicative of a computer-aided dispatch (CAD) call event, the occurrence record including a geographic parameter corresponding to an incident associated with the CAD call event; comparing the occurrence record to a trigger-based rule comprising a trigger condition, wherein the trigger condition is met by the occurrence record when the CAD call event corresponds to a fire-type CAD call event; generating a query according to one or more query conditions of the trigger-based rule, the query including a geographic range from the geographic parameter to retrieve one or more fire hydrant objects having a location contained within the geographic range; and upon determining that no fire hydrant objects are contained in the geographic range, generating an alert indicative of an absence of fire hydrants in proximity to a location corresponding to the geographic parameter of the occurrence record.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the alert may include a message that is sent to one or more computing devices.

Another broad aspect is a method of generating a notification on a road panel display indicative of a traffic state by a monitoring system. The method includes receiving an occurrence record indicative of a traffic event, the occurrence record including vehicle travel time information indicative of time taken by a vehicle to travel a distance on a target road and an identifier of the target road; comparing the occurrence record to a trigger-based rule comprising a trigger condition, wherein the trigger condition is met by the occurrence record when the travel time information meets or exceeds a vehicle travel time threshold value determinative of vehicle congestion; generating a query comprising a geographic range associated to the identifier of the target road for identifying one or more road panel displays in proximity to the target road; in response to the query, retrieving at least an identifier of a road panel display with a location contained within the geographic range, wherein the road panel display is in proximity to the target road; and generating a command to display a message on the road panel display corresponding to the identifier.

In some embodiments, the occurrence record may be received from a data source configured to generate the vehicle travel time information.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the identifier of the target road may include a string of characters corresponding to the name or number of the target road, whereby a location of the target road may be determinable from the string of characters.

In some embodiments, the identifier of the target road may include coordinates corresponding to the location of the target road.

In some embodiments, the geographic range may define a region that includes a space neighboring the target road.

In some embodiments, the identifier of the road panel display may include a geographic parameter indicative of the location of the road panel display.

In some embodiments, the identifier of the road panel may include an address corresponding to a computer that runs the road panel display.

Another broad aspect is a method of filtering occurrence records corresponding to events located in a region of interest by a monitoring system. The method includes receiving a region of interest defined on a graphical user interface that renders a map of a geographic area; applying a filter that discards occurrence records that do not have a geographic parameter corresponding to a location that is contained within the region of interest, wherein each occurrence record of the occurrence records is associated to an event and includes a geographic parameter; and receiving filtered occurrence records that each have a geographic parameter corresponding to a location that is contained within the region of interest as a result of applying the filter.

In some embodiments, the method may include transmitting the filtered occurrence records to a command center computing device setup for monitoring the region of interest; and displaying the filtered occurrence records on a display device associated with the command center computing device.

In some embodiments, wherein displaying the filtered occurrence records may include displaying the filtered occurrence records on the map of the geographic area.

In some embodiments, the region of interest may include a corridor that contains a route, defined on the map, for a mobile activity that follows the route.

In some embodiments, the corridor may be defined by setting a buffer parameter that defines a tolerance region adjacent to the route.

In some embodiments, the mobile activity may be a sporting event or a parade.

In some embodiments, the region of interest may be defined on the map by plotting the route on the map through a selection action.

In some embodiments, the method may include rendering the filtered occurrence records as icons on the map, wherein map-based locations of the filtered occurrence records are determined based on the geographic parameters of the filtered occurrence records, and wherein occurrence records that have been discarded as a result of the applied filter do not have icons that are visible on the map.

In some embodiments, the method may include comparing the filtered occurrence records to a trigger-based rule including a trigger condition that the event corresponds to a pre-defined event type.

In some embodiments, the pre-defined event type may be one or more of a computer-aided dispatch (CAD) call event; a gunshot event; and a fire event.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

In some embodiments, the method may include generating a query transmitted to a data source of camera records to identify one or more cameras located in the region of interest, wherein a camera record of the camera records includes an identifier for a corresponding camera and a geographic parameter corresponding to the location of the corresponding camera, and wherein the query includes a geographic constraint condition based on the region of interest; receiving an identifier for a camera record that has a geographic parameter that satisfies the geographic constraint condition of the query; and generating a command to adjust one or more of a pan, tilt and zoom feature of the camera corresponding to the received identifier, to direct the camera to the region of interest.

In some embodiments, the identifier for the corresponding camera may include an IP address.

In some embodiments, the method may include, after the receiving filtered occurrence records, removing the applied filter to no longer restrict received occurrence records to the occurrence records that are contained within the region of interest as a result of the applied filter.

Another broad aspect is a method of associating an event of an occurrence record to a timeline of a camera by a monitoring system. The method includes receiving an occurrence record indicative of an event, the occurrence record comprising a time parameter corresponding to a time of the event, a geographic parameter corresponding to a location of the event and information on a type of event; determining that the location of the event, as established from the geographic parameter of the occurrence record, is within a geographic range from a location of the camera; and generating a visual marker in the timeline of the camera, wherein playback of an image stream of the camera results in displaying the visual marker at a timestamp of the timeline corresponding to the time of the event, the visual marker for alerting a user of an existence of the event in the image stream at the timestamp.

In some embodiments, the method may include generating an icon in a computer-generated map rendered on a graphical user interface, the icon corresponding to the occurrence record, wherein a location of the icon on the computer-generated map is determined from the geographic parameter of the occurrence record.

In some embodiments, the icon generated in the computer-generated map may correspond to the visual marker generated in the timeline.

In some embodiments, the geographic range may be determined from a user selection of a portion of the computer-generated map, the selection including the location of the camera.

In some embodiments, a camera icon may appear on the computer-generated map at a location corresponding to the geographic parameter of the camera.

In some embodiments, an appearance of the visual marker may correspond to the type of event of the occurrence record for signaling the user to the type of the event.

In some embodiments, the method may include receiving a selection by the user of a portion of the timeline including the timestamp for the event of the correspondence record.

Another broad aspect is a method of moving a camera towards a gunshot by a monitoring system. The method includes receiving an occurrence record indicative of an event, the occurrence record including a geographic parameter of the event; comparing the occurrence record to a trigger-based rule comprising a trigger condition, the trigger condition is met by the occurrence record when the event of the occurrence record corresponds to a gunshot event; generating at least one query according to one or more query conditions of the trigger-based rule, the at least one query including a geographic range from the geographic parameter of the occurrence record, the geographic parameter of the occurrence record indicative of a location of the gunshot; receiving, in response to the at least one query, at least an identifier of a camera having a location within the geographic range; and generating a camera movement command for the camera having the identifier to adjust a field of view of the camera towards to the location of the gunshot.

In some embodiments, the comparing the occurrence record to the trigger-based rule may comprise comparing the occurrence record to a plurality of trigger-based rules comprising the trigger-based rule, each trigger-based rule of the plurality of trigger-based rules comprising a respective trigger condition.

Another broad aspect is a computing device for alerting one or more portable computing devices of a presence of a nearby target vehicle by a monitoring system. The computing device includes a processor; and memory including program code that, when executed by the processor, causes the processor to: receive an occurrence record indicative of a license plate read event by a camera, the occurrence record including a geographic parameter corresponding to a location of the camera and a licence plate number of the license plate read event; determine that the licence plate number corresponds to a target licence plate number of a plurality of target license plate numbers corresponding to a plurality of target vehicles; search for one or more portable computing devices that are within a pre-determined perimeter of the location of the camera and retrieving one or more identifiers corresponding to, respectively, each of the one or more portable computing devices that are identified within the pre-determined perimeter of the location of the camera; and transmit a notification to each of the one or more portable computing devices corresponding to each of the one or more identifiers, the notification including the licence plate number, the notification is for alerting a recipient of the notification of a possible presence of the target vehicle in a vicinity of the recipient.

In some embodiments, the program code that causes the processor to determine that the license plate number corresponds to the target license plate number may further cause the processor to compare the occurrence record to a trigger-based rule comprising a trigger condition, wherein the trigger condition may be met by the occurrence record when the occurrence record corresponds to a license plate recognition event.

In some embodiments, the program code that causes the processor to compare the first occurrence record to the trigger-based rule may further cause the processor to compare the occurrence record to a plurality of trigger-based rules comprising the trigger-based rule, each trigger-based rule of the plurality of trigger-based rules comprising a respective trigger condition.

In some embodiments, the licence plate number may correspond to the target licence plate when the licence plate number is similar to the target licence plate.

In some embodiments, the licence plate number may correspond to the target licence plate when the licence plate number is identical to the target licence plate.

In some embodiments, the perimeter may correspond to a radius from the location of the camera positioned in a center of a circle having the radius.

In some embodiments, the perimeter may correspond to a geographic range set by an operator by defining an area on a map appearing on a graphical user interface.

In some embodiments, the memory may further include program code that, when executed by the processor, causes the processor to receive geolocation data from a plurality of mobile computing devices; and wherein the program code that causes the processor to search for the one or more portable computing devices further causes the processor to, when executed by the processor, identify, from the plurality of mobile devices, the one or more computing devices within the pre-determined perimeter of the location of the camera based on the geolocation data.

In some embodiments, the notification may further comprise at least one of: a license plate image of the license plate, a context image of a vehicle with the license plate, a make of the vehicle, a model of the vehicle, a year of the vehicle, a vehicle colour and a vehicle speed.

In some embodiments, the memory may further include program code that, when executed by the processor, causes the processor to, prior to the receiving, analyze an image obtained from the camera to identify the licence plate number, and generating the occurrence record.

In some embodiments, the camera may be a licence plate recognition (LPR) camera.

another broad aspect is a computing device for generating an alert for a security event associated with one or more geographic areas of interest by a monitoring system. The computing device includes a processor; and memory including program code that, when executed by the processor, causes the processor to receive a first occurrence record indicative of a computer-aided dispatch (CAD) call event, the first occurrence record including a first geographic parameter of the event, a first time parameter of the event, and a first priority parameter of the event; compare the first occurrence record to a trigger-based rule comprising a trigger condition, the trigger condition is met by the first occurrence record when the first priority parameter of the first occurrence record corresponds to a pre-defined priority level set by the trigger-based rule; generate at least one query according to one or more query conditions of the trigger-based rule, the at least one query including a temporal range, a geographic range defining one or more geographic areas of interest, and a priority value corresponding to the pre-defined priority level; receive, in response to the at least one query, at least two occurrence records from one or more data sources, each occurrence record of the at least two occurrence records including a geographic parameter corresponding to a location within the geographic range, a time parameter within the temporal range and a priority parameter matching the priority value; and generate an alert indicative of a possible emergency incident in the one or more geographic areas of interest based on the at least two occurrence records received from the one or more data sources.

In some embodiments, the first occurrence record may be received from a first data source storing a plurality of occurrence records for CAD call events, the plurality of records for CAD call events including the first occurrence record; and wherein the one or more data sources may include the first data source.

In some embodiments, the comparing the first occurrence record to the trigger-based rule may comprise comparing the first occurrence record to a plurality of trigger-based rules comprising the trigger-based rule, each trigger-based rule of the plurality of trigger-based rules comprising a respective trigger condition.

In some embodiments, the temporal range may be defined from the first time parameter of the first occurrence record.

In some embodiments, the temporal range may be defined from a current time.

In some embodiments, the first occurrence record may include an audio file for the CAD call event.

In some embodiments, the first occurrence record may include a string of characters that is a transcript for the CAD call event.

In some embodiments, the one or more geographic areas of interest may correspond to one or more airports.

In some embodiments, the pre-defined priority level may be a highest priority level of a set of priority levels that can be assigned to CAD calls.

In some embodiments, the alert may include a message that is sent to one or more computing devices.

Another broad aspect is a computing device for generating an alert for a danger located in proximity to a location of interest using a monitoring system. The computing device includes a processor; and memory including program code that, when executed by the processor, causes the processor to receive an occurrence record indicative of an event, wherein the occurrence record includes a first geographic parameter of the event; compare the first occurrence record to a trigger-based rule comprising a trigger condition, wherein the trigger condition is met by the occurrence record when the event corresponds to a gunshot event; generate at least one query according to one or more query conditions of the trigger-based rule, the at least one query including a geographic range from the first geographic parameter of the occurrence record; determine, in response to the at least one query, that at least one location record of a plurality location records of at least one data source is indicative of a location of interest, the at least one location record comprising an identifier of the location of interest and a geographic parameter that is contained within the geographic range of the query; and generate an alert indicating a possible danger associated with the location of interest of the at least one location record.

In some embodiments, the program code that causes the processor, when executed by the processor, to determine that the at least one location record is indicative of the location of interest further may cause the processor to receive, in response to the at least one query, the at least one location record indicative of the location of interest from the at least one data source.

In some embodiments, the occurrence record may be received from a first data source; and wherein the at least one data source may be different from the first data source.

In some embodiments, the program code that causes the processor, when executed by the processor, to compare the occurrence record to the trigger-based rule further may cause the processor to compare the occurrence record to a plurality of trigger-based rules comprising the trigger-based rule, each trigger-based rule of the plurality of trigger-based rules comprising a respective trigger condition.

In some embodiments, the event of the occurrence record may be the gunshot event, the gunshot event being identified by a microphone-based gunshot detector.

In some embodiments, the at least one query may include at least one location type; and wherein the at least one location record may be indicative of the location of interest corresponding to one of the at least one location type.

In some embodiments, the at least one location type may be one or more of a hospital and a school.

In some embodiments, the at least one data source that is queried may be set by the one or more query conditions of the trigger-based rule.

In some embodiments, the at least one data source may be a facility information management system.

In some embodiments, the alert may include a message that is sent to one or more computing devices.

Another broad aspect is a computing device for generating an alert for a danger located in proximity to a location of interest using a monitoring system. The computing device includes a processor; and memory including program code that, when executed by the processor, causes the processor to receive an occurrence record indicative of an event, wherein the occurrence record includes a first geographic parameter of the event; compare the first occurrence record to a trigger-based rule comprising a trigger condition, wherein the trigger condition is met by the occurrence record when the event corresponds to a fire event; generate at least one query according to one or more query conditions of the trigger-based rule, the at least one query including a geographic range from the first geographic parameter of the occurrence record; determine, in response to the at least one query, that at least one location record of a plurality location records of at least one data source is indicative of a location of interest, the at least one location record comprising an identifier of the location of interest and a geographic parameter that is contained within the geographic range of the query; and generate an alert indicating a possible danger associated with the location of interest of the at least one location record.

In some embodiments, the program code that causes the processor, when executed by the processor, to determine that the at least one location record is indicative of the location of interest may further cause the processor to receive, in response to the at least one query, the at least one location record indicative of the location of interest from the at least one data source.

In some embodiments, the occurrence record may be received from a first data source; and wherein the at least one data source is different from the first data source.

In some embodiments, the program code that causes the processor, when executed by the processor, to compare the occurrence record to the trigger-based rule may further cause the processor to compare the occurrence record to a plurality of trigger-based rules comprising the trigger-based rule, each trigger-based rule of the plurality of trigger-based rules comprising a respective trigger condition.

In some embodiments, the event of the occurrence record may be the fire event, and wherein the occurrence record may correspond to a computer-aided dispatch (CAD) call indicative of the fire event.

In some embodiments, the at least one query may include at least one location type; and wherein the at least one location record may be indicative of the location of interest corresponding to one of the at least one location type.

In some embodiments, the at least one location type may be one or more of a hospital and a school.

In some embodiments, the at least one data source that is queried may be set by the one or more query conditions of the trigger-based rule.

In some embodiments, the at least one data source may be a facility information management system.

In some embodiments, the alert may include a message that is sent to one or more computing devices.

Another broad aspect is a computing device for detecting suspicious activity of a vehicle by a monitoring system. The computing device includes a processor; and memory including program code that, when executed by the processor, causes the processor to receive a first occurrence record indicative of a first licence plate read event by a camera, the first occurrence record including a first geographic parameter of the first licence plate read event, a first time parameter of the first licence plate read event and a first licence plate number; generate at least one query for one or more data sources, the at least one query comprising a criteria including a temporal range, a geographic range from the first geographic parameter and a target licence plate number corresponding to the first licence plate number of the first occurrence record, the one or more data sources store a plurality of occurrence records indicative of respective licence plate read events and each occurrence record of the plurality of occurrence records including a geographic parameter, a time parameter and a licence plate number; determine that a set of occurrence records of the plurality of occurrence records meet the criteria of the query and that a count of occurrence records in the set of occurrence records meets or exceeds a threshold number indicative of suspicious activity of a vehicle associated with the target licence plate number; and generate an alert indicative of the suspicious activity of the vehicle when the count meets or exceeds the threshold number.

In some embodiments, the program code that causes the processor to determine that the set of occurrence records meet the criteria of the query may further cause the processor to receive, in response to the at least one query, the set of occurrence records from the one or more data sources that meet the criteria of the query.

In some embodiments, the query may further include the threshold number.

In some embodiments, the one or more data sources may be a first data source and wherein the first occurrence record is received from the first data source.

In some embodiments, the one or more data sources may comprise a plurality of data sources including a first data source and wherein the first occurrence record may be received from the first data source.

In some embodiments, the memory may further include program code that, when executed by the processor, causes the processor to, prior to the generating, compare the first occurrence record to a trigger-based rule comprising a trigger condition, wherein the trigger condition is met by the first occurrence record when the first occurrence record corresponds to a licence plate read event, wherein the generating is performed upon determining that the trigger condition of the trigger-based rule is met.

In some embodiments, the program code that causes the processor to compare the first occurrence record to the trigger-based rule may further cause the processor to compare the first occurrence record to a plurality of trigger-based rules comprising the trigger-based rule, each trigger-based rule of the plurality of trigger-based rules comprising a respective trigger condition.

In some embodiments, the threshold number may be at least 5.

In some embodiments, the alert may include a message that is sent to one or more computing devices, the message comprising the target license plate number.

In some embodiments, the suspicious activity may be a possible car theft incident.

Another broad aspect is a computing device for generating alert notifications for events of interest occurring in geographic regions of interest by a monitoring system. the computing device includes a processor; and memory including program code that, when executed by the processor, causes the processor to: receive an occurrence record indicative of a computer-aided dispatch (CAD) call event, the occurrence record comprising a geographic parameter of an incident associated with the CAD call event, a priority parameter of the CAD call event and information on the CAD call event;

compare the occurrence record to a trigger-based rule comprising a trigger condition, wherein the trigger condition is met by the occurrence record when the information on the CAD call event comprises a call type of interest, the priority parameter of the CAD call event corresponds to a pre-defined priority level, and the geographic parameter is associated with a location contained within a geographic region of interest; and generate an alert indicative of an event of interest occurring in the geographic region of interest.

In some embodiments, the program code that causes the processor to compare the occurrence record to the trigger-based rule may further cause the processor to compare the occurrence record to a plurality of trigger-based rules comprising the trigger-based rule, each trigger-based rule of the plurality of trigger-based rules comprising a respective trigger condition.

In some embodiments, the geographic area of interest may be set by an operator by defining an area on a map appearing on a graphical user interface.

In some embodiments, the call type of interest may be a call related to a bomb scare, an explosion or a gunshot.

In some embodiments, the geographic region of interest may correspond to a business district.

In some embodiments, the geographic region of interest may correspond to an airport.

In some embodiments, the alert may include a message that is sent to one or more computing devices.

Another broad aspect is a computing device for generating an alert for a power shortage associated with extreme temperature by a monitoring system. The computing device includes a processor; and memory further including program code that, when executed by the processor, causes the processor to: receive an occurrence record indicative of an event, the occurrence record comprising a geographic parameter corresponding to the event; compare the occurrence record to a trigger-based rule comprising a trigger condition, wherein the trigger condition is met by the occurrence record when the event corresponds to a power shortage event; generate a query with a geographic condition based on the geographic parameter, the query transmitted to a data source comprising temperature data; receive target temperature data of at least one geographic location of the geographic condition; determine that the temperature data corresponds to an extreme temperature value or extreme temperature value range for the at least one geographic location; and generate an emergency action command upon determining that the temperature data corresponds to the extreme temperature value or extreme temperature value range.

In some embodiments, the program code that causes the memory to compare the occurrence record to the trigger-based rule may further cause the program code to compare the occurrence record to a plurality of trigger-based rules comprising the trigger-based rule, each trigger-based rule of the plurality of trigger-based rules comprising a respective trigger condition.

In some embodiments, the extreme temperature value or extreme temperature value range may be indicative of a cold temperature below a cold temperature threshold value or a hot temperature exceeding a hot temperature threshold value.

In some embodiments, the emergency action command may cause a transmission of a message to an intervention service to dispatch an emergency response to at least one geographic location.

In some embodiments, the emergency action command may cause a transmission of a message to a dispatch service to dispatch at least one bus to the at least one geographic location.

Another broad aspect is a computing device for coordinating a dispatch of emergency vehicles by a monitoring system. The computing device may include a processor; and memory including program code that, when executed by the processor, causes the processor to: receive an occurrence record indicative of an event, the occurrence record comprising a geographic parameter of the event; generate a query, comprising a geographic range based on the geographic parameter, to retrieve an availability metric of emergency vehicles in a region corresponding to the geographic range, the region including a location corresponding to the geographic parameter; compare the availability metric to an emergency vehicle availability threshold value; determining that insufficient emergency vehicles are available in the region based on comparing the availability metric to the emergency vehicle availability threshold value; and generate an alert to an emergency operation service located outside of the region, the alert including the location corresponding to the geographic parameter.

In some embodiments, the event may be a computer-aided dispatch (CAD) event, and wherein the geographic parameter is of an incident associated with the CAD event.

In some embodiments, the memory may include program code that, when executed by the processor, causes the processor to compare the occurrence record to a trigger-based rule comprising a trigger condition, wherein the trigger condition is met when the occurrence record corresponds to the CAD event; and wherein the query is generated upon determining that the condition of the trigger-based rule is met.

In some embodiments, the program code that causes the processor to compare the occurrence record to the trigger-based rule may further cause the processor to compare the occurrence record to a plurality of trigger-based rules comprising the trigger-based rule, each trigger-based rule of the plurality of trigger-based rules comprising a respective trigger condition.

In some embodiments, the emergency operation service may be located in proximity to the region.

In some embodiments, the memory may further include program code that, when executed by the processor, causes the processor to generate a query to retrieve addresses for one or more emergency operation services located in proximity to the region.

In some embodiments, the emergency vehicles may be ambulances.

Another broad aspect is a computing device for alerting for an absence of fire hydrants in a region associated with a fire by a monitoring system. The computing device includes a processor; and memory including program code that, when executed by the processor, causes the processor to: receive an occurrence record indicative of a computer-aided dispatch (CAD) call event, the occurrence record including a geographic parameter corresponding to an incident associated with the CAD call event; compare the occurrence record to a trigger-based rule comprising a trigger condition, wherein the trigger condition is met by the occurrence record when the CAD call event corresponds to a fire-type CAD call event; generate a query according to one or more query conditions of the trigger-based rule, the query including a geographic range from the geographic parameter to retrieve one or more fire hydrant objects having a location contained within the geographic range; and upon determining that no fire hydrant objects are contained in the geographic range, generate an alert indicative of an absence of fire hydrants in proximity to a location corresponding to the geographic parameter of the occurrence record.

In some embodiments, the program code that causes the processor to compare the occurrence record to the trigger-based rule may further cause the processor to compare the occurrence record to a plurality of trigger-based rules comprising the trigger-based rule, each trigger-based rule of the plurality of trigger-based rules comprising a respective trigger condition.

In some embodiments, the alert may include a message that is sent to one or more computing devices.

Another broad aspect is a computing device for generating a notification on a road panel display indicative of a traffic state by a monitoring system. The computing device includes a processor; and memory including program code that, when executed by the processor, causes the processor to receive an occurrence record indicative of a traffic event, the occurrence record including vehicle travel time information indicative of time taken by a vehicle to travel a distance on a target road and an identifier of the target road; compare the occurrence record to a trigger-based rule comprising a trigger condition, wherein the trigger condition is met by the occurrence record when the travel time information meets or exceeds a vehicle travel time threshold value determinative of vehicle congestion; generate a query comprising a geographic range associated to the identifier of the target road for identifying one or more road panel displays in proximity to the target road; in response to the query, retrieve at least an identifier of a road panel display with a location contained within the geographic range, wherein the road panel display is in proximity to the target road; and generate a command to display a message on the road panel display corresponding to the identifier.

In some embodiments, the occurrence record may be received from a data source configured to generate the vehicle travel time information.

In some embodiments, the program code that causes the processor to compare the occurrence record to the trigger-based rule may further cause the processor to compare the occurrence record to a plurality of trigger-based rules comprising the trigger-based rule, each trigger-based rule of the plurality of trigger-based rules comprising a respective trigger condition.

In some embodiments, the identifier of the target road may include a string of characters corresponding to the name or number of the target road, whereby a location of the target road is determinable from the string of characters.

In some embodiments, the identifier of the target road may include coordinates corresponding to the location of the target road.

In some embodiments, the geographic range may define a region that includes a space neighboring the target road.

In some embodiments, the identifier of the road panel display may include a geographic parameter indicative of the location of the road panel display.

In some embodiments, the identifier of the road panel may include an address corresponding to the computer that runs the road panel display.

Another broad aspect is a computing device for filtering occurrence records corresponding to events located in a region of interest by a monitoring system. The computing device includes a processor; memory including program code that, when executed by the processor, causes the processor to: receive a region of interest defined on a graphical user interface that renders a map of a geographic area; apply a filter that discards occurrence records that do not have a geographic parameter corresponding to a location that is contained within the region of interest, wherein each occurrence record of the occurrence records is associated to an event and includes a geographic parameter; and receive filtered occurrence records that each have a geographic parameter corresponding to a location that is contained within the region of interest as a result of applying the filter.

In some embodiments, the memory may include program code that, when executed by the processor, causes the processor to transmit the filtered occurrence records to a command center computing device setup for monitoring the region of interest; and display the filtered occurrence records on a display device associated with the command center computing device.

In some embodiments, the program code that causes the processor to display the filtered occurrence records may further cause the processor to display the filtered occurrence records on the map of the geographic area.

In some embodiments, the region of interest may include a corridor that contains a route, defined on a map, for a mobile activity that follows the route.

In some embodiments, the corridor may be defined by setting a buffer parameter that defines a tolerance region adjacent to the route.

In some embodiments, the mobile activity may be a sporting event or a parade.

In some embodiments, the region of interest may be defined on a map by plotting the route on the map through a selection action.

In some embodiments, the memory may further include program code that, when executed by the processor, causes the processor to render the filtered occurrence records as icons on the map, wherein map-based locations of the filtered occurrence records are determined based on the geographic parameters of the filtered occurrence records, and wherein occurrence records that have been discarded as a result of the applied filter do not have icons that are visible on the map.

In some embodiments, the memory may further include program code that, when executed by the processor, causes the processor to compare the filtered occurrence records to a trigger-based rule including a trigger condition that the event corresponds to a pre-defined event type.

In some embodiments, the pre-defined event type may be one or more of a computer-aided dispatch (CAD) call event; a gunshot event; and a fire event.

In some embodiments, the program code that causes the processor to compare the occurrence record to the trigger-based rule may further cause the processor to compare the occurrence record to a plurality of trigger-based rules comprising the trigger-based rule, each trigger-based rule of the plurality of trigger-based rules comprising a respective trigger condition.

In some embodiments, the memory may include program code that, when executed by the processor, causes the processor to generate a query transmitted to a data source of camera records to identify one or more cameras located in the region of interest, wherein a camera record of the camera records includes an identifier for a corresponding camera and a geographic parameter corresponding to the location of the corresponding camera, and wherein the query includes a geographic constraint condition based on the region of interest; receive an identifier for a camera record that has a geographic parameter that satisfies the geographic constraint condition of the query; and generate a command to adjust one or more of a pan, tilt and zoom feature of the camera corresponding to the received identifier, to direct the camera to the region of interest.

In some embodiments, the identifier for the corresponding camera may include an IP address.

In some embodiments, the memory may include program code that, when executed by the processor, causes the processor to, after the receiving filtered occurrence records, remove the applied filter to no longer restrict received occurrence records to the occurrence records that are contained within the region of interest as a result of the applied filter.

Another broad aspect is a computing device for associating an event of an occurrence record to a timeline of a camera by a monitoring system. The computing device includes a processor; and memory including program code that, when executed by the processor, causes the processor to: receive an occurrence record indicative of an event, the occurrence record comprising a time parameter corresponding to a time of the event, a geographic parameter corresponding to a location of the event and information on a type of event; determine that the location of the event, as established from the geographic parameter of the occurrence record, is within a geographic range from a location of the camera; and generate a visual marker in the timeline of the camera, wherein playback of an image stream of the camera results in displaying the visual marker at a timestamp of the timeline corresponding to the time of the event, the visual marker for alerting a user of an existence of the event in the image stream at the timestamp.

In some embodiments, the memory may include program code that, when executed by the processor, causes the processor to generate an icon in a computer-generated map rendered on a graphical user interface, the icon corresponding to the occurrence record, wherein a location of the icon on the computer-generated map is determined from the geographic parameter of the occurrence record.

In some embodiments, the icon generated in the computer-generated map may correspond to the visual marker generated in the timeline.

In some embodiments, the geographic range may be determined from a user selection of a portion of the computer-generated map, the selection including the location of the camera.

In some embodiments, a camera icon may appear on the computer-generated map at a location corresponding to the geographic parameter of the camera.

In some embodiments, an appearance of the visual marker may correspond to the type of event of the occurrence record for signaling the user to the type of the event.

In some embodiments, the memory may include program code that, when executed by the processor, causes the processor to receive a selection by the user of a portion of the timeline including the timestamp for the event of the correspondence record.

Another broad aspect is a computing device for moving a camera towards a gunshot by a monitoring system. the computing device includes a processor; and memory including program code that, when executed by the processor, causes the processor to receive an occurrence record indicative of an event, the occurrence record including a geographic parameter of the event; compare the occurrence record to a trigger-based rule comprising a trigger condition, wherein the trigger condition is met by the occurrence record when the event of the occurrence record corresponds to a gunshot event; generate at least one query according to one or more query conditions of the trigger-based rule, the at least one query including a geographic range from the geographic parameter of the occurrence record, the geographic parameter of the occurrence record indicative of a location of the gunshot; receive, in response to the at least one query, at least an identifier of a camera having a location within the geographic range; and generate a camera movement command for the camera having the identifier to adjust a field of view of the camera towards to the location of the gunshot.

In some embodiments, the program code that causes the processor to compare the occurrence record to the trigger-based rule may further cause the processor to compare the occurrence record to a plurality of trigger-based rules comprising the trigger-based rule, each trigger-based rule of the plurality of trigger-based rules comprising a respective trigger condition.

Another broad aspect is non-transitory computer-readable medium having stored thereon program instructions for alerting one or more portable computing devices of a presence of an event of interest, the program instructions executable by a processing unit for receiving an occurrence record indicative of a license plate read event by a camera, the occurrence record including a geographic parameter corresponding to a location of the camera and a licence plate number of the license plate read event; determining that the licence plate number corresponds to a target licence plate number of a plurality of target license plate numbers corresponding to a plurality of target vehicles; searching for one or more portable computing devices that are within a pre-determined perimeter of the location of the camera and retrieving one or more identifiers corresponding to, respectively, each of one or more portable computing devices that are identified within the pre-determined perimeter of the location of the camera; and transmitting a notification to each of the one or more portable computing devices corresponding to each of the one or more identifiers, the notification including the licence plate number, the notification is for alerting a recipient of the notification of a possible presence of the target vehicle in a vicinity of the recipient.

Another broad aspect is non-transitory computer-readable medium having stored thereon program instructions for generating an alert for a security event associated with one or more geographic areas of interest, the program instructions executable by a processing unit for receiving a first occurrence record indicative of a computer-aided dispatch (CAD) call event, the first occurrence record including a first geographic parameter of the event, a first time parameter of the event, and a first priority parameter of the event; comparing the first occurrence record to a trigger-based rule comprising a trigger condition, wherein the trigger condition is met by the first occurrence record when the first priority parameter of the first occurrence record corresponds to a pre-defined priority level set by the trigger-based rule; generating at least one query according to one or more query conditions of the trigger-based rule, the at least one query including a temporal range, a geographic range defining one or more geographic areas of interest, and a priority value corresponding to the pre-defined priority level; receiving, in response to the at least one query, at least two occurrence records from one or more data sources, each occurrence record of the at least two occurrence records including a geographic parameter corresponding to a location within the geographic range, a time parameter within the temporal range and a priority parameter matching the priority value; and generating an alert indicative of a possible emergency incident in the one or more geographic areas of interest based on the at least two occurrence records received from the one or more data sources.

Another broad aspect is non-transitory computer-readable medium having stored thereon program instructions for generating an alert for a danger located in proximity to a location of interest using a monitoring system, the program instructions executable by a processing unit for receiving an occurrence record indicative of an event, wherein the occurrence record includes a first geographic parameter of the event; comparing the first occurrence record to a trigger-based rule comprising a trigger condition, wherein the trigger condition is met by the occurrence record when the event corresponds to a gunshot event; generating at least one query according to one or more query conditions of the trigger-based rule, the at least one query including a geographic range from the first geographic parameter of the occurrence record; determining, in response to the at least one query, that at least one location record of a plurality location records of at least one data source is indicative of the location of interest, the at least one location record comprising an identifier of the location of interest and a geographic parameter that is contained within the geographic range of the query; and generating an alert indicating a possible danger associated with the location of interest of the at least one location record.

Another broad aspect is non-transitory computer-readable medium having stored thereon program instructions for generating an alert for a danger located in proximity to a location of interest using a monitoring system, the program instructions executable by a processing unit for receiving an occurrence record indicative of an event, wherein the occurrence record includes a first geographic parameter of the event; comparing the first occurrence record to a trigger-based rule comprising a trigger condition, wherein the trigger condition is met by the occurrence record when the event corresponds to a fire event; generating at least one query according to one or more query conditions of the trigger-based rule, the at least one query including a geographic range from the first geographic parameter of the occurrence record; determining, in response to the at least one query, that at least one location record of a plurality location records of at least one data source is indicative of a location of interest, the at least one location record comprising an identifier of the location of interest and a geographic parameter that is contained within the geographic range of the query; and generating an alert indicating a possible danger associated with the location of interest of the at least one location record.

Another broad aspect is non-transitory computer-readable medium having stored thereon program instructions for detecting suspicious activity of a vehicle by a monitoring system, the program instructions executable by a processing unit for receiving a first occurrence record indicative of a first licence plate read event by a camera, the first occurrence record including a first geographic parameter of the first licence plate read event, a first time parameter of the first licence plate read event and a first licence plate number; generating at least one query for one or more data sources, the at least one query comprising criteria including a temporal range, a geographic range from the first geographic parameter and a target licence plate number corresponding to the first licence plate number of the first occurrence record, the one or more data sources storing a plurality of occurrence records indicative of respective licence plate read events and each occurrence record of the plurality of occurrence records including a geographic parameter, a time parameter and a licence plate number; determining that a set of occurrence records of the plurality of occurrence records meet the criteria of the query and that a count of occurrence records in the set of occurrence records meets or exceeds a threshold number indicative of suspicious activity of a vehicle associated with the target licence plate number; and generating an alert indicative of the suspicious activity of the vehicle when the count meets or exceeds the threshold number.

Another broad aspect is non-transitory computer-readable medium having stored thereon program instructions for generating alert notifications for events of interest occurring in geographic regions of interest by a monitoring system, the program instructions executable by a processing unit for receiving an occurrence record indicative of a computer-aided dispatch (CAD) call event, the occurrence record comprising a geographic parameter of an incident associated with the CAD call event, a priority parameter of the CAD call event and information on the CAD call event; comparing the occurrence record to a trigger-based rule comprising a trigger condition, wherein the trigger condition is met by the occurrence record when the information on the CAD call event comprises a call type of interest, the priority parameter of the CAD call event corresponding to a pre-defined priority level, and the geographic parameter is associated with a location contained within a geographic region of interest; and generating an alert indicative of an event of interest occurring in the geographic region of interest.

Another broad aspect is non-transitory computer-readable medium having stored thereon program instructions for generating an alert for a power shortage associated with extreme temperature by a monitoring system, the program instructions executable by a processing unit for receiving an occurrence record indicative of an event, the occurrence record comprising a geographic parameter corresponding to the event; comparing the occurrence record to a trigger-based rule comprising a trigger condition, wherein the trigger condition is met by the occurrence record when the event corresponds to a power shortage event; generating a query with a geographic condition based on the geographic parameter, the query transmitted to a data source comprising temperature data; receiving target temperature data of at least one geographic location of the geographic condition; determining that the temperature data corresponds to an extreme temperature value or extreme temperature value range for the at least one geographic location; and generating an emergency action command upon determining that the temperature data corresponds to the extreme temperature value or extreme temperature value range.

Another broad aspect is non-transitory computer-readable medium having stored thereon program instructions for coordinating a dispatch of emergency vehicles by a monitoring system, the program instructions executable by a processing unit for receiving an occurrence record indicative of an event, the occurrence record comprising a geographic parameter of the event; generating a query, comprising a geographic range based on the geographic parameter, to retrieve an availability metric of emergency vehicles in a region corresponding to the geographic range, the region including a location corresponding to the geographic parameter; comparing the availability metric to an emergency vehicle availability threshold value; determining that insufficient emergency vehicles are available in the region based on comparing the availability metric to the emergency vehicle availability threshold value; and generating an alert to an emergency operation service located outside of the region, the alert including the location corresponding to the geographic parameter.

Another broad aspect is non-transitory computer-readable medium having stored thereon program instructions for an absence of fire hydrants in a region associated with a fire by a monitoring system, the program instructions executable by a processing unit for receiving an occurrence record indicative of a computer-aided dispatch (CAD) call event, the occurrence record including a geographic parameter corresponding to an incident associated with the CAD call event; comparing the occurrence record to a trigger-based rule comprising a trigger condition, wherein the trigger condition is met by the occurrence record when the CAD call event correspond to a fire-type CAD call event; generating a query according to one or more query conditions of the trigger-based rule, the query including a geographic range from the geographic parameter to retrieve fire hydrant objects having a location contained within the geographic range; and upon determining that no fire hydrant objects are contained in the geographic range, generating an alert indicative of an absence of fire hydrants in proximity to a location corresponding to the geographic parameter of the occurrence record.

Another broad aspect is non-transitory computer-readable medium having stored thereon program instructions for generating a notification on a road panel display indicative of a traffic state by a monitoring system, the program instructions executable by a processing unit for receiving an occurrence record indicative of a traffic event, the occurrence record including vehicle travel time information indicative of time taken by a vehicle to travel a distance on a target road and an identifier of the target road; comparing the occurrence record to a trigger-based rule comprising a trigger condition, wherein the trigger condition is met by the occurrence record when the travel time information meets or exceeds a vehicle travel time threshold value determinative of vehicle congestion; generating a query comprising a geographic range associated to the identifier of the target road for identifying one or more road panel displays in proximity to the target road; in response to the query, retrieving at least an identifier of a road panel display with a location contained within the geographic range, the road panel display is in proximity to the target road; and generating a command to display a message on the road panel display corresponding to the identifier.

Another broad aspect is non-transitory computer-readable medium having stored thereon program instructions for filtering occurrence records corresponding to events located in a region of interest by a monitoring system, the program instructions executable by a processing unit for receiving a region of interest defined on a graphical user interface that renders a map of a geographic area; applying a filter that discards occurrence records that do not have a geographic parameter corresponding to a location that is contained within the region of interest, wherein each occurrence record of the occurrence records is associated to an event and includes a geographic parameter; and receiving filtered occurrence records that each have a geographic parameter corresponding to a location that is contained within the region of interest as a result of applying the filter.

Another broad aspect is non-transitory computer-readable medium having stored thereon program instructions for associating an event of an occurrence record to a timeline of a camera by a monitoring system, the program instructions executable by a processing unit for receiving an occurrence record indicative of an event, the occurrence record comprising a time parameter corresponding to a time of the event, a geographic parameter corresponding to a location of the event and information on a type of event; determining that the location of the event, as established from the geographic parameter of the occurrence record, is within a geographic range from a location of the camera; and generating a visual marker in the timeline of the camera, wherein playback of an image stream of the camera results in displaying the visual marker at a timestamp of the timeline corresponding to the time of the event, the visual marker for alerting a user of an existence of the event in the image stream at the timestamp.

Another broad aspect is non-transitory computer-readable medium having stored thereon program instructions for moving a camera towards a gunshot by a monitoring system, the program instructions executable by a processing unit for receiving an occurrence record indicative of an event, the occurrence record including a geographic parameter of the event; comparing the occurrence record to a trigger-based rule comprising a trigger condition, the trigger condition is met by the occurrence record when the event of the occurrence record corresponds to a gunshot event; generating at least one query according to one or more query conditions of the trigger-based rule, the at least one query including a geographic range from the geographic parameter of the occurrence record, the geographic parameter of the occurrence record indicative of a location of the gunshot; receiving, in response to the at least one query, at least an identifier of a camera having a location within the geographic range; and generating a camera movement command for the camera having the identifier to adjust a field of view of the camera towards to the location of the gunshot.

BRIEF DESCRIPTION OF THE DRAWINGS

The invention will be better understood by way of the following detailed description of embodiments of the invention with reference to the appended drawings, in which.

DETAILED DESCRIPTION

Figure 1:
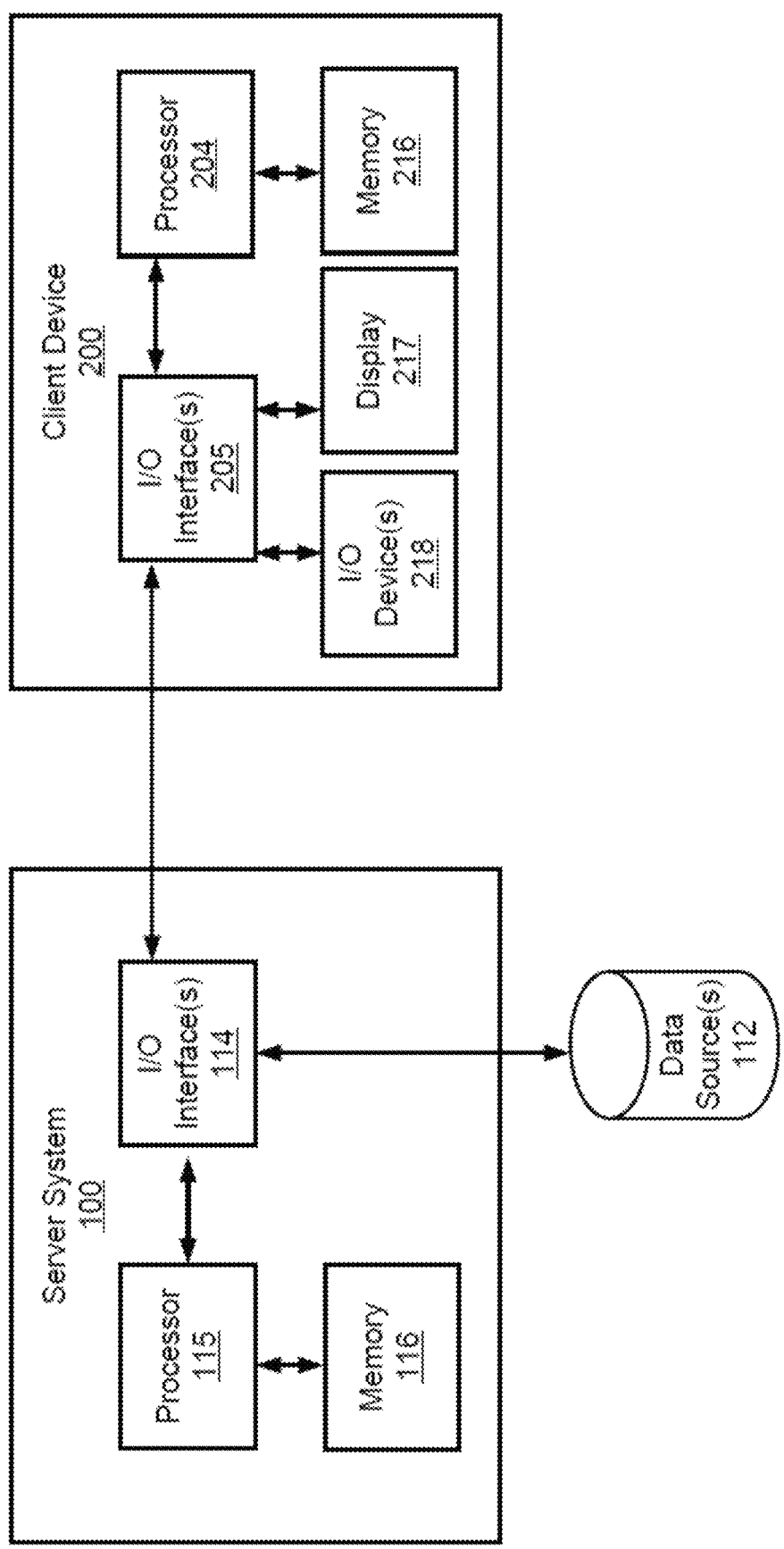
FIG. 1 is a block diagram illustrating an exemplary environment with a server system in communication with one or more data sources and a client device.

The present disclosure relates to a monitoring system having access to (e.g. by receiving) occurrence records that are stored in one more data sources (e.g. databases, external systems, etc.). These occurrence records may correspond to a variety of event types (e.g. computer-aided dispatch (CAD) calls, gunshot-related identifications, temperature reads, licence-plate reads, etc.) that are collected over time and associated with a geographic parameter. The access to the occurrence records from one or more data sources enables the monitoring system to put into motion a recommended action (e.g. dispatching authorities to a location of interest) when a set of conditions associated with a received occurrence record has been met, indicative of circumstances that warrant further investigation.

The receiving of an occurrence record by the monitoring system may cause the execution of one or more active trigger-based rules that have been set in the monitoring system, where a trigger-based rule has been defined to identify when an action should be created to cause, e.g., further investigation.

The trigger-based rule includes a set of conditions that, once met, cause the generation of a command for an action or multiple actions. This may be thought of as an event to action. The action may recommend that an appropriate authority perform further investigation, dispatch personnel to a location of interest, etc. For instance, the action may be an alert including a message to dispatch police officers to a site where a stolen vehicle has been located or is circulating, a request to dispatch an ambulance from a geographic area where there is an availability of ambulance vehicles to a location where there is a shortage of ambulance vehicles, etc. Other examples are described herein.

Definitions:

The term "occurrence record" refers to information indicative of an event stored or provided by a data source and that may be accessed or obtained from the data source. The data source may be or may comprise a database that stores occurrence records. The occurrence record has an occurrence record type, and may have a time parameter and a geographic parameter. The occurrence record may have other metadata and data associated with additional parameters. The data structure of the occurrence record may depend upon the configuration of the data source and/or database in which the occurrence record is stored. The occurrence record may also correspond to an event type. Examples of event types of occurrence records are access control ID reads, surveillance video analytics, license plate reads, the identity of a registered criminal with a location of the criminal, 911 call events or computer-aided dispatch (CAD) events, a gunshot event associated with the picking up of a sound that is identified to be a gunshot, the positioning of a bus or other vehicle at a given time, an identified construction site blocking street access, a traffic accident event, etc. As such, the occurrence record may be based on an event, where the event is a happening such as a CAD call, a gunshot identification, a licence plate read event, etc.

The term "event type" refers to the nature or type of the occurrence record. For example, the occurrence record type may be one of an access control event, motion detection event, surveillance video analytics event, a 911 or CAD call, a gunshot event, a license plate read event, etc. Data sources and/or databases storing occurrence records may be associated with an occurrence record type.

The term "query" refers to a request for information from a data source and/or database. The query may include an occurrence record type or types, one or more time parameters and one or more geographic parameters. The query may specify additional parameters as a function of the occurrence record type. For instance, when the occurrence record type is a database of convicts, the additional parameters may be convicts that have been charged with third degree murder, or convicted with third degree murder, or that are under the age of 25, that have blond hair, blue eyes, etc. The query may be based on a set of conditions specified in a corresponding trigger-based rule.

As used herein, the term "time parameter" refers to a parameter specifying time, such as a timestamp, a time interval, or a period of time. Each occurrence record may have one or more time parameters associated therewith.

As used herein, the term "geographic parameter" refers to a location, such as Global Positioning System (GPS) coordinates (e.g., coordinates associated with a location at which the event occurred). The geographic parameter may also be a location range or an area defined by a set of coordinates. The geographic parameter may also be a straight-line distance between a location of a given sensor or device (e.g., camera, gunshot sensor, etc.) having captured an event and the location at which the event occurred. The geographic parameter may further be a radial distance from the given sensor's location to the location at which the event occurred. The distances may be specified in any suitable unit of distance such as meters, kilometers, miles, etc. In addition, the geographic parameter may comprise a direction (e.g., cardinal direction) to the location at which the event occurred. Each occurrence record may have one or more geographic parameters associated therewith.

By "trigger-based rule" or "trigger-based rule", it is meant a rule that may be triggered upon receiving an initial occurrence record that is associated with an event. The trigger-based rule may be triggered when the initial occurrence record corresponds to a given event type. The trigger-based rule may have at least one initial trigger event condition that when met by the initial occurrence record causes the trigger-based rule to be triggered. The initial occurrence record may need to have one or more parameters that meet the initial trigger event condition(s) in order for the trigger-based rule to be triggered. The initial trigger event condition(s) may be to confirm that the initial occurrence record of a certain type has certain parameters (e.g. for instance, if the initial occurrence record is a 911 call, the initial trigger event condition may be that the 911 call has a priority less or equal to "2"). The trigger-based rule typically comprises at least one condition that is used to generated one or more queries based on the initial occurrence record that triggered the trigger-based rule. The at least one condition may be verified after one or more occurrence records has been received by the system (e.g. the occurrence of an event or events meeting the conditions of the query) in response to the query. The at least one condition may be the verification of a value associated with a given occurrence record type. If the at least one condition of the trigger-based rule is determined to be true, a report and/or alert is generated. If the at least one condition of the trigger-based rule is false, no report and/or alert may be produced. The trigger-based rule may be set by a user using a user interface.

Exemplary Architecture of an Exemplary Monitoring System:

Reference is made to FIG. 1, illustrating an exemplary environment comprising an exemplary monitoring system 100 in communication with one or more data sources 112. The system 100 may be a server-based system (as shown in FIG. 1) in communication with one or multiple client devices 200. The system 100 may be a surveillance system, such as the area monitoring system described in U.S. Pat. No. 10,885,066, the contents of which are hereby incorporated by reference.

The system 100 has at least one processor 115, memory 116 and at least one input/output interface 114 for communication with one or more data sources 112, and/or an input/output interface 205 of the client device 200. The one or more data sources 112 may be one or more external database(s), one or more external systems, for example, having one or more databases, that are accessibly via Application Programming Interface (API) calls, and/or one or more local databases that are part of the system 100.

The system 100 may have an interface 114 for each of the data source 112. A separate I/O interface 114 may also be provided in system 100 for communicating with the I/O interface 205 of the client device 200.

The processor 115 may be a general-purpose programmable processor. In this example, the processor 115 is shown as being unitary, but the processor may also be multicore, or distributed (e.g. a multi-processor).

The computer readable memory 116 stores program instructions and data used by the processor 115. The computer readable memory 116 may also store local occurrence records, data on the trigger-based rules, acting as a local database. The memory 116 may also store information regarding the data source(s) 112 that are accessible by the system 100, such as the identity of the data sources, the configuration type of the data sources, the occurrence record type of the data sources, etc. (i.e. the database attribute data structures). The memory 116 may be non-transitory. The computer readable memory 116, though shown as unitary for simplicity in the present example, may comprise multiple memory modules and/or caching. In particular, it may comprise several layers of memory such as a hard drive, external drive (e.g. SD card storage) or the like and a faster and smaller RAM module. The RAM module may store data and/or program code currently being, recently being or soon to be processed by the processor 115 as well as cache data and/or program code from a hard drive. A hard drive may store program code and be accessed to retrieve such code for execution by the processor 115 and may be accessed by the processor 115 to store and access data. The memory 116 may have a recycling architecture for storing, for instance, occurrence records, data source and/or database coordinates, where older data files are deleted when the memory 116 is full or near being full, or after the older data files have been stored in memory 116 for a certain time.

The I/O interface 114 is in communication with the processor 115. The I/O interface 114 may include a network interface and may be a wired or wireless interface for establishing a remote connection with, for example, a remote server, an external data source 112, the client device 200, etc. For instance, the I/O interface 114 may be an Ethernet port, a WAN port, a TCP port, etc.

The processor 115, the memory 116 and the I/O interfaces 114 may be linked via bus connections.

The data source(s) 112 may be one or more remote server(s) including one or more databases. A data source 112, and in particular a database, may contain occurrence records, information, corresponding to at least one occurrence record type.

In some examples, the system 100 may have a local database stored, e.g., in memory 116, that contains occurrence records of at least one occurrence record type.

The client device 200 may be a remote computing device (i.e. client). The client device 200 is in communication with the I/O interface 114 of the system 100. The computing device 200 has a processor 204, a memory 216, an I/O interface 205 that may be linked via bus connections. The computing device 200 may have (or be connect to) any suitable I/O device(s) 218, for example, such as a keyboard, a mouse, etc. The computing device 200 may be a desktop computer, a laptop, a smartphone, a tablet, etc. The computing device 200 has (or is connect to) a display 217 (e.g. a screen, a tactile display, etc.). The processor 204, the memory 216 and the I/O interface(s) 205 may be similar to the processor 115, the memory 116 and the I/O interface(s) 114, respectively.

A client application program may be stored in memory of the computing device 200 that is associated with the system 100, the client application program providing the user with an interface to interact with the system 100.

In some embodiments, the system 100 may include at least one computing device 200, where, for instance, the connection between the system 100 and the computing device 200 may be a wired connection. In some embodiments, the functionality of the system 100 and the client device 200 may be implemented on a single computing device.

Figure 3A:
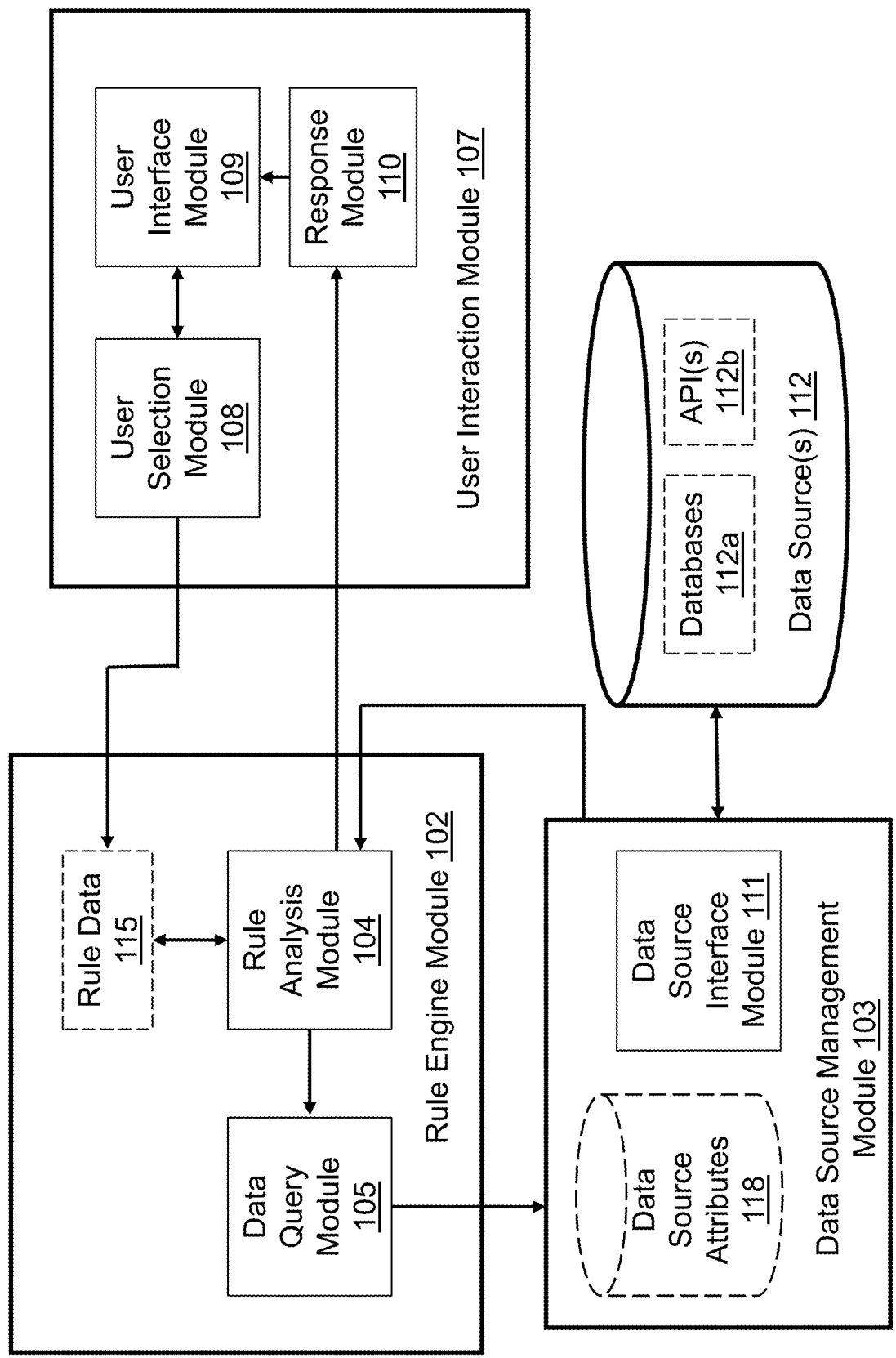
FIG. 3A is a block diagram of an exemplary software architecture of the exemplary server system and the exemplary computing device.

Exemplary Software Architecture of an Exemplary Monitoring System:

Reference is now made to FIG. 3A, illustrating exemplary software architecture of an exemplary monitoring system 100 and the client device 200.

The system 100 has program code, stored in memory 116 that includes a rule engine module 102 and a data source management module 103. The client device 200 has program code (i.e., the client application program), stored in memory 216 that includes the user interaction module 107. Each of the rule engine module 102, the data source management module 103, and the user interaction module 107 includes program code configured to implement the functionality of the modules as is described in this document. In some embodiments, the rule engine module 102, the data source management module 103 and the user interaction module 107, may be on a single computing device.

The user interaction module 107 may include various submodules, for example, such as a user interface module 109, a user selection module 108 and a response module 110. The data source management module 103 may include various submodules, for example, a data source interface module 111. The data source management module 103 may include data source attributes 118, which may be a database or other data structure. The rule engine module 102 may include various submodules, for example, such as a data query module 105 and a rule analysis module 104. Each of the submodules of the correlation engine module 102, the data source management module 103, and the user interaction module 107 comprises program code configured to implement the respective functionality of these submodules.

The user interface module 109 provides a graphical user interface (GUI) on the client device 200. The GUI may provide the user with a set of options enabling the user to define one or more trigger-based rules. The trigger-based rule may initiate a query that is set off by the satisfying of a condition set in the trigger-based rule, or that is a prerequisite for initiating the trigger-based rule. Once the trigger-based rule is set by the user, the trigger-based rule may be transmitted from the computing device 200 to the memory 116 of the system 100, and stored in memory 116. For example, the condition may be the reception of an occurrence record corresponding to a particular event type, such as a CAD call event and where the call priority level of the CAD call event corresponds to a certain level. In some embodiments, the GUI may provide the user with a list of trigger-based rules that have already been set, where the user may select one or more of the trigger-based rules that are stored in memory 116. A selection may be to "activate" the trigger-based rule. Upon activation, the trigger-based rule is then active, and upon reception of an occurrence record that satisfies the condition of the trigger-based rule, the trigger-based rule may then be executed by the processor 115.

The user selection module 108 obtains the user's selection of the trigger-based rule, which may include activation of existing trigger-based rules or setting up new trigger-based rules. The user selection module 108 provides the user's selections to the rule engine module 102. The trigger-based rule selection may include an identifier of the trigger-based rule that has been selected by the user.

The rule engine module 102 receives the rule selection from the user, and stores any new trigger-based rule in the rule data 115 (e.g. a database that includes information on the different trigger-based rules) and/or activates any existing trigger-based rules that are set to be active.

Upon reception of the occurrence record, e.g., from the data source management module 103 or from an external source (e.g. external database or external system), the rule analysis module 104 may query the rule data 115 to identify one or more trigger-based rules that are related to the occurrence record (e.g. that include a condition that is met by the characteristics of the received occurrence record, such as the event type associated with the occurrence record, the time parameter and/or geographic parameter of the received occurrence record). The corresponding trigger-based rule is retrieved from the rule data 115 and the trigger-based rule is executed. The rule analysis module 104 then calls the data query module 105 to generate a query based on the executed trigger-based rule.

The data source interface module 111 may receive the query in a native format of the system 100, adapts the format of data, query or queries transmitted to a data source 112 (e.g., a database 112a) to the format and/or configuration of the specific data source 112. The data source interface module 111 may also adapt the format and/or properties of the occurrence records transmitted from the data source 112 such that they may be received and analyzed by the rule engine module 102. In some examples, the data source interface module 111 may be an application programming interface (API) for interfacing with an API 112b of an external data source.

The data source attributes database 118 contains information on the different data sources 112 that may be queried by the system 100. A data source attribute data structure for each data source (e.g., database or API) that may be queried by the system 100 may be stored in the data source attribute database 118. The data source attribute data structure (e.g. a record) for each data source 112, stored in the database attributes database 118 may contain, but is not limited to: the configuration of the data source (the properties of the database or API); the occurrence record type stored in the database; a list of fields stored in an occurrence record stored (e.g. for a criminal database: a string for the eye colour, a string for the height, the hair colour, an age which is an integer; date of registration in the database which is a timestamp, etc.); a time value indicative of when the data source was added to the data source attribute database 118; the identity of the data source in charge of the database (i.e. in the case of an external database, the database may be managed by an entity other than the one managing the system 100); and/or the coordinates of the data source (e.g. a GUID that e.g., identifies the role of the database in the system 100). Additionally, the data source attributes database 118 may contain information about how to render the record in the user interface module 109, for example icons, text and fields to display.

The data source attributes 118 produces a mapping of the different data source(s) 112, where the mapping can be accessed by the data source management module 103 to identify the data source(s) 112 to be queried as a function of a query.

The data source interface module 111 may receive the various coordinates for the data source(s) 112 to be queried and generate a query to be transmitted to the data source(s) 112 corresponding to the query.

The data source interface module 111 may be part of the rule engine module 102, or may be separate from the rule engine module 102. The data source interface module 111 may be part of the data query module 105 or the functionality of the data source interface module 111 may be implemented by the data query module 105. There may be a data source interface module 111 for each of the data sources 112 that can be queried by the system 100. The data source interface module 111 receives the query from the data query module 105 and adapts the query to the format of the data source(s) 112 to be queried. This is because each data source may have specific properties and configurations, and the query generated by the correlation query module 105 may not be compatible with the external data source(s) 112. The data source interface module 111 then transmits the adapted query to the data source(s) 112.

Each query generated may include the data source and/or occurrence record type to be queried. Each query generated may include one or more time parameters to further limit the occurrence records retrieved by processing the query to those that correspond to the time parameter(s). For example, the time parameter(s) that have been defined in the trigger-based rule may form the basis for the query. Each query may also include a geographic parameter to further limit the occurrence records retrieved by processing the query to limit search results to those that correspond to the geographic parameter of the triggering occurrence record. The geographic parameter may be, e.g., a specific set of coordinates defining a precise location, an area, perimeter, or region defined by a set of sets of coordinates, a specific set of coordinates defining a precise location and a radius value indicative of a radius around the precise location, etc., defined in the trigger-based rule that is the basis for the query. It will be understood that the query may include other parameters to further identify the occurrence records to be retrieved by processing the query.

The data source interface module 111 may also receive a set of occurrence records from the data source(s) 112 corresponding to the query (or queries) and transmit the set of occurrence records to the rule analysis module 104, such that the rule analysis module 104 may process the set of occurrence records and/or may verify that the conditions of the trigger-based rule have been met. In some cases, the set of occurrence records from the data source(s) 112 corresponding to the query may be transmitted from the data sources to the rule engine module 102 without the data source interface module 111 and/or data source management module 103. The occurrence records from the data source(s) 112 may correspond to records meeting the one or more time parameters, one or more geographic parameters of the query or queries and/or any other parameters of the query or queries, and as such verification that the conditions of the query is met may not be needed.

The rule analysis module 104 may process the received set or sets of occurrence records from the queried data sources(s) 112 as a function of the conditions of the query.

The rule analysis module 104 processes the received occurrence record(s), and may verify if the conditions of the executed trigger-based rule are met. If the conditions of the trigger-based rule(s) are met, the rule analysis module 104 may generate a command to generate one or more actions, e.g., at one or more computing devices, such as the computing device 200, based on the executed trigger-based rule(s). It will be understood that other computing devices than the one that initiated the trigger-based rule selection, may be the target of the action. For instance, the trigger-based rule selection may be performed at a computing device that is associated to a surveillance system. However, the action (e.g. for generating an alert) may be transmitted to one or more emergency vehicles (such as ambulances, police cars, etc.) to cause a dispatch of the vehicles, e.g., to a location of interest.

The action is one that is defined in the trigger-based rule, and may be a command to generate an alert on a computing device (such as computing device 200). The alert may be a message appearing on the display of the computing device, an audio signal and/or a vibration signal generated by the computing device, to alert the user of the computing device. The message may include information to inform the user of the computing device to the nature of the alert, such as by providing information on the nature of the alert (e.g. bomb threat, gunshot, threat in airport, requirement for an ambulance, etc.) and geographic parameters (e.g. a location for instance, of a bomb threat, of a home of an individual who requires an ambulance, etc.).

In some embodiments, the rule engine module 102 may have access to, or include in an internal data source, a data structure of identification information (e.g. telephone numbers of computing devices that are smartphones, IP addresses, etc.), as well as the nature of the owner of the computing device (e.g. a police officer, a private firm security officer, a dispatcher at a CAD center, an ambulance driver, a firefighter, etc.) that can be queried in order to generate the command to generate an action by the rule analysis module 104. The command may then include information with regard to which computing device to send the action (i.e. the destination of the command). As a result, the command is transmitted to the one or more appropriate computing devices by, e.g., including the corresponding one or more addresses of the one or more appropriate computing devices.

The response module 110 may receive the command to generate an action received from the rule analysis module 104, and may cause the generating of the corresponding action (e.g. vibration of the computing device, generating of the message on the display of the device, generating an audio signal, etc.). In some examples, the rule analysis module 104 may also transmit data to the response module 110 indicative of which of the trigger-based rules has been triggered and satisfied. The response module 110 may instead receive that data on the triggered and satisfied rule, the response module 110 causing the generation of a message on the display of the computing device 200 indicative of the trigger-based rule that has been triggered and satisfied. The response module 110 may be located on a server. For example, the action of moving cameras towards a location may be handled by the server managing the specified camera.

In some embodiments, the one or more computing devices receiving the command from the rule analysis module 104 does not include a user interaction module 107. In these examples, the command may interact with the operating system of the one or more computing devices to cause the operating system of the one or more computing devices to generate the appropriate action. The various modules and/or submodules in FIG. 3A may vary, may be combined and/or may be omitted where appropriate to do so.

The command is to trigger a phone call, it will be understood that the computing device may be a telephone (not necessarily a smartphone).

Figure 3B:
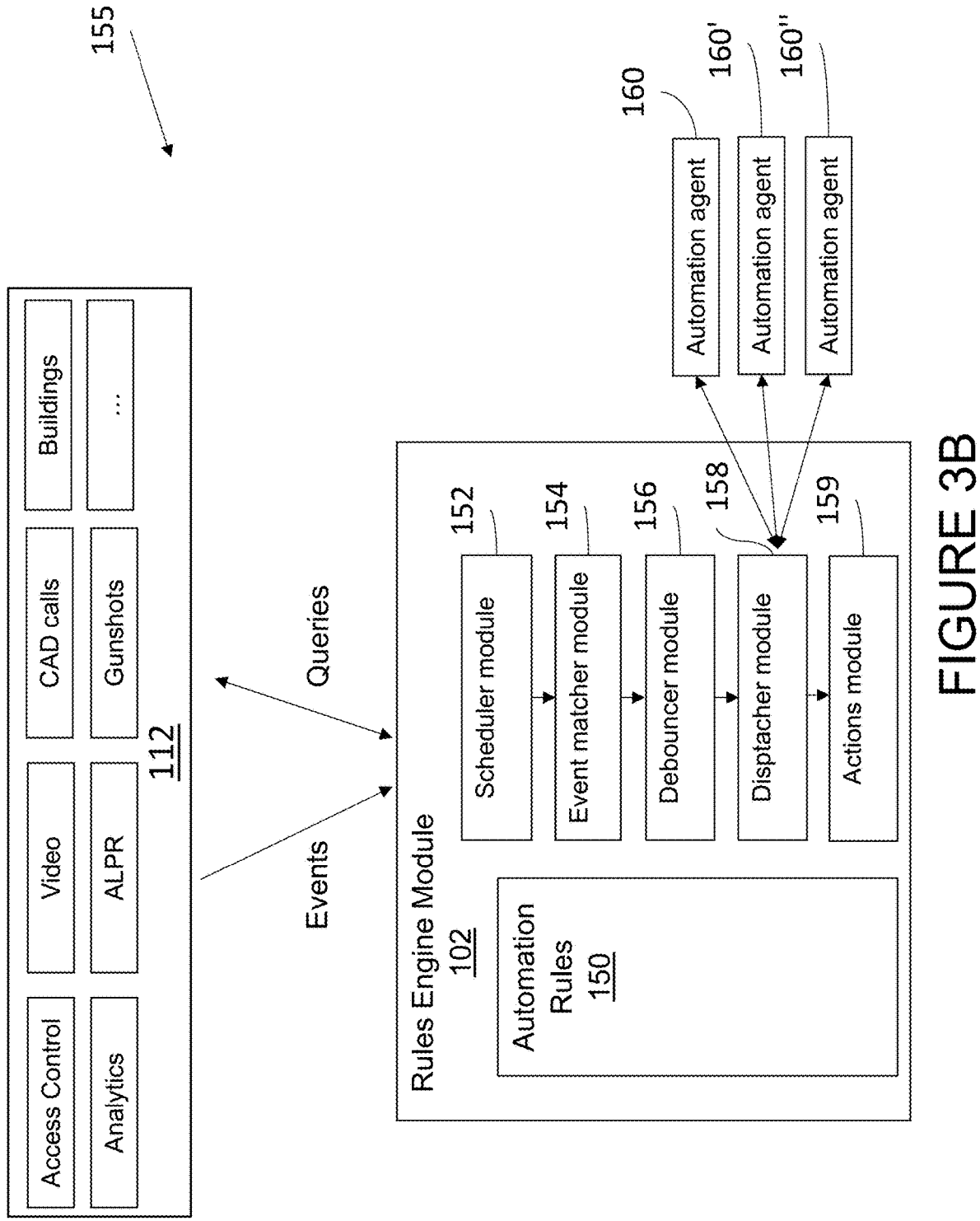
FIG. 3B is a block diagram of another exemplary software architecture.

Another Exemplary Software Architecture of an Exemplary Monitoring System:

With reference to FIG. 3B, there is illustrated another embodiment of a monitoring system 155. The monitoring system 155 may correspond to the system 100. As illustrated in FIG. 3B, the data sources 112 may include various types of sources, including access control systems, video monitoring systems, CAD systems, as well as calls made thereto, building monitoring systems, analytics systems, automated license plate recognition (ALPR) systems, gunshot monitoring systems, and the like. The data sources 112 are configured for interacting with the rules engine module 102 in at least two different capacities. First, the data sources 112 may provide indications of live or real-time events as they occur, in the form of occurrence records. The term "event" is used in describing the exemplary monitoring system 155 and may correspond to "occurrence record". One or more of the data sources 112 may produce a stream of live events which is provided to or otherwise accessible by the rules engine module 102. For example, when a new CAD call is obtained by a CAD system, the CAD system may input an entry into the stream to inform the rules engine module 102 of the new CAD call. In some embodiments, the CAD system may also update a record or other database to reflect the obtention of the new CAD call, for instance to inscribe a narrative regarding the new CAD call, to update a state of the new CAD call, or the like. Second, the data sources are configured to respond to queries obtained from the rules engine module 102. The queries may be issued at various times, as appropriate, and can be structured in any suitable fashion. For example, the rules engine module 102 can query the data sources 112 for a listing of all CAD calls obtained by the CAD system at or within a certain location, at a particular time or within a particular time frame, or the like.

When information regarding an event is obtained by the rules engine module 102, for instance as provided by the data sources 112 (e.g., via the live event stream), the rules engine module 102 routes the event through a pipeline or other processing system to determine how the event is to be treated. The pipeline is composed of a scheduler module 152, an event matcher module 154, a debouncer module 156, a dispatcher module 158, and an actions module 159. It should be understood that the functionality attributed to each of the scheduler module 152, an event matcher module 154, a debouncer module 156, a dispatcher module 158, and an actions module 159 may overlap, and that, in some embodiments, functionality attributed to one of the modules of the rules engine module 102 may be performed by one or more of the other modules, as appropriate.

The scheduler module 152 provides the automation rules (also referred to as "trigger-based rules" in the present disclosure) currently active within the rules engine module 102. For example, from a listing of all automation rules available to the rules engine module 102, the scheduler module 152 will determine which rules are currently active based on a current time. In this fashion, automation rules which are not meant to be active at the current time are not used to process the event. The schedules used for the automation rules can be based on particular time ranges, on sunrise/sunset ranges, which may vary based on time zone and/or daylight savings time rules, on date ranges and/or ordinal dates, or the like.

The event matcher module 154 is configured for extracting a type of the obtained event, and to filter the currently active automation rules as provided by the scheduler module 152 which match the event type. The event matcher module 154 is also configured for extracting the fields from the event and to implement any conditions specified in the fields for the event. The available conditions may depend on the types of fields included in the event, which may also rely on the use of regular expressions and/or optical character recognition (OCR) equivalences for the purposes of comparison. When the conditions for a particular event are met, the event in question, as well as the associated rule, are provided to the debouncer module 156.

The debouncer module 156 is configured for ensuring that a same rule is not triggered multiple times within a certain time period. In some embodiments, the time period may be a predetermined time period, for instance based on the nature of the event and/or the nature of the rule invoked. For instance, multiple updates to an event relating to a new CAD call may be made in a short period of time (e.g., a few seconds, a few minutes, or the like). Within that time period, it may not be desirable for the same rule relating to the new CAD call to be triggered multiple times. The debouncer module 156 may therefore compare incoming events and rules from the event matcher module 154 to determine whether duplicate event-rule pairs have been received from the event matcher module 154 within a certain time period, and withhold certain events and the associated rules accordingly. When the debouncer module 156 determines that a particular event and associated rule are not duplicates, they are passed on to the dispatcher module 158.

The dispatcher module 158 obtains events from the debouncer module 156, and is configured for monitoring the workload of a plurality of automation agents 160, 160', 160", which are used to automate tasks, and to dispatch tasks to the automation agents 160, 160', 160" in response to obtaining new events from the debouncer module 156. The dispatcher module 158 may maintain queues of tasks to be performed based on newly-obtained events, and dispatch the tasks as one of the automation agents 160, 160', 160" becomes available. Additionally, the dispatcher module 158 is configured for instantiating new automation agents when resources are available, or for shutting down unneeded automation agents when appropriate. For simplicity, the following disclosure will focus on describing the automation agent 160, though it should be understood that the other automation agents 160', 160" may be implemented in substantially similar fashion to the automation agent 160. Additionally, although illustrated in FIG. 3B as including three automation agents 160, 160', 160", it should be understood that the dispatcher module 158 may assign tasks to any suitable number of automation agents, as appropriate.

Figure 3C:
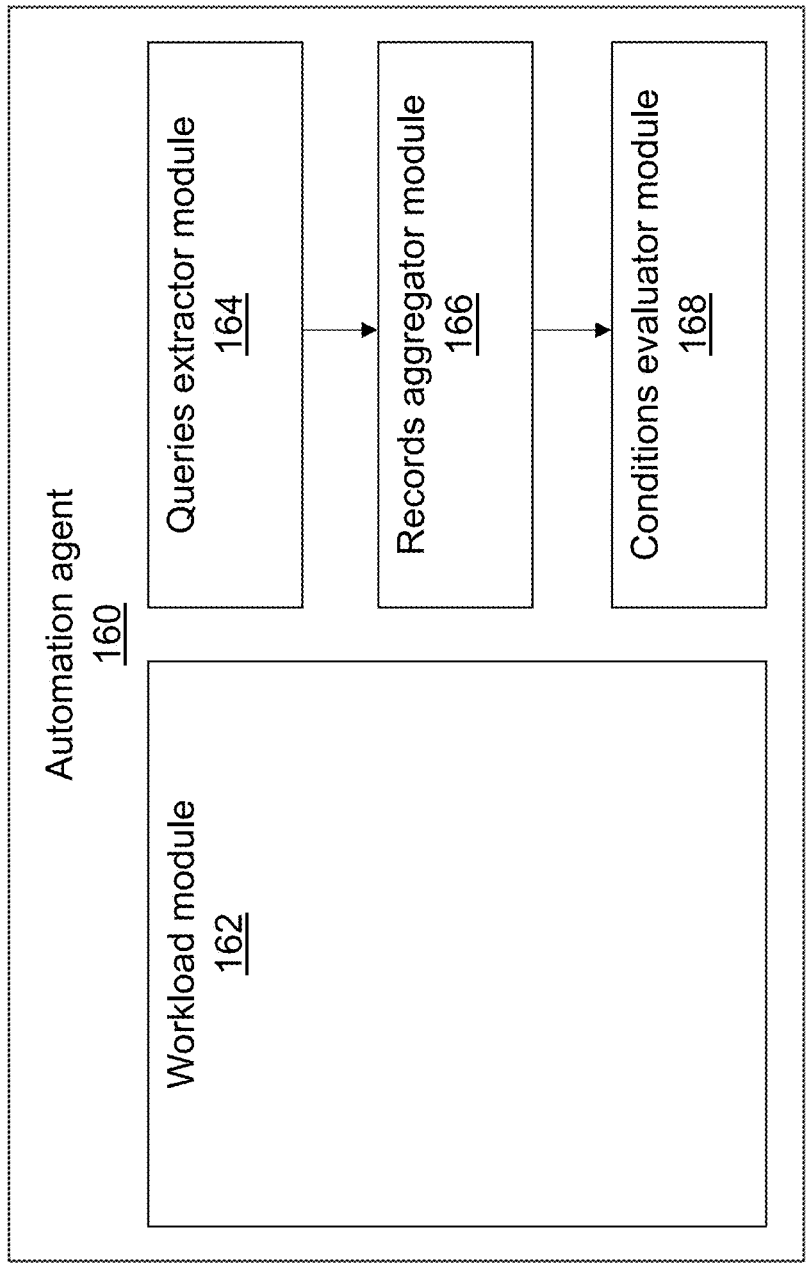
FIG. 3C is a block diagram of the automation agent of FIG. 3B.

With additional reference to FIG. 3C, the automation agent 160 is structured to run on particular servers, for instance separately from the remainder of the monitoring system 155, whether on a one-to-one basis, or on a manyto-one basis, due to the resource intensiveness of the operation of the automation agent 160 (i.e., large computer memory requirements). The automation agent 160 is composed of a workload module 162, a queries extractor module 164, a records aggregator module 166, and a conditions evaluator module 168. The workload module 162 implements a queue of tasks to execute, which are provided by the dispatcher module 158. It should be understood that the functionality attributed to each of the workload module 162, a queries extractor module 164, a records aggregator module 166, and a conditions evaluator module 168 may overlap, and that, in some embodiments, functionality attributed to one of the modules of the automation agent 160 may be performed by one or more of the other modules, as appropriate.

Once a task is ready for execution, the workload module 162 provides the task to the queries extractor module 164. The queries extractor module 164 is configured for identifying a conditions tree relating to the event and/or to the rule which relate to the task. By way of an example, the queries extractor module may obtain a conditions tree relating to detecting the possibility of a pyromaniac in a particular locality. The tree of conditions may include identifying the occurrence of "FIRE" type events occurring multiple times (e.g., more than twice) within a predetermined radius (e.g., within 5 miles) and within a predetermined timeframe (e.g., within 4 hours). Thus, upon receiving a task relating to a FIRE event (e.g., obtained from a CAD call), the queries extractor module 164 will identify that a search to identify other events, matching the tree of conditions identified in this example, should be performed. This same query may be re-identified for evaluation every time a FIRE event is obtained.

The records aggregator module 166 is configured to execute the queries identified by the queries extractor module 164, and for merging all records identified in response to the query. By way of an example, the queries extractor module 164 may identify that the pyromaniac-related tree of conditions should be queried based on the receipt of the new FIRE type event received. The records aggregator module 166 will then perform the query and aggregate all the records found which match the tree of conditions in question. In some embodiments, the records aggregator module 166 is also configured for removing duplicate records, for instance if multiple of the data sources 112 return results which relate to the same event. Additionally, in some embodiments, the records aggregator module 166 is configured for including, as part of the aggregated results, the newly-obtained event, that is to say, the event which caused the rule to trigger and resulted in the query being performed. Indeed, due to timing issues, it may occur that a data source 112 may report a live event as part of its live event feed, but not have the event stored in a relevant database, and thus may not be reported by the data source 112 when queried by the records aggregator module 166.

The conditions evaluator module 168 is configured for processing the tree of conditions on the aggregated records obtained from the records aggregator module 166. To do so, the conditions evaluator module 168 may obtain the information about time, location, and the like, relating to the aggregated events and execute the tree of conditions identified by the queries extractor module 164. This may include comparing the information about time, location, and the like to the conditions specified in the tree of conditions to evaluate whether the records obtained from the records aggregator module 166 satisfy the conditions. When the conditions of the tree of conditions are met, a "hit" (e.g., confirmation of the conditions being met) may be issued by the automation agent 160 to the dispatcher module 158 (or to the rules engine module 102 more generally). The hit may include a listing of all the records identified by the records aggregator module 166, the particular rule which caused the hit, the event which triggered the query, and the like.

With continued reference to FIG. 3B, when a hit is identified by the automation agent 160, the actions module 159 will trigger one or more actions based on the hit and the related automation rule. Different types of actions are considered, depending on the type of hit and the related automation rule: in some instances, an action may include issuing a message to certain recipients to take certain actions or the like. The recipient may be one or more computing systems, one or more operators thereof, one or more authorities, or the like. By way of an example, an action performed by the actions module 159 may include sending an email or other type of alert (e.g., a text message, voice message, etc.) to a group of users. By way of another example, an action performed by the actions module 159 may include causing a video feed to be displayed on a particular display, such as a video wall or a screen of a particular computer. In some embodiments, the recipients of the message may be determined dynamically, for instance based on the names of users indicated in the records accompanying the hit, from the rule, by their location of their mobile devices, etc.

By way of an example, a stolen car detection rule may be triggered in response to obtaining an "LPR" event, which occurs when a particular licence plate is read by an LPR system (as part of the data sources 112). The dispatcher module 158 may initiate a task relating to a stolen car search on the automation agent 160. The queries extractor module 164 determines a query to be run based on a particular licence plate identifier (e.g., the one detected by the LPR event), a frequency of the events, as well as the time and location where the events occurred. The records aggregator module 166 may then aggregate the relevant records, and when the conditions are met (as per the conditions evaluator module 168), the automation agent 160 issues a hit to the rules engine module 102 with the relevant associated information. Upon obtaining the hit (or being otherwise made aware thereof), the actions module 159 may identify vehicles, cameras, or other devices operatable by a relevant authority within a certain perimeter of the LPR event (e.g., 100 meters). The actions module 159 may issue messages to the devices indicative of the presence of a nearby hit (e.g., "Hit of license plate identifier XXX 123 near you"), instructing the devices to begin recording media, or the like. For instance, the actions module 159 may issue messages to all cameras within a 500 meters radius of a "GUNSHOT" event instructing them to begin recording footage in the direction of the gunshot (e.g., by providing the cameras with the approximate location of the gunshot, or the location of the device which detected the gunshot).

Figure 4:
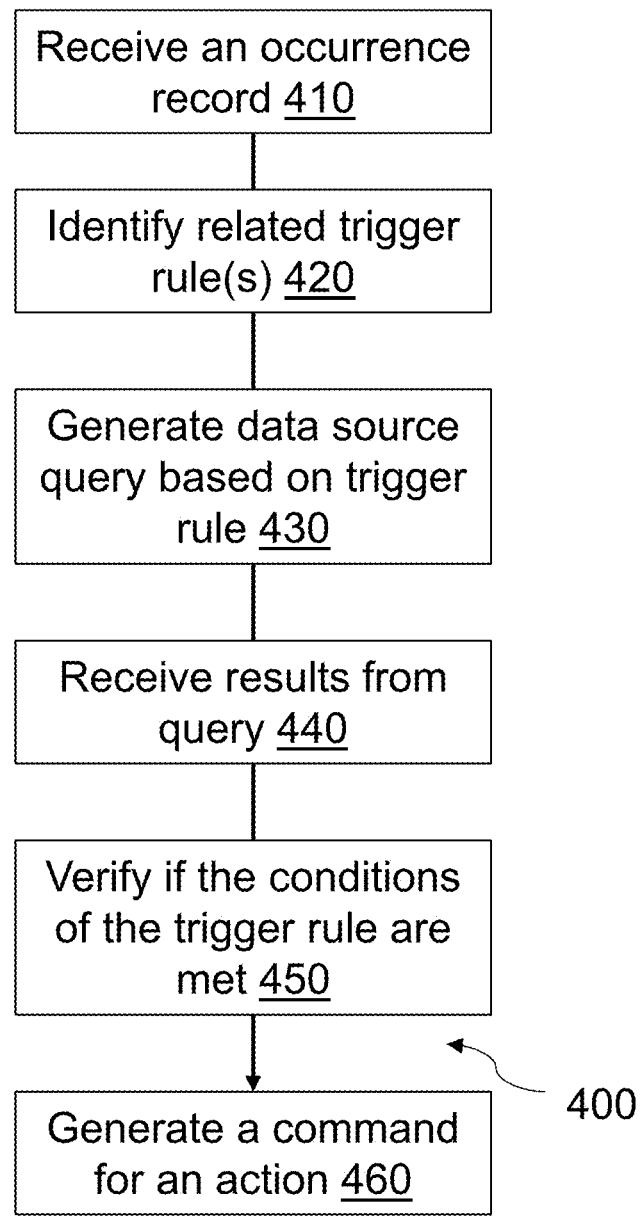
FIG. 4 is a flowchart diagram of an exemplary method of generating a command for an action based on the execution of a trigger-based rule caused by the reception of an exemplary occurrence record.

Exemplary Method of Generating a Trigger-Based Command by an Exemplary Monitoring System:

Reference is now made to FIG. 4, illustrating an exemplary method 400 of generating a command for an action based on a trigger-based rule associated with a received occurrence record. For illustrative purposes, reference is made to monitoring system 100 and computing device 200. However, it will be understood that other monitoring systems and/or computing devices may be used without departing from the present teachings.

An occurrence record is received at the monitoring system (e.g. rule analysis module 104, the monitoring system 155, etc.) at step 410. The occurrence record has an event type, and may have a geographic parameter, and may have a time parameter. The event type is the nature of the event, captured by a device such as a sensor, received by a call center, etc., on which the occurrence record is based, such as a CAD call, a licence plate read, a gunshot identification, etc.

The occurrence record is analyzed based on one or more active trigger-based rules (i.e. trigger-based rules that are being regularly verified when an occurrence record is received) stored in memory, e.g., of the system 100 (e.g. memory 116). One or more trigger-based rules corresponding to the received occurrence record are identified at step 420. The trigger-based rules may have an initial or trigger condition that is to be met in order to execute the trigger-based rule. For instance, the initial condition of the trigger-based rule may be a match with a particular event type. For example, if the initial condition may be that the occurrence record has an event type that corresponds to a "licence plate read event". Upon verifying that the initial condition of the trigger-based rule is satisfied, the trigger-based rule is executed. Setting an initial condition for the occurrence record reduces processing power of the resources involved, as the remainder of the trigger-based rule is only carried out when the initial condition is met. In some embodiments, the received occurrence record is filtered based on event type and then the occurrence record is compared to any trigger-based rules of that event type to see if the initial condition of any of these filtered trigger-based rules applies. For example, if the received occurrence record pertains to a CAD call event and has a high priority level, the occurrence record could be compared to filtered trigger-based rules that pertain to CAD call events, and one of those trigger-based rules may have the initial condition that the priority level is high.

Upon identifying that the initial condition is met for the trigger-based rule, the trigger-based rule is then executed. The trigger-based rule establishes one or more conditions and/or steps that are to be met and/or completion. Upon satisfying the one or more conditions and/or completing the one or more steps, the trigger-based rule results in the generating of a command for an appropriate action.

It will be understood that the reception of an occurrence record may trigger the execution of a plurality of trigger-based rules, when each of the executed trigger-based rules may have an initial condition that is satisfied by the received occurrence record. In these examples, each of the trigger-based rules may be executed in parallel.

The execution of the trigger-based rule may require obtaining additional information (e.g. occurrence records) that are stored in one or more data sources, where the received occurrence record is correlated to one or more other occurrence records and/or data stored in the one or more data sources. In order to obtain the additional information, a query is generated at step 430 by the data query module 105, the query defined based on the trigger-based rule to retrieve the necessary data appropriate to verify that the conditions of the trigger-based rule are met.

The queried data (e.g. occurrence records) is received by the system 100 (e.g. the rule analysis module 104).

The queried data is then analyzed by the system 100 (e.g. the rule analysis module 104) based on the trigger-based rule to verify if the one or more conditions of the trigger-based rule are met by the queried data, and, in some cases, the initially-received occurrence record at step 450. For instance, if the trigger-based rule includes conditions that:

3 CAD call events of priority "high" have occurred;
that the 3 CAD calls have occurred during the past 15 minutes; and
that the 3 CAD calls have occurred within an area of 1 $km^2$;

then, the required data, in the form of other occurrence records corresponding to CAD call events, each having a geographic parameter and a time parameter, are analyzed to establish that they satisfy the condition of the executed trigger-based rule.

Once the conditions of the trigger-based rule have been satisfied, and/or the steps of the trigger-based rule have been completed, a command for an action based on the executed trigger-based rule is generated at step 460, the command for an action transmitted to one or more computing devices, such as computing device 200. For instance, with regard to the example of the 3 CAD calls, the action may be to generate an alert that is directed to one or more computing devices associated to respectively one or more police officers.

When the command is to be transmitted to one or more computing devices, the system (e.g. rule engine module 102) may generate a query to retrieve from memory (e.g. memory 116 or an external memory, such as that associated with the system of the relevant authorities) to obtain identification information of the one or more computing devices to which the action is to occur. Such identification information may include the address of the computing device(s), the name of the user(s) of the computing device(s), the rank or position of the user(s) of the computing device(s). The identification information enables the system 100 to transmit the command for the action to the appropriate one or more computing devices, as well as include any necessary identification information to identify or address the user(s) of the one or more computing devices.

The command for the action is then transmitted by the monitoring system to the one or more relevant computing devices.

Reference will now be made to exemplary implementations of the method as described herein performed by the monitoring system. It will be understood that the following examples are for illustrative purposes, and that other implementations are possible in accordance with the present teachings.

Figure 5:
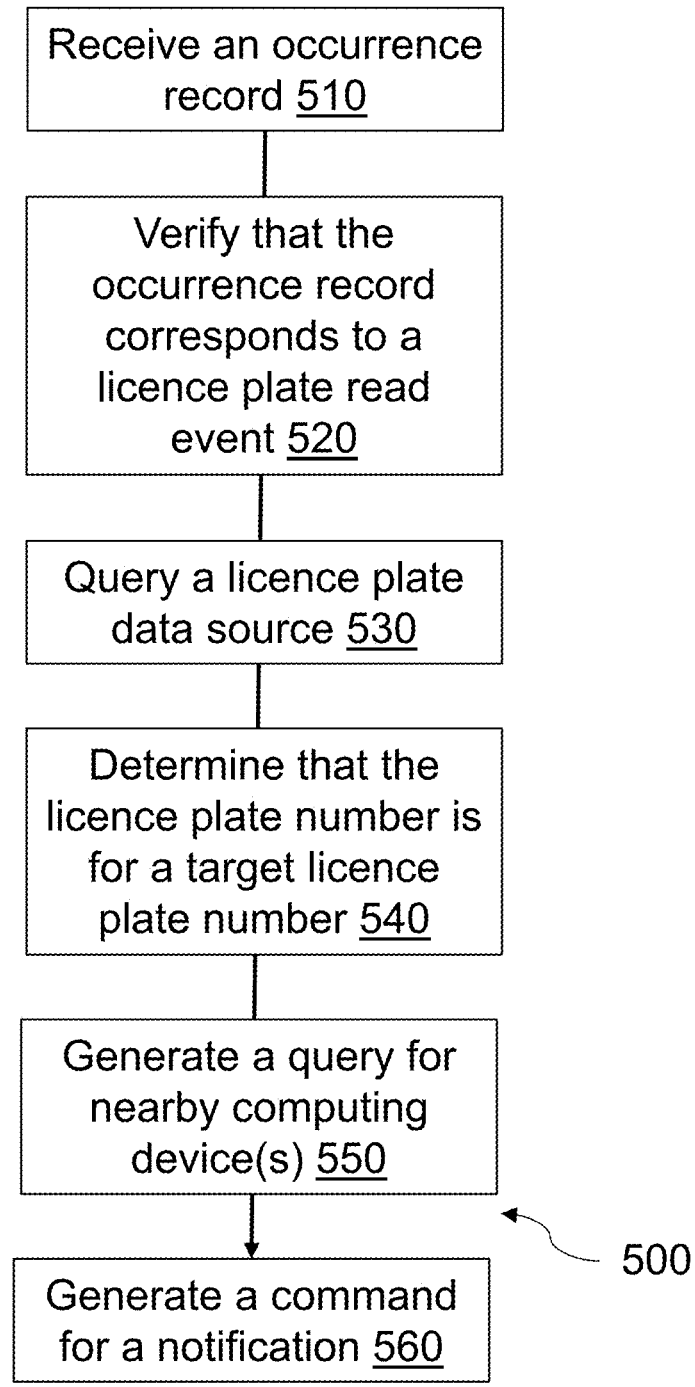
FIG. 5 is a flowchart diagram of an exemplary method of alerting one or more portable computing devices of a presence of a nearby target vehicle by a monitoring system.

Example 1: Alerting One or More Portable Computing Devices of a Presence of a Nearby Target Vehicle by a Monitoring System Reference is made to FIG. 5, illustrating an exemplary method 500 for identifying a target licence plate number associated with a target vehicle, and generating a command for an alert that is transmitted to the relevant authorities (e.g. police officers). The target vehicle may correspond to a stolen vehicle, or to a vehicle that is owned by a criminal, a celebrity, a politician, etc.

Figure 18A:
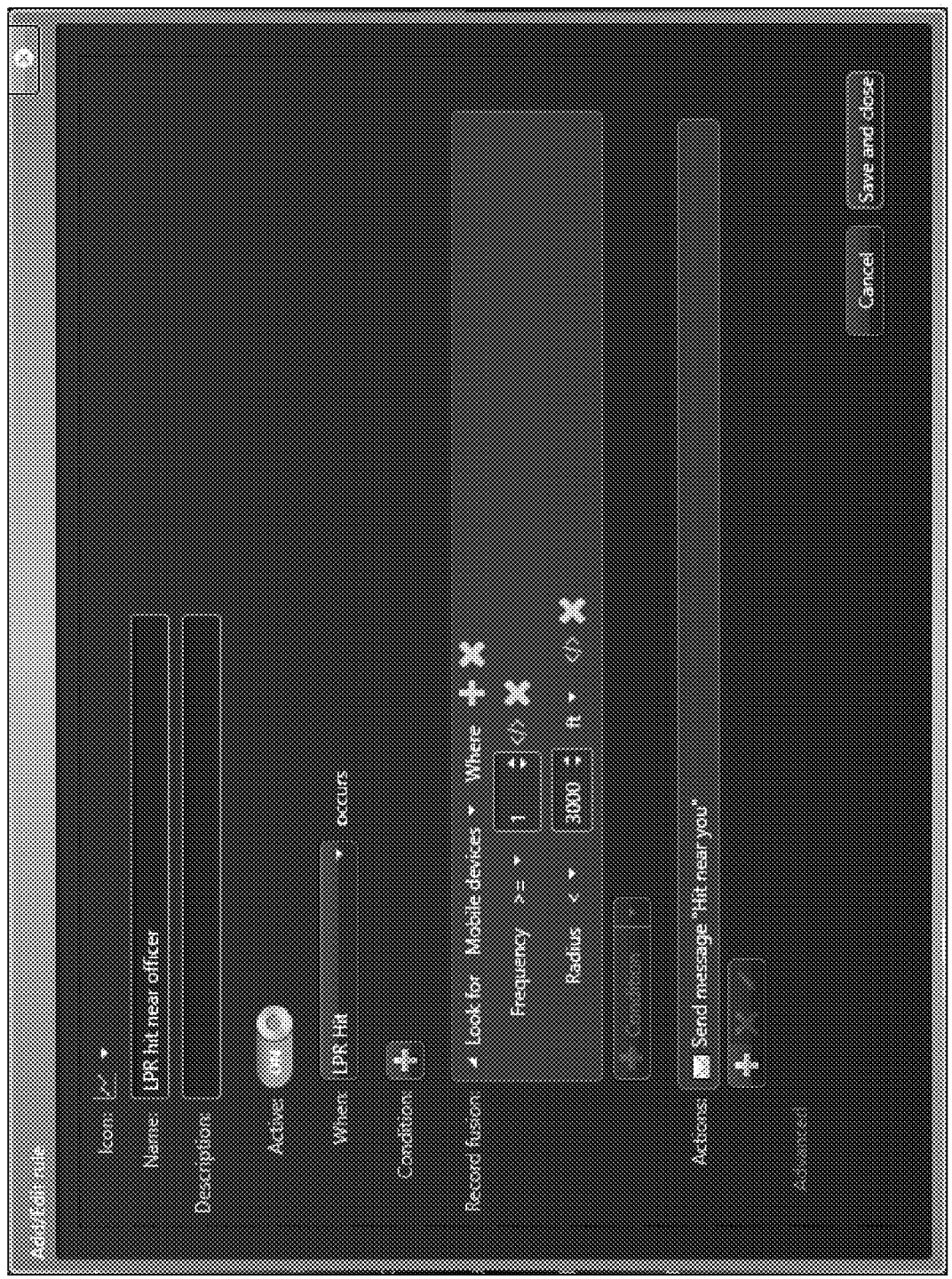
FIG. 18A is an example of a graphical user interface showing the properties of an exemplary trigger-based rule for alerting one or more portable computing devices of a presence of a nearby target vehicle by a monitoring system.

The method 500 may correspond to a trigger-based rule as defined herein, and for exemplary purposes, an example of the trigger-based rule is illustrated at FIG. 18A, having as an initial condition that that occurrence record have an event type that corresponds to that of a licence plate read event, or to that of a licence plate read event corresponding to a target licence plate number or a target licence plate number event. Therefore, method 500 defines a series of steps leading to the execution the trigger-based rule and corresponding to the execution of the trigger-based rule.

An occurrence record is received by the monitoring system at step 510.

The data of the occurrence record is verified to determine that the occurrence record has an event type that corresponds to a licence plate read at step 520, thereby causing the execution of the trigger-based rule corresponding to the initial condition.

The occurrence record corresponding to a licence-plate read event is associated with a camera, such as a Licence Plate Recognition (LPR) camera, that performs the licence plate read. In some embodiments, the camera may be a normal camera, where a third-party system or the monitoring system 100, receives the images from the camera, and performs object recognition of the images of the camera to identify a licence plate and output a licence plate number. In some examples, the occurrence record corresponding to the licence plate read event includes one or more of a licence plate image of the licence plate, a context image of a vehicle with the licence plate corresponding to the licence plate read, a make of the vehicle, a model of the vehicle, a year of the vehicle, dimensions of the vehicle, colour of the vehicle, speed, etc.

A query is then generated to one or more data sources at step 540 including occurrence records for licence plate read events, for including information on target licence plate numbers for target vehicles.

In some embodiments, the query is generated with the license plate number from the occurrence record, and the data returned from the query indicates if the license plate number of the occurrence record corresponds to a target license plate number or not, and may include additional data pertaining to the target vehicle corresponding to the target license plate number when the license plate number of the occurrence record corresponds to the target license plate number. In some embodiments, upon receiving the queried data on the target licence plate numbers, the licence plate number of the licence plate read event is compared to the target licence plate numbers of the queried data. The licence plate number of the target licence plate may be parsed, and the string of character of the licence plate number may be compared to the string of characters corresponding to the target licence plate numbers. Correspondence between the licence plate number of the occurrence record and a target licence plate number may require that both licence plate numbers be identical. In other examples, correspondence between the licence plate number of the occurrence record and a target licence plate number may require that both licence plate numbers be similar.

A search is performed to retrieve one or more identifiers of one or more computing devices that are within a pre-determined perimeter determined from the location of the camera that is the basis for the licence plate read event of the occurrence record. The search may be performed when the licence plate number of the occurrence record corresponds to one of the target licence plate numbers. Alternatively, the search for the identifiers of the one or more computing devices that are within the pre-determined perimeter may be performed in parallel to the search for a target license plate number. The search for the one or more identifiers may include coordinates defining the perimeter, or may be defined as a radius of a disc with the location of the camera being the center of the disc. In some examples, the pre-determined perimeter may be set by a user by selecting an area on a map, e.g., using the user interface module 108.

The search may query a database of computing devices associated with a relevant authority (e.g. a local police force), the database including the location information (e.g. geolocation date, i.e. GPS coordinates) of the corresponding computing devices. In other examples, the search may send a request to a series of computing devices, e.g., associated with the monitoring system, to return location information of the computing devices. In some cases, the computing devices associated with the monitoring system may be periodically transmitting their geographical location to the monitoring system.

The received location information of the computing devices is analyzed to determine the one or more computing devices that are within the pre-determined perimeter. The location of the camera from the occurrence record and/or the pre-determined perimeter may be compared to one or more locations of the one or more computing devices to determine which ones of the one or more computing devices that are within the pre-determined perimeter. An identifier of the one or more computing devices that are within the pre-determined perimeter may then be obtained.

Figure 18B:
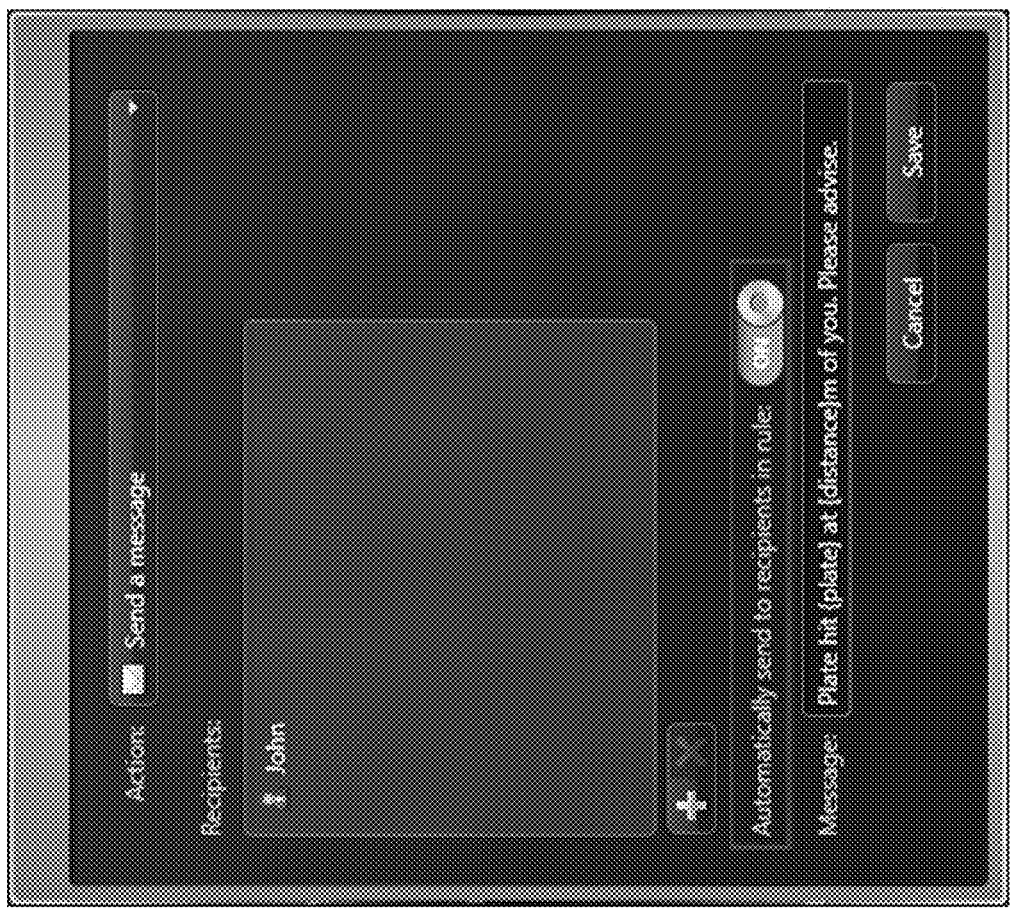
FIG. 18B is an example of a graphical user interface showing a window to set a message to be sent as an alert of a presence of a nearby target vehicle by a monitoring system.

A command is then generated, at step 560, to send to each of the one or more computing devices located in the pre-determined perimeter, to cause the generation of a notification on each of the one or more computing devices (setting an exemplary notification is shown at FIG. 18B). The notification includes the licence plate number corresponding to the initially received occurrence record, and alerts the users of the one or more computing devices of the possible presence of the target vehicle corresponding to the target licence plate in a vicinity that is near the location of the user of the computing device.

In some embodiments, the one or more computing devices are configured for running an application associated with the monitoring system. For example, the monitoring system may be running Genetec™ Security Center and the computing device(s) is/are running the Genetec™ Mobile Application associated with Genetec™ Security Center. In some examples, the one or more computing devices are computing devices 200, running an application program including the user interaction module 107. The command to generate an alert may be sent to the one or more computing devices through the respective application program running on the computing device, through the monitoring system. For example, the alert may be sent through the response module 110, where the notification may be generated, for instance, by the user interface module 109 by executing the command for generating the action.

In some examples, the computing devices are portable computing devices, such as tablets, smartphones, laptops, pagers, etc. In some embodiments, the portable computing devices may be computers that are attached to a moving vehicle, such as a patrol vehicle, e.g., of a police force, of a private security company, etc.

In some examples, the alert that is the action caused by the command by each of the computing devices within the pre-determined perimeter may include a message, a vibration, an auditory signal, etc.

In some embodiments, the occurrence record received at step 510 corresponds to a license plate read event and further indicates that a license plate number of the license plate read event corresponds to a LPR hit (e.g., a license plate number of a target vehicle, or is a license plate number in a list of target license plate numbers, etc.), and step 520 would be to verify that the received occurrence record corresponds to an LPR hit (and steps 530 and 540 would be omitted).

Figure 6:
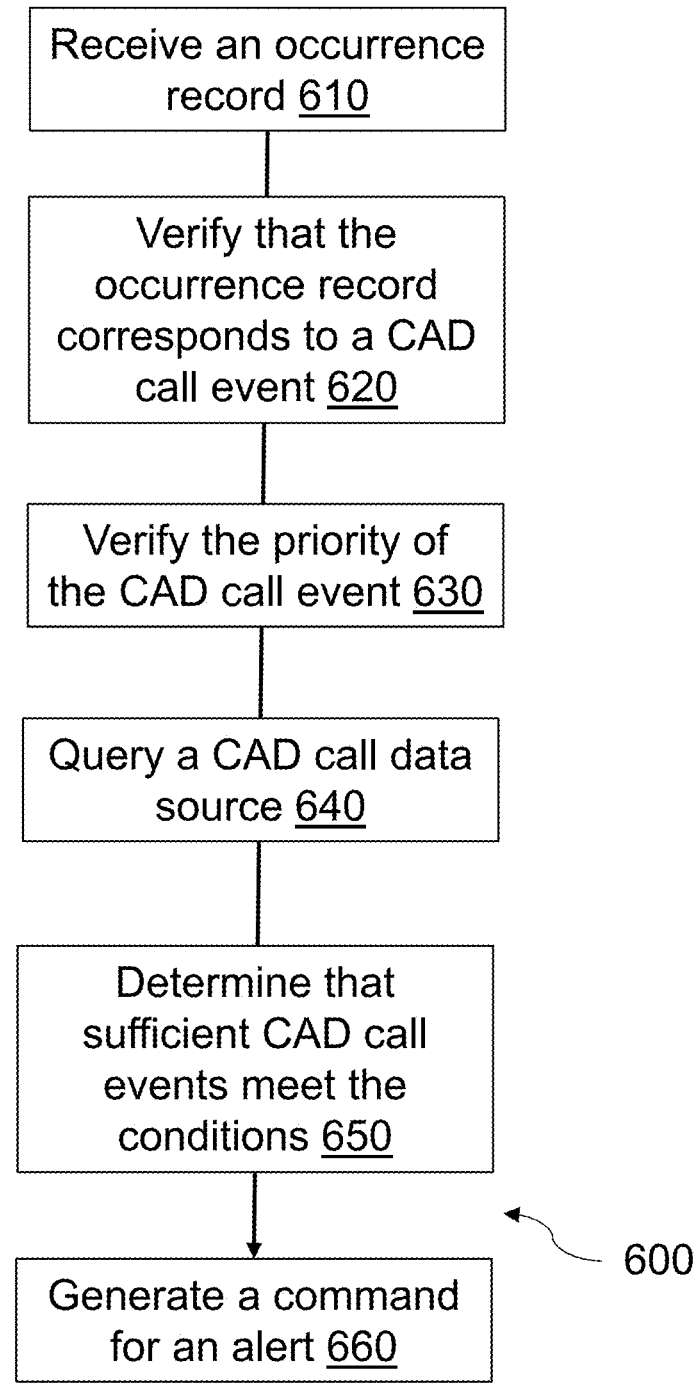
FIG. 6 is a flowchart diagram of an exemplary method of generating an alert for a security event associated with one or more geographic areas of interest by a monitoring system.

Example 2: Generating an Alert for a Security Event Associated with One or More Geographic Areas of Interest by a Monitoring System Reference is made to FIG. 6, illustrating an exemplary method 600 of generating an alert for a security event associated with one or more geographic areas of interest by a monitoring system. The geographic areas of interest may be that for airports, hospitals, schools, embassies, etc. (areas with a high population density, of high security, and/or with a density of vulnerable individuals).

Figure 19A:
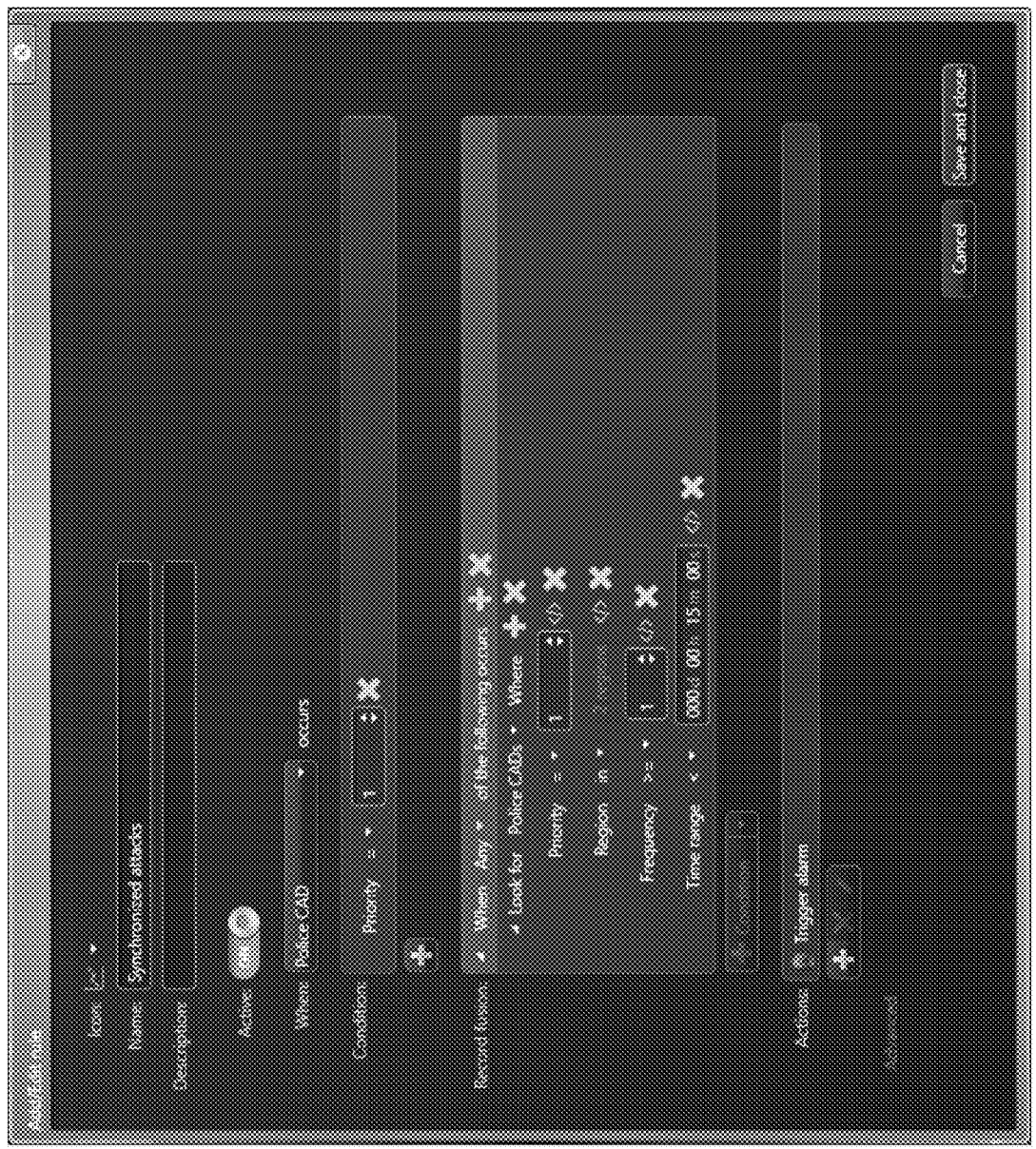
FIG. 19A is an example of a graphical user interface showing the properties of an exemplary trigger-based rule for generating an alert for a security event associated with one or more geographic areas of interest by a monitoring system.

The method 600 may correspond to a trigger-based rule as defined herein, having as an initial condition that that occurrence record have an event type that corresponds to that of a CAD call event, or to that of a CAD call event meeting a threshold pre-defined priority level (an example of a trigger rule is provided at FIG. 19A). Therefore, method 600 defines a series of steps leading to the execution the trigger-based rule and corresponding to the execution of the trigger-based rule.

An occurrence record is received at step 610.

The received occurrence record is verified to confirm that the event of the received occurrence record corresponds to that of a CAD call event at step 620. As the trigger or initial condition, the priority level of the CAD call event is verified at step 630 to be equivalent to, or in some examples, equal to or greater than, a threshold pre-defined priority level. In some examples, steps 620 and 630 may be performed simultaneously. In other examples where the monitoring system only receives occurrence records corresponding to CAD call events, step 620 may not be performed as it is known that the occurrence record corresponds to a CAD call event. In some examples, the pre-defined priority level may correspond to a "high" priority level or a priority level of "1". In some examples, the pre-defined priority level is the highest priority level of a set of priority levels that can be assigned to CAD calls.

In some examples, the CAD call event may include CAD call information in the form of an audio file, or in the form of a string of characters that is a transcript of the CAD call, or may include a string of characters for keywords identified in the CAD call.

Figure 19B:
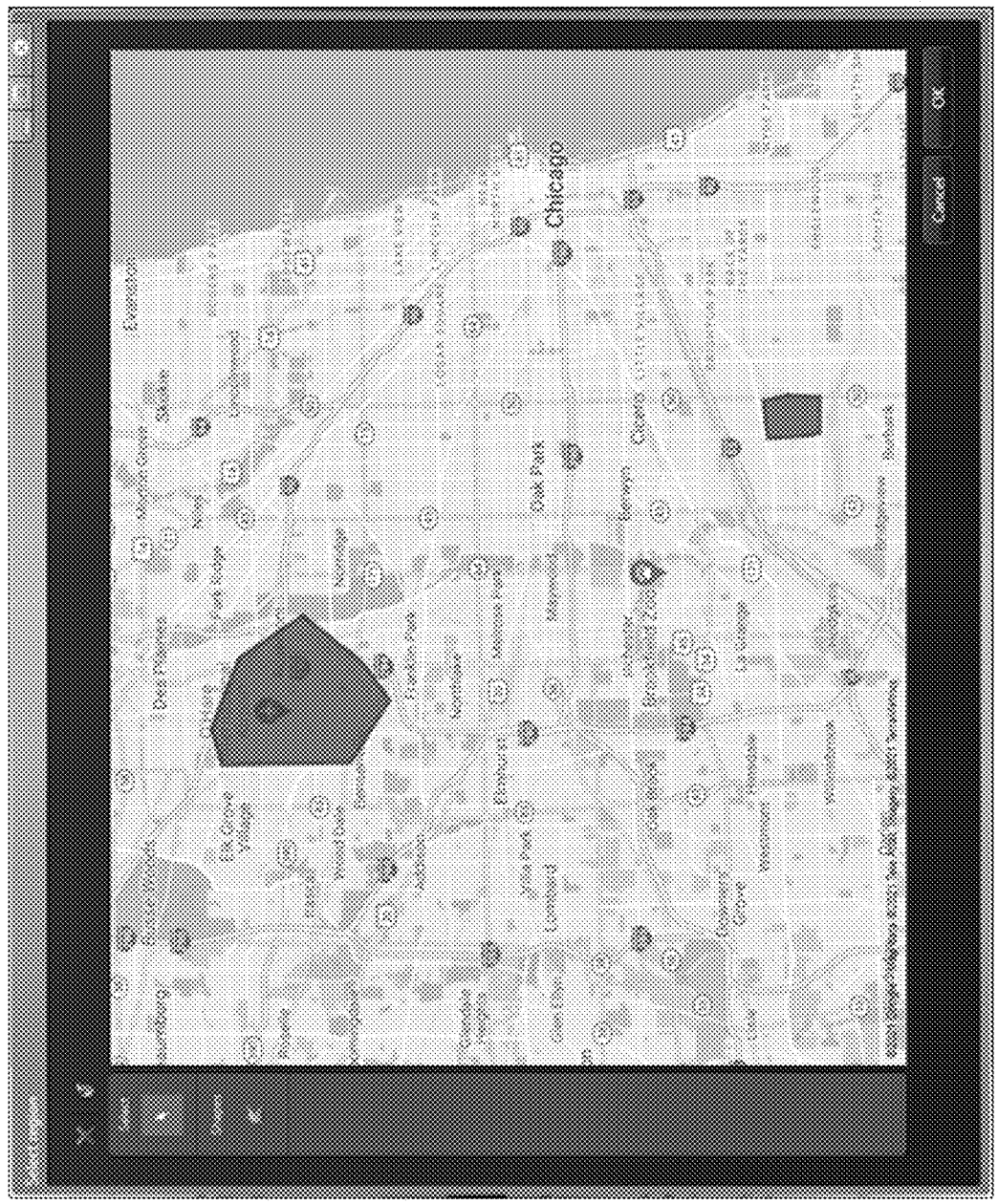
FIG. 19B is an example of a geographic user interface showing a computer-generated map with a location identifying a geographic area of interest corresponding to an airport for generating an alert for a security event associated with one or more geographic areas of interest by a monitoring system.

Upon determining that the trigger condition of the trigger-based rule is met, one or more queries are generated to retrieve from one or more data sources information including information on CAD call events (e.g. occurrence records corresponding to CAD call events) at step 640, each query including a geographic range corresponding to a geographic area of interest and temporal range, and a priority value corresponding to a pre-defined priority level. The geographic range may be an area selected on a computer-generated map (e.g., a shown in FIG. 19B), a pre-defined location corresponding to a known establishment (such as the property associated with a hospital, an airport, a school, an embassy, etc.), etc. The time range defines a time during which the queried CAD call event has been recorded, and may be defined from the time parameter of the initial occurrence record for the CAD call event, or from real-time or current time. In some examples, the pre-defined priority value may be equivalent to the priority level of the trigger condition of the trigger-based rule. In other embodiments, the pre-defined priority level may be set at a new level (e.g. as defined in the trigger-based rule), for instance, as "high", or "1". In some embodiments, one or more queries are generated for one or more data sources for buildings of interest (e.g., locate all buildings of a certain building type in a range of the event).

It will be understood that the received occurrence record, corresponding to a CAD call event, may also be stored in the queried data source including information on CAD call events. Therefore, when the CAD call data source is queried, the query will return at least one occurrence record, the initially received occurrence record at step 610.

The information received from the one or more queried databases is then analyzed to determine if at least two occurrence records are returned that match the criteria of the query at step 650. As one of the returned occurrence records corresponding to a CAD call event is the received occurrence record at step 610, an additional occurrence record is returned in order to satisfy the trigger-based rule, namely that a plurality of CAD call events with a given priority level has been made in the geographic range of the geographic area of interest and meeting the temporal range.

If at least two occurrence records are returned as a result of the one or more queries (e.g. meeting the conditions of the trigger-based rule), then a command is generated and, optionally transmitted to one or more computing devices, to produce an alert generated by the one or more computing devices at step 660. The alert may indicate information that the geographic area of interest may be the target of criminal activity (e.g. terrorist activity). The alert may be in the form of one or more of a message, an audio signal, a vibration, etc.

For instance, if the geographic areas of interest corresponds to an airport, the identification of two or more CAD calls taking place within the airport within a given temporal range from one another (e.g. 15 minutes) and that have a high priority level (e.g. a bomb scare, a gunshot, etc.), may indicate that a criminal activity may be taking place, and that the relevant authorities should be dispatched to the scene in order to neutralize the threat. It will be understood that more than one geographic area of interest may be identified (e.g. two airports, two hospitals, one airport and one embassy, etc.), indicative of a coordinated attack on multiple sites.

Figure 7:
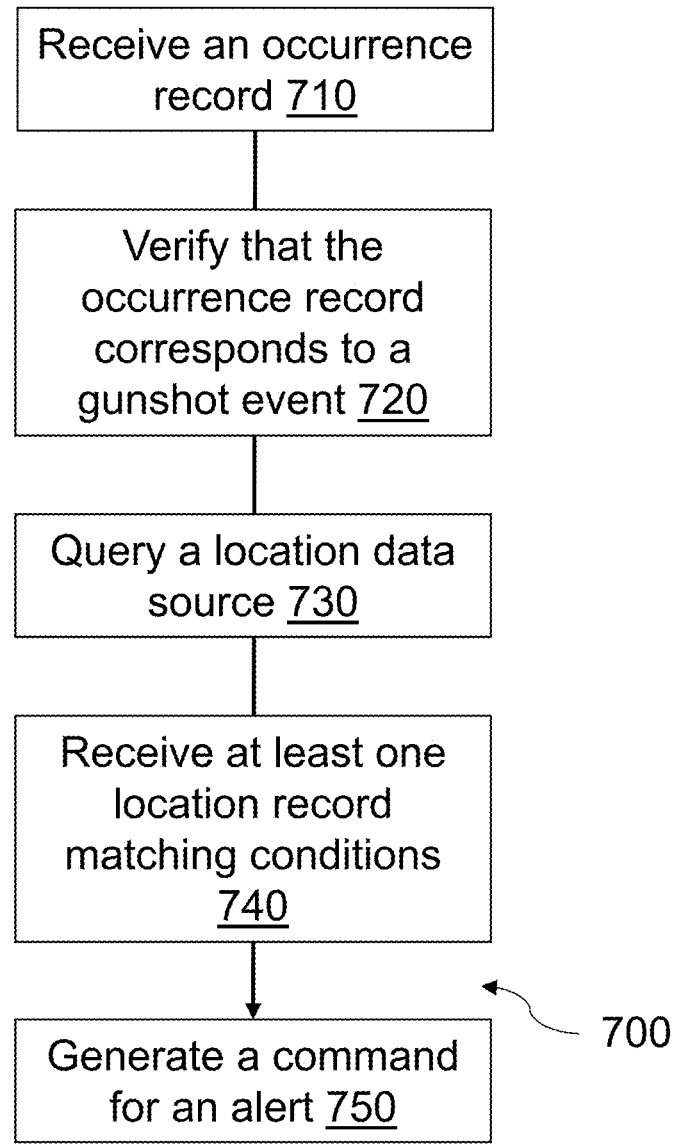
FIG. 7 is a flowchart diagram of an exemplary method of generating an alert for a gunshot event located in proximity to a location of interest using a monitoring system.

Example 3: Generating an Alert for a Gunshot Located in Proximity to a Location of Interest Using a Monitoring System Reference is now made to FIG. 7, illustrating an exemplary method 700 of generating an alert for a danger located in proximity to a location of interest using a monitoring system. The location of interest may correspond to areas with a high population density, and/or with a density of vulnerable individuals, such as a hospital or a school.

Figure 20:
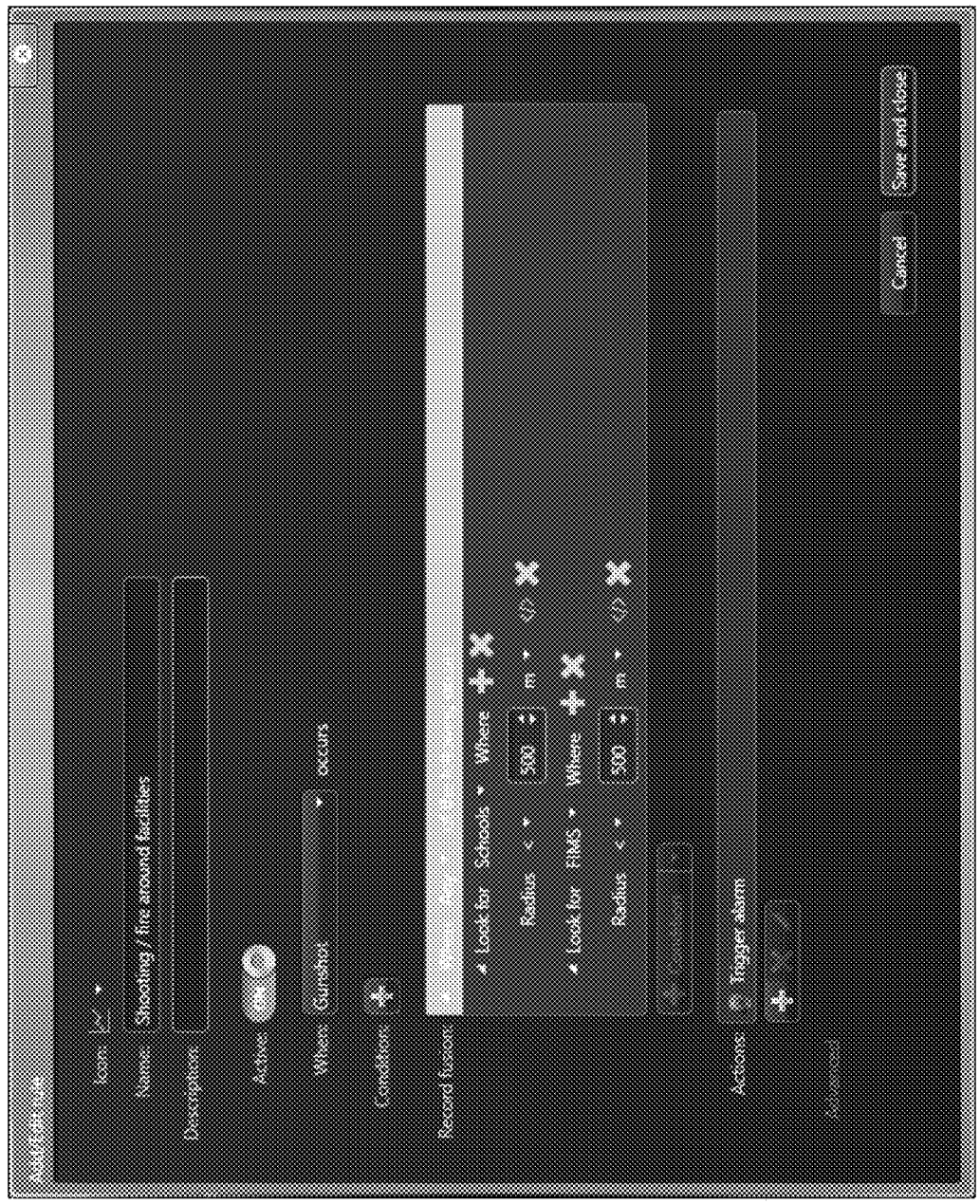
FIG. 20 is an example of a graphical user interface showing the properties of an exemplary trigger-based rule for generating an alert for a danger located in proximity to a location of interest using a monitoring system.

The method 700 may correspond to a trigger-based rule as defined herein, having as an initial condition that that occurrence record has an event type that corresponds to that of a gunshot event (an example of a trigger-based rule is provided at FIG. 20). Therefore, method 700 defines a series of steps leading to the execution of the trigger-based rule and corresponding to the execution of the trigger-based rule.

An occurrence record is received at step 710, the occurrence record including a geographic parameter and information on an event type. The geographic parameter may correspond to the location of the sensor or device that detected a gunshot, thereby generating a gunshot event. In some embodiments, the gunshot event may be generated by a microphone-based gunshot detector. In other embodiments, the gunshot event may correspond to a CAD call where the term "gunshot", or equivalent word such as "gun" "gunfire", may be included in the audio file or transcript of the CAD call.

The received occurrence record is compared to an initial or trigger condition of a trigger-based rule to verify that the event type of the occurrence record corresponds to a gunshot event type at step 720.

Upon determining that the trigger condition is met, one or more queries are generated at step 730 based on the trigger-based rule, the query including a geographic range that is based on the geographic parameter of the received occurrence record. For instance, the geographic range may define an area having a disc shape with the geographic parameter of the received occurrence record being located at the center of the area. This area may be defined from the geographic parameter of the received occurrence record and by setting, in the trigger-based rule, a diameter or radius measured from the geographic parameter of the received occurrence record, defining the area of interest. As such, the query will allow for the establishment that a location of interest (e.g. school, hospital) is in proximity to where the gunshot was detected.

The one or more queries are transmitted to one or more data sources including information on a series of locations of interest as location records, where each location of interest may include a stored location record including information on the location of interest (e.g. may be a list of properties or buildings, each have an identifier (e.g. name, location type (e.g. hospital, school, etc.), etc.) and geographic parameter corresponding to the location (e.g. address, GPS coordinates defining an area corresponding to the location of interest)). The location(s) of interest including a geographic parameter that is contained within the geographic range of the query are retrieved. In some examples, the one or more data sources including information on a series of locations of interest as location records may be stored on local memory, such as memory 116 (thereby avoiding the need that the queried records be received). In other examples, the one or more data sources including information on a series of locations of interest as location records may be stored on external memory (e.g. data source 112).

In some examples, the query may include as a parameter a location type for the location of interest. The location type defines the nature of the location. Exemplary location types include, but are not limited to, a hospital, a medical center, a school, a university, etc.

In some examples, the trigger-based rule may further define the identity of the one or more data sources containing location records to be queried. For instance, the trigger-based rule may include the IP address, an identifier (e.g. name), etc. of the one or more data sources to be queried. In some examples, the data source may be, or may be part of or maintained by, a facility information management system (i.e. a database that is managed by an organization with information pertaining to, e.g., infrastructure).

If one or more location records corresponding to one or more locations of interest are retrieved in response to a query at step 740, a command is generated to produce an alert indicative of a possible danger (i.e. danger related to the detected gunshot) associated with the location of interest at step 750.

As such, the present method permits the rapid detection of a gunshot event that occurs nearby a location of interest, such as a hospital or school, thereby notifying the relevant authorities (e.g. the owner of the corresponding location of interest, police officers, private security) of the existence of a possible danger. As a result, potential risk caused to the occupants of the location of interest may be avoided as a result.

Exemplary alerts that may be generated as a result of the command may include, but are not limited to, a message (e.g. with the location and/or identity of the location of interest), an audio alert, a vibration, etc.

In some examples, the received occurrence record at step 710 may be received from a data source (e.g. a gunshot event database). In some examples, the gunshot data source may also include the location records, where the gunshot data source and the location record data source are the same. In other embodiments, the gunshot data source may be a separate data source from the one including the location records.

Figure 8:
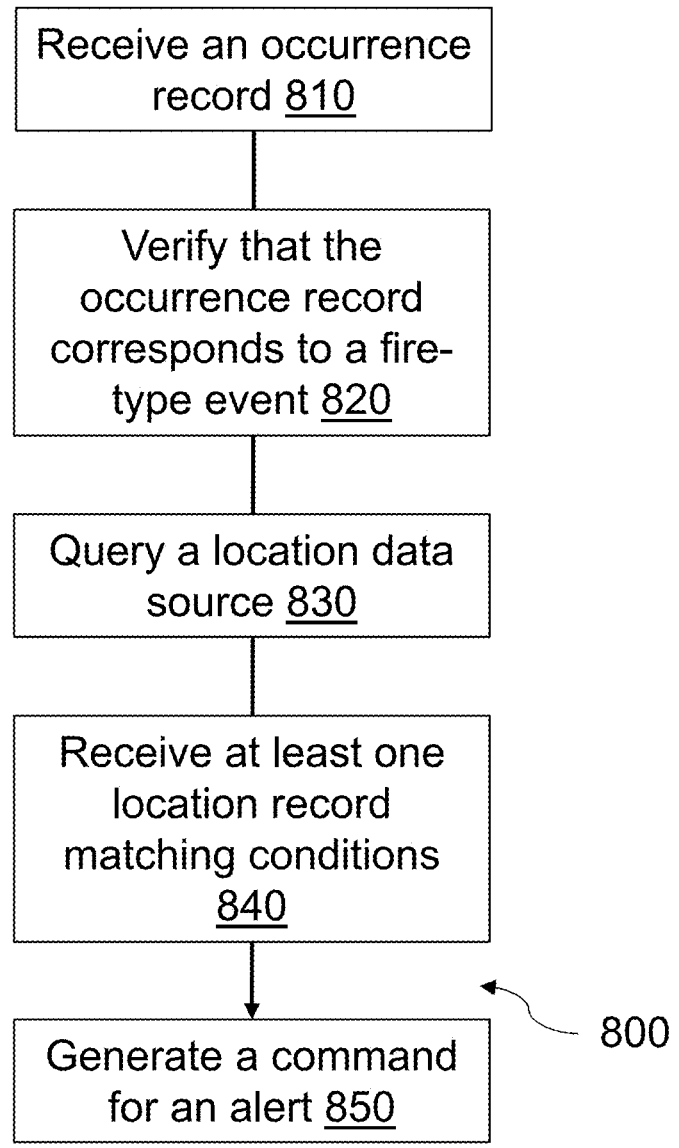
FIG. 8 is a flowchart diagram of an exemplary method of generating an alert for a fire event located in proximity to a location of interest using a monitoring system.

Example 4: Generating an Alert for a Fire Located in Proximity to a Location of Interest Using a Monitoring System Reference is now made to FIG. 8, illustrating an exemplary method 800 of generating an alert for a danger located in proximity to a location of interest using a monitoring system. The location of interest may correspond to areas with a high population density, and/or with a density of vulnerable individuals, such as a hospital or a school.

The method 800 may correspond to a trigger-based rule as defined herein, having as an initial condition that that occurrence record has an event type that corresponds to that of a fire event (an example of the trigger-based rule is provided at FIG. 20). Therefore, method 800 defines a series of steps leading to the execution of the trigger-based rule and corresponding to the execution of the trigger-based rule.

An occurrence record is received at step 810, the occurrence record including a geographic parameter and information on an event type. The geographic parameter may correspond to the location of a CAD call identifying the presence of a fire, or to the location of the smoke detector that triggered the fire-type event. In embodiments where the fire event is generated from a CAD call, the fire event may correspond to a CAD call where the term(s) "fire", "smoke", "flames", "burning", etc. may be included in the audio file or transcript of the CAD call.

The received occurrence record is compared to an initial or trigger condition of a trigger-based rule to verify that the event type of the occurrence record corresponds to a fire event type at step 820. In some embodiments, the initial or trigger condition may be to verify that the event type of the occurrence record corresponds to either a fire event type or a gunshot event type, where adjustments to method 800 may be made to accommodate the other event type of the trigger condition as appropriate.

Upon determining that the trigger condition is met, one or more queries are generated at step 830, the query including a geographic range that is based on the geographic parameter of the received occurrence record. For instance, the geographic range may define an area having a disc shape with the geographic parameter of the received occurrence record being located at the center of the area. This area may be defined from the geographic parameter of the received occurrence record and by setting, in the trigger-based rule, a diameter or radius measured from the geographic parameter of the received occurrence record, defining the area of interest. As such, the query will allow for the establishment that a location of interest (e.g. school, hospital) is in proximity to where the fire event was detected.

The one or more queries are transmitted to one or more data sources including information on a series of locations of interest as location records, where each location of interest may include a stored location record including information on the location of interest (e.g. may be a list of properties or buildings, each have an identifier (e.g. name, location type (e.g. hospital, school, etc.), etc.) and geographic parameter corresponding to the location (e.g. address, GPS coordinates defining an area corresponding to the location of interest)). The location(s) of interest including a geographic parameter that is contained within the geographic range of the query are retrieved. In some examples, the one or more data sources including information on a series of locations of interest as location records may be stored on local memory, such as memory 116 (thereby avoiding the need that the queried records are received). In other examples, the one or more data sources including information on a series of locations of interest as location records may be stored on external memory (e.g. data source 112).

In some examples, the query may include as a parameter a location type for the location of interest. The location type defines the nature of the location. Exemplary location types include, but are not limited to, a hospital, a medical center, a school, a university, etc.

In some examples, the trigger-based rule may further define the identity of the one or more data sources containing location records to be queried. For instance, the trigger-based rule may include the IP address, an identifier (e.g. name), etc. of the one or more data sources to be queried. In some examples, the data source may be, or may be part of or maintained by, a facility information management system.

If one or more location records corresponding to one or more locations of interest are retrieved in response to a query at step 840, a command is generated to produce an alert indicative of a possible danger (i.e. danger related to the detected fire) associated with the location of interest at step 850.

As such, the present method permits the rapid detection of a fire-type event that occurs nearby a location of interest, such as a hospital or school, thereby notifying the relevant authorities (e.g. the owner of the corresponding location of interest, police officers, firefighters, private security) of the existence of a possible danger. As a result, a potential risk caused to the occupants of the location of interest may be avoided as a result.

Exemplary alerts that may be generated as a result of the command may include, but are not limited to, a message (e.g. with the location and/or identity of the location of interest), an audio alert, a vibration, etc.

In some examples, the received occurrence record at step 810 may be received from a data source (e.g. a fire event database). In some examples, the fire event or CAD call data source may also include the location records, where the fire event or CAD call data source and the location record data source are the same. In other embodiments, a fire-type event or CAD call data source may be a separate data source from the one including the location records.

Example 5: Detecting Suspicious Activity of a Vehicle by a Monitoring System

Figure 9:
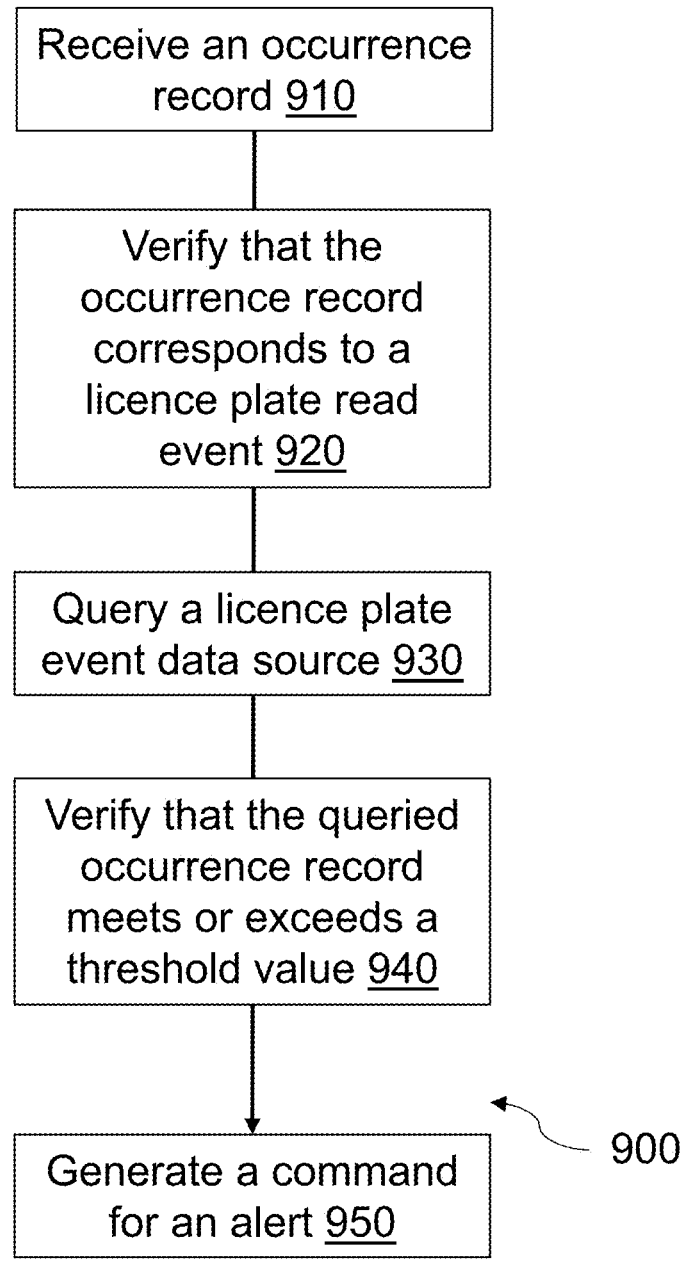
FIG. 9 is a flowchart diagram of an exemplary method for detecting suspicious activity of a vehicle by a monitoring system.

Reference is now made to FIG. 9, illustrating an exemplary method 900 of detecting suspicious activity of a vehicle by a monitoring system. The detection involves licence plate read events.

Figure 21:
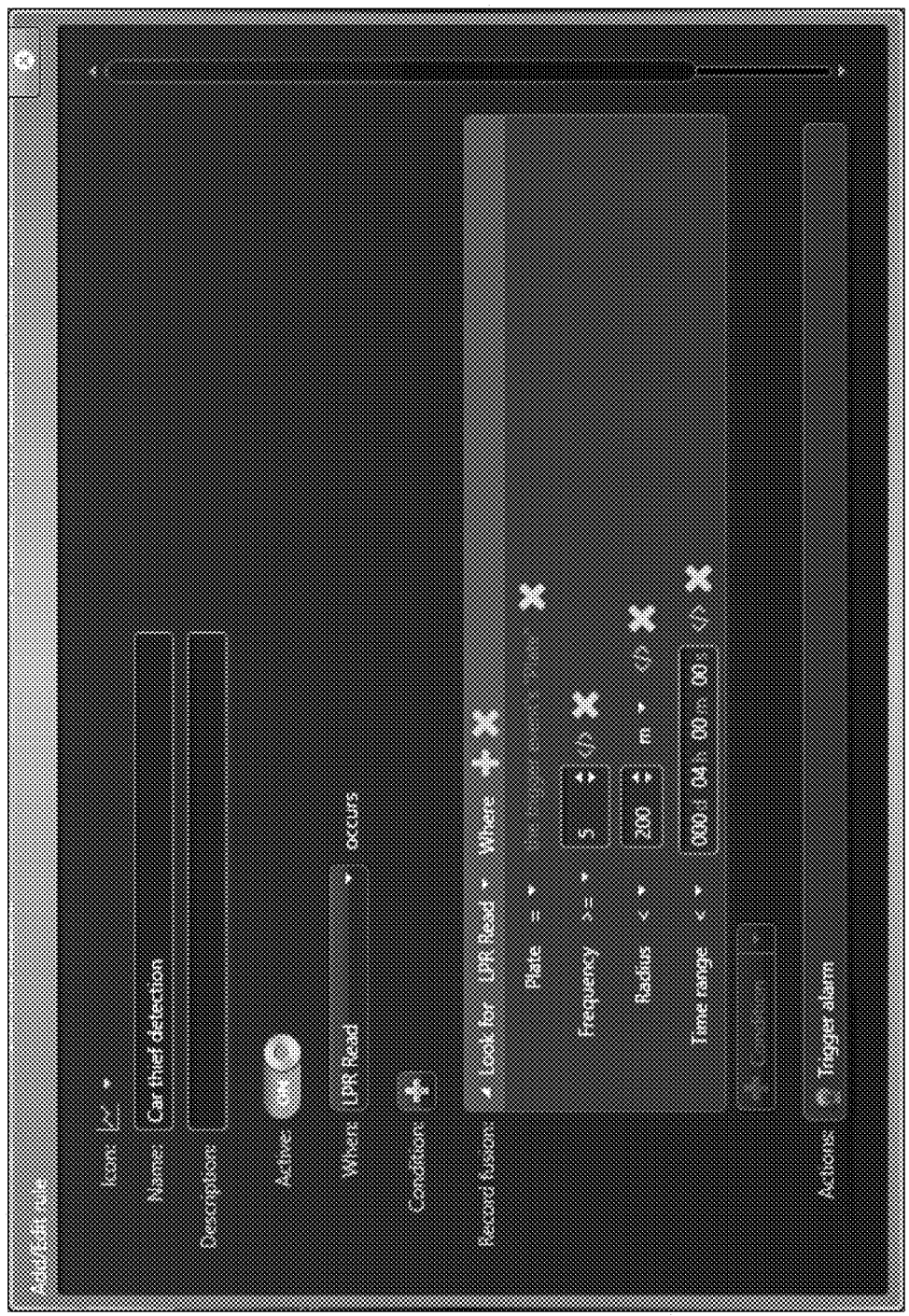
FIG. 21 is an example of a graphical user interface showing the properties of an exemplary trigger-based rule for detecting suspicious activity of a vehicle by a monitoring system.

The method 900 may correspond to a trigger-based rule as defined herein, having as an initial condition that that occurrence record has an event type that corresponds to that of a licence plate read event (an example of a trigger-based rule is provided at FIG. 21). Therefore, method 900 defines a series of steps leading to the execution of the trigger-based rule and corresponding to the execution of the trigger-based rule.

An occurrence record is received at step 910 by the monitoring system.

The received occurrence record is analyzed to establish that the occurrence record meets a trigger condition, e.g., of the trigger-based rule, at step 920, that the event type of the received occurrence record corresponds to a licence plate read event.

The licence plate read of the received occurrence record may have been performed by a licence plate recognition (LPR) camera. In some examples, the licence plate read may have been performed by an external system or the monitoring system 100, where a camera transmits to the external system or the monitoring system images of a vehicle, where object recognition is performed on the received images by the external system or monitoring system to perform the licence plate read.

The received occurrence record includes a time parameter (e.g. the time when the licence plate read was performed) and a geographic parameter (e.g. the location of the camera that performed the licence plate read).

The received occurrence record corresponding to a licence plate read event includes the licence plate number identified by the licence plate read.

As the trigger condition is satisfied, one or more queries are generated (e.g. following the execution of the trigger-based rule by the monitoring system) at step 930, targeting one or more data sources including occurrence records for licence plate read events. The one or more queries include a temporal range (e.g. a time period defined from the time parameter of the received occurrence record at step 910), a geographic parameter (e.g. an area defined from the geographic parameter of the received occurrence record, where, for instance, the geographic parameter is a point defining the center of the area; the area may be defined or adjusted by an operator on a virtual map through a selection of a relevant area including the geographic parameter of the received occurrence record). The query also includes a licence plate number (e.g. a string of characters defining the licence plate number) that is based on the licence plate number of the received occurrence record.

It will be understood that as the occurrence record received at step 910 corresponds to a licence plate read event, this occurrence record may also be received from and/or stored in one of the one or more data sources of occurrence records of licence plate read events. In other examples, the received occurrence record of step 910 may be received and/or stored in a separate data source to the one or more data sources that are queried.

In some examples, the query may include a threshold number of a minimal amount of relevant occurrence records that match the other criteria of the query. If the threshold number is not met, then the query does not return any occurrence records in response to the query. In some examples, the threshold number is "5". In some examples, the threshold number is "3". It will be understood that the value of the threshold number may be set at any number indicative of a suspicious activity of a vehicle, and may depend on the size of the area of the geographic range, the span of the time range, etc.

The received occurrence records, as a result of the query, are analyzed to determine if the number of received occurrence records matching the criteria of the query is equal to or exceeds a threshold number of licence plate reads for a single licence plate indicative of suspicious activity of a vehicle associated with the target licence plate number at step 940.

Upon determining that the threshold number has been met or exceeded, a command is generated at step 950 to produce an alert of suspicious activity of a vehicle corresponding to the licence plate number of the occurrence record received at step 910. The alert may be or may include a message with the licence plate number of the corresponding vehicle, the make, model, year, colour, dimensions, and/or picture of the vehicle corresponding to the target licence plate number, etc. The alert may be or may include a vibration signal, an audio signal, etc.

The command to generate an alert may be transmitted to one or more computing devices (such as computing device 200). The computing devices may be those of relevant authorities (such as police officers, of private enforcement officers, computers of patrol vehicles, etc.)

As such, a search may be performed, targeting a data source of computing devices associated with a relevant authority (e.g. a local police force), the data source including the identifiers, addresses, and optionally, the location information (e.g. geolocation date, i.e. GPS coordinates) of the corresponding computing devices. The identification information of the queried computing device(s) may be received at the monitoring system, and the command to generate the alert may be sent to the addresses of the computing device(s) corresponding to the query.

As such, the method 900 enables the identification of suspicious behavior of a vehicle due to the vehicle driving around in a circumscribed area, indicating that the vehicle is circling around an area, as evidenced by numerous licence plate reads in a given area during a defined period of time. This could indicate that the driver is scouting out an area or getting ready to steal another vehicle, thereby being indicative of a car theft incident. This could indicate that the driver is soliciting prostitution, targeting a location for robbery, etc. The querying of the data source of the occurrence records of the licence plate read events enables the system to identify that the licence plate of the same vehicle is being the target of multiple licence plate read events.

Figure 10:
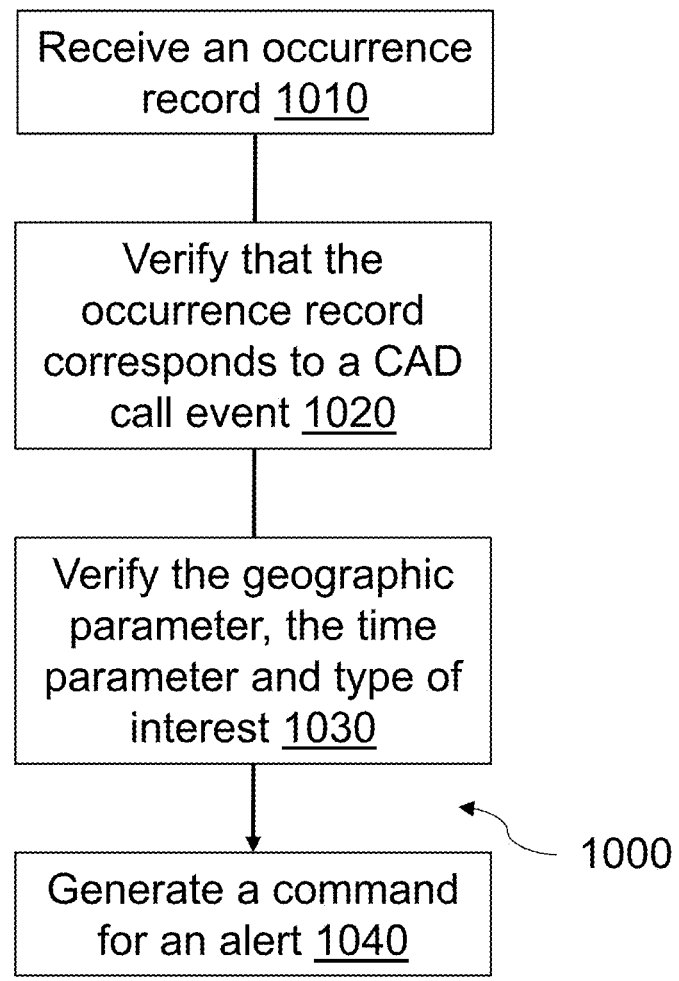
FIG. 10 is a flowchart diagram of an exemplary method of generating alert notifications for events of interest occurring in geographic regions of interest by a monitoring system.

Example 6: Generating Alert Notifications for Events of Interest Occurring in Geographic Regions of Interest by a Monitoring System Reference is now made to FIG. 10, illustrating an exemplary method 1000 of generating alert notifications for events of interest occurring in geographic regions of interest by a monitoring system. The present method enables the identification of events that are unusual in certain areas. For instance, in rural areas, gunshots or bomb scares are rarely reported or detected. Therefore, if a CAD call comes in corresponding to an event of interest, and the location of the CAD call corresponds to a geographic region where these events occur rarely, an alert may be generated, e.g., on the computing device of the relevant authority.

Figure 22:
FIG. 22 is an example of a graphical user interface showing the properties of an exemplary trigger-based rule for generating alert notifications for events of interest occurring in geographic regions of interest by a monitoring system.

The method 1000 may correspond to a trigger-based rule as defined herein, having as an initial condition that that occurrence record has an event type that corresponds to that of a CAD call event (an example of the trigger-based rule is provided at FIG. 22). Therefore, method 1000 defines a series of steps leading to the execution of the trigger-based rule and corresponding to the execution of the trigger-based rule.

An occurrence record is received at step 1010 by the monitoring system. The occurrence record has an event type, a geographic parameter and a time parameter. When the event type of the occurrence record is that of a CAD call, the geographic parameter may be the location of the device being the source of the CAD call when the CAD call is made or the location provided by the caller reporting the incidence, and the time parameter may be the time at which the CAD call is made (e.g. its start or finish).

The occurrence record is analyzed at step 1020 to determine if the occurrence record satisfies the trigger condition of a trigger-based rule, the trigger condition being that the event type of the occurrence record corresponds to a CAD call event type.

Upon determining that the trigger condition of the trigger-based rule is met, the trigger-based rule is executed, including further criteria for the received occurrence record at step 1030. The criteria include that the geographic parameter of the occurrence record is contained within a geographic region of interest (e.g. defined by an operator on a virtual map; identified as a burrow, municipality or other geographic area associated with an organization or owner, where the name of the geographic area may be entered into the system, etc.). The criteria also include a priority parameter, that the CAD call event of the occurrence record has or exceed a minimal priority level. For instance, the priority level may be that of the highest priority level for a CAD call, may be set as "high", "1", etc. The criteria also include a CAD call type of interest, where the CAD call event type of the received occurrence record is analyzed to determine if the CAD call event type of the received occurrence record correspond to one or more of the CAD call types of interest. For instance, the CAD call information of the received occurrence record may include an audio file or a string of characters of the transcript of the CAD call, that can be analyzed to identify key words indicative of the type of the CAD call (e.g. a fire, a gunshot, physical abuse, a homicide, etc.), or one or more parameters set by the call operator that indicate the type of the CAD call. Once the type of the CAD call event has been identified, the identified type of the CAD call event call be compared to the type(s) of interest set in the trigger-based rule.

If the criteria of the trigger-based rule are satisfied by the received occurrence record, then a command to generate an alert is generated at step 1040, the alert indicative that an event of interest is occurring in a geographic region of interest. The event of interest can be that of criminal activity that rarely occurs in such regions, such as a homicide that has taken place in the countryside, or a bystander picking up on multiple gunshots when it is not hunting season, a bystander witnessing an explosion, etc. In some embodiments, the geographic region of interest may instead be that of a business district, where gunshots and/or explosions are usually rarely detected. In some embodiments, the geographic region of interest may be that of an airport.

The alert may be or may include a message identifying the nature of the event of interest, and the geographic region of interest in which the CAD call was made. The alert may be or may include a vibration signal, an audio signal, etc.

The command to generate an alert may be transmitted to one or more computing devices (such as computing device 200). The computing devices may be those of relevant authorities (such as police officers, of private enforcement officers, computers of patrol vehicles, etc.)

As such, a search may be performed, targeting a data source of computing devices associated with a relevant authority (e.g. a local police force), the database including the identifiers, addresses, and optionally, the location information (e.g. geolocation date, i.e. GPS coordinates) of the corresponding computing devices. The identification information of the queried computing device(s) may be received at the monitoring system, and the command to generate the alert may be sent to the addresses of the computing device(s) corresponding to the query.

Figure 11:
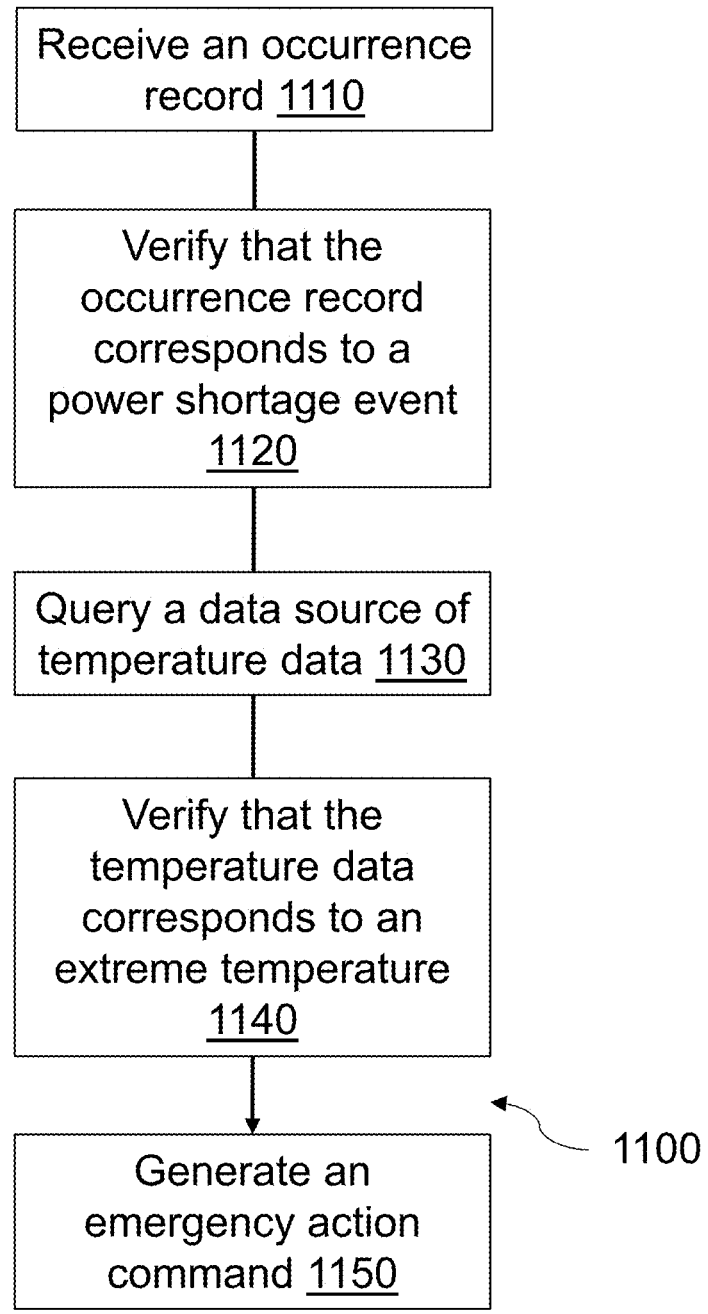
FIG. 11 is a flowchart diagram of an exemplary method of generating an alert for a power shortage associated with extreme temperature by a monitoring system.

Example 7: Generating an Alert for a Power Shortage Associated with Extreme Temperature by a Monitoring System Reference is now made to FIG. 11, illustrating an exemplary method 1100 of generating an alert for a power shortage associated with extreme temperature by a monitoring system. The present method 1100 identifies the presence of a power shortage in a geographic area, and determines if the temperature in that geographic region is an extreme temperature (e.g. extreme cold, extreme heat), and generates a command for an emergency action (e.g. alerting public authorities) that can be directed to the geographic area.

The method 1100 may correspond to a trigger-based rule as defined herein, having as an initial condition that that occurrence record has an event type that corresponds to that of a power shortage event. Therefore, method 1100 defines a series of steps leading to the execution of the trigger-based rule and corresponding to the execution of the trigger-based rule.

An occurrence record is received at step 1110 by the monitoring system. The occurrence record has an event type and a geographic parameter. The geographic parameter may correspond to the location of the device that identified a power shortage, thereby being the source of the event resulting in the occurrence record. The geographic parameter may correspond to one or more polygons to represent one or more areas that are affected by the power shortage. The occurrence record may also include a time parameter.

The received occurrence record is analyzed to determine if the received occurrence record satisfies the trigger condition of the trigger-based rule, that the event type of the received occurrence record corresponds to a power shortage event type at step 1120.

Upon determining that the trigger condition is met, the trigger-based rule is executed, resulting in the generating of a query, based from the executed trigger-based rule, directed to a data source of temperature data at step 1130. The query includes a geographic condition based on the geographic parameter of the received occurrence record to determine the temperature in a region corresponding to where the power shortage occurred. The data source may be a meteorological station, memory storing readouts from one or more thermometers, an electronic thermometer, etc.

The queried temperature data is received and analyzed, based on the trigger-based rule, to determine if the temperature data corresponds to a temperature that meets, exceeds or is below a temperature condition or threshold level (e.g. based on the boolean of the trigger-based rule) defined as an extreme temperature value (or is contained within an extreme temperature range) at step 1140, indicative that the temperature in the region of the power shortage is an extreme temperature which may jeopardize the health of one or more occupants. Extreme temperatures may be temperatures under −15° C., or more than 30° C. It will be understood that the value corresponding to an extreme temperature or to an extreme temperature range may vary depending on the geographic area, the people involved in that region (e.g. elderly occupants, young occupants, etc.), without departing from the present teachings. A cold temperature threshold value and/or a hot temperature threshold value may be set, for example, by a user depending on the region.

Upon determining that the temperature condition of the trigger-based rule is met, a command for an emergency action is generated. The emergency action may be to direct the necessary authorities (e.g. police officers, ambulance drivers, firefighters, agencies responsible for maintaining power) to the location corresponding to the geographic parameter of the received occurrence record.

The alert may be or may include a message identifying a location corresponding to the geographic parameter of the received occurrence record, and a string of characters indicating that the emergency is a power shortage combined with an extreme temperature. The message may be directed to an intervention service (e.g., an ambulance service, Red Cross intervention, etc.) to dispatch emergency response (e.g., an ambulance, other emergency vehicles, etc.) to a location corresponding to the geographic parameter of the received occurrence record. The message may be directed to a bus service to dispatch a bus to a location corresponding to the geographic parameter of the received occurrence record. The alert may be or may include a vibration signal, an audio signal, etc.

The command to generate an alert may be transmitted to one or more computing devices (such as computing device 200). The computing devices may be those of relevant authorities (such as police officers, fire fighters, an ambulance service, a hospital, an agency responsible for maintaining power in a region, etc.)

As such, a search may be performed, targeting a data source of computing devices associated with a relevant authority (e.g. a local police force, an ambulance service), the database including the identifiers, addresses, and optionally, the location information (e.g. geolocation data, i.e. GPS coordinates) of the corresponding computing devices. The identification information of the queried computing device (s) may be received at the monitoring system, and the command to generate the alert may be sent to the addresses of the computing device(s) corresponding to the query.

Example 8: Coordinating a Dispatch of Emergency Vehicles by a Monitoring System

Figure 12:
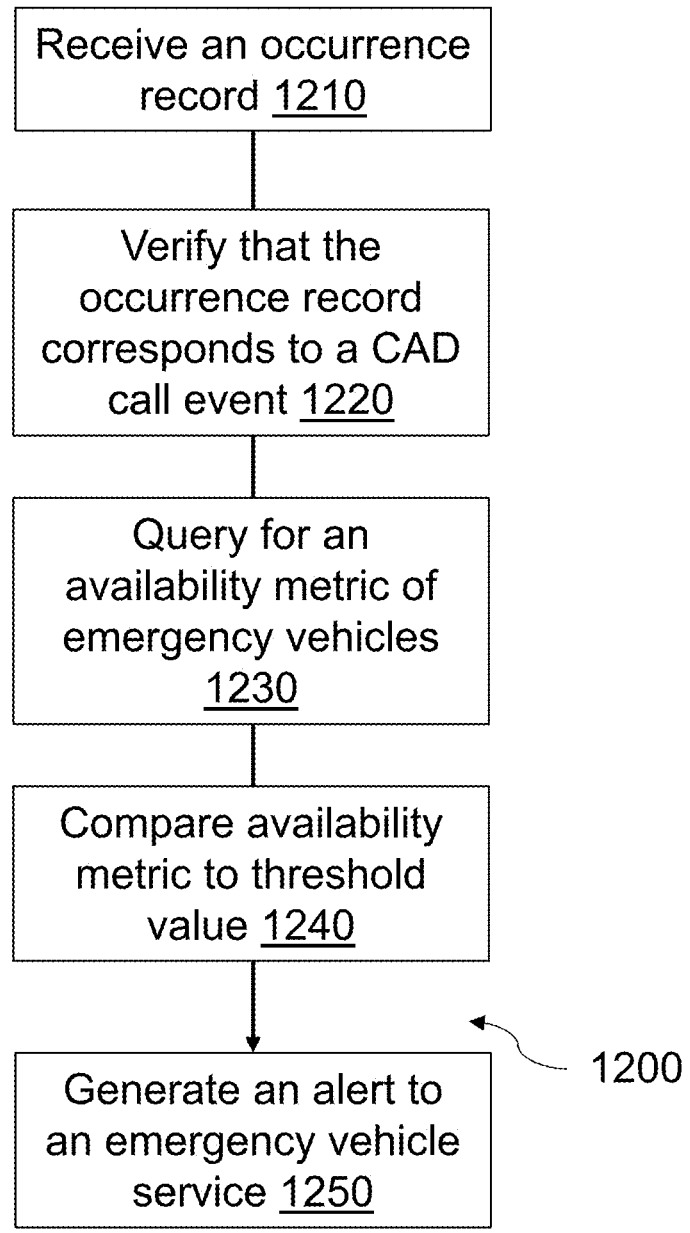
FIG. 12 is a flowchart diagram of an exemplary method of coordinating a dispatch of emergency vehicles by a monitoring system.

Reference is now made to FIG. 12, illustrating an exemplary method 1200 of coordinating a dispatch of emergency vehicles by a monitoring system. The present method 1200 identifies a need for an emergency vehicle (e.g. receipt of an occurrence record corresponding to a CAD call event of an individual suffering medical emergency requiring an ambulance).

The method 1200 may correspond to a trigger-based rule as defined herein, having as an initial condition that the occurrence record has an event type that corresponds to that of a CAD call event. Therefore, method 1200 defines a series of steps leading to the execution of the trigger-based rule and corresponding to the execution of the trigger-based rule.

An occurrence record is received at step 1210 by the monitoring system. The occurrence record has an event type and a geographic parameter. The geographic parameter may correspond to the location of the device that made the CAD call, or to a location identified in the CAD call. The occurrence record may also include a time parameter (e.g. the time of the CAD call).

The received occurrence record may be analyzed to determine if the received occurrence record satisfies the trigger condition of the trigger-based rule, that the event type of the received occurrence record corresponds to a CAD call event type at step 1220. In some embodiments, the received occurrence record may be analyzed to determine if the received occurrence record satisfies the trigger condition of the trigger-based rule, that the received occurrence record corresponds to an event indicative of a requirement for an emergency vehicle (such as a fire requiring a firetruck, an injury requiring an ambulance, a police car, etc.)

The trigger-based rule is executed to generate a query at step 1230 to retrieve (e.g. from a data source) an availability metric of emergency vehicles in a region of interest corresponding to a geographic range. The query includes the geographic range as a criterion, the geographic range defined from the geographic parameter of the received occurrence record. As such, the query retrieves data in order to establish if there are sufficient emergency vehicles in the region of interest that includes the location associated with the occurrence record (e.g. including the location defined by the geographic parameter of the CAD call event, included in the received occurrence record.)

In some embodiments, the query may also include a criterion defining a type of emergency vehicle (e.g. ambulances, firetrucks, patrol vehicles, police units, tow trucks, etc.) such that the query only returns availability metric data corresponding to the needed emergency vehicle. The type of the emergency vehicle may be set in the trigger-based rule that is the basis for the generated query, where there may be different trigger-based rules that are executed depending on the determining that the received occurrence record corresponds to an event type that requires a certain type of emergency vehicle, the event type being set in the trigger condition of the trigger-based rule (e.g. an event type corresponding to a "fire" requiring "firetrucks", an event type corresponding to a "medical emergency" requiring an "ambulance", etc.)

The received availability metric of emergency vehicles is compared to an availability threshold value at step 1240, indicative of a minimum amount of emergency vehicles that should be available in a region to dispatch an emergency vehicle to the location corresponding to the event associated with the received occurrence record. In some embodiments, the threshold value may be a ratio or a percentage. In some embodiments, the threshold value may be an integer, such as "0".

Upon determining that insufficient emergency vehicles are available in the region based on the comparison between the availability metric and the emergency vehicle threshold value, a command for an alert is generated, directed to an emergency vehicle service located outside of the region including the location corresponding to the geographic parameter of the received occurrence record. The alert includes a message with the location corresponding to the geographic parameter of the received occurrence record.

Emergency operation services may be responsible for given regions, and the correlation between the emergency operation service and the region for which the emergency vehicle service is responsible for may be stored in a data source. As a result, in order to identify which emergency operation service to send the command to generate an alert, an additional query may be generated and transmitted to an emergency operation data source to retrieve information on emergency operation services located near the region including the location of the geographic parameter of the received occurrence record. The queried data of the emergency operation services may include address information and identifiers (e.g. names) of the nearby emergency operation services. An availability metric of these nearby emergency operation services may also be provided along with the queried information. This received availability metric may also be compared to an emergency vehicle availability threshold value to verify that sufficient emergency vehicles managed by the emergency operation service are available. An example of an emergency operation service may be an Emergency Operation Center (EOC).

The alert may be or may include a message identifying a location corresponding to the geographic parameter of the received occurrence record. The alert may be or may include a vibration signal, an audio signal, etc.

The command to generate an alert may be transmitted to one or more computing devices (such as computing device 200) of the relevant emergency operation services.

As such, a search may be performed, targeting a data source of computing devices associated with the emergency operation services, the database including the identifiers, addresses, and optionally, the location information (e.g. geolocation data, i.e. GPS coordinates) of the corresponding computing devices. The identification information of the queried computing device(s) may be received at the monitoring system, and the command to generate the alert may be sent to the addresses of the computing device(s) corresponding to the query.

In this example of FIG. 12, the trigger condition is that the occurrence record corresponds to a CAD call event. However, in other embodiments, the trigger condition may be any other suitable event type or a status update (e.g., an ambulance update). In some cases, a unit status change event (e.g., when an ambulance is dispatched) could be monitored. Accordingly, the method 1200 may be adapted to changed "CAD call event" to "event" or "unit status change event" depending on practical implementations.

Figure 13:
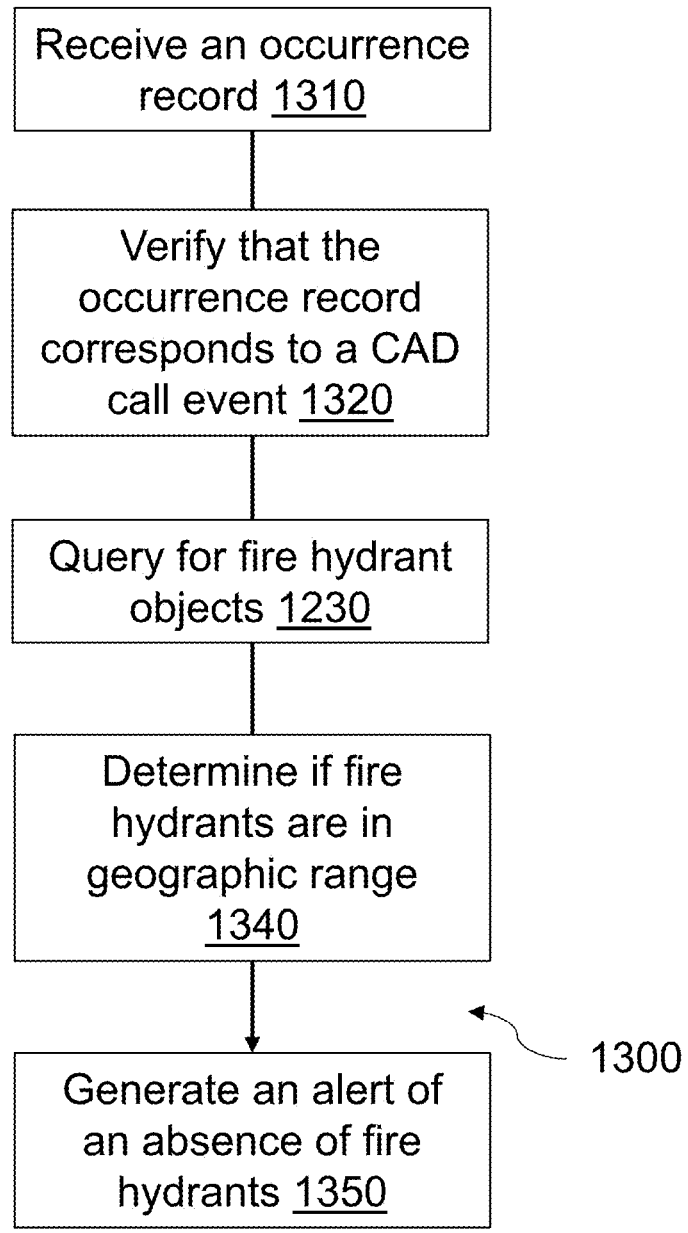
FIG. 13 is a flowchart diagram of an exemplary method of alerting for an absence of fire hydrants in a region associated with a fire by a monitoring system.

Example 9: Alerting for an Absence of Fire Hydrants in a Region Associated with a Fire by a Monitoring System Reference is now made to FIG. 13, illustrating an exemplary method 1300 of alerting for an absence of fire hydrants in a region associated with a fire by a monitoring system. The present method identifies an absence of fire hydrants in a region where a fire is located, and alerts the relevant authorities of the absence of fire hydrants.

Figure 23:
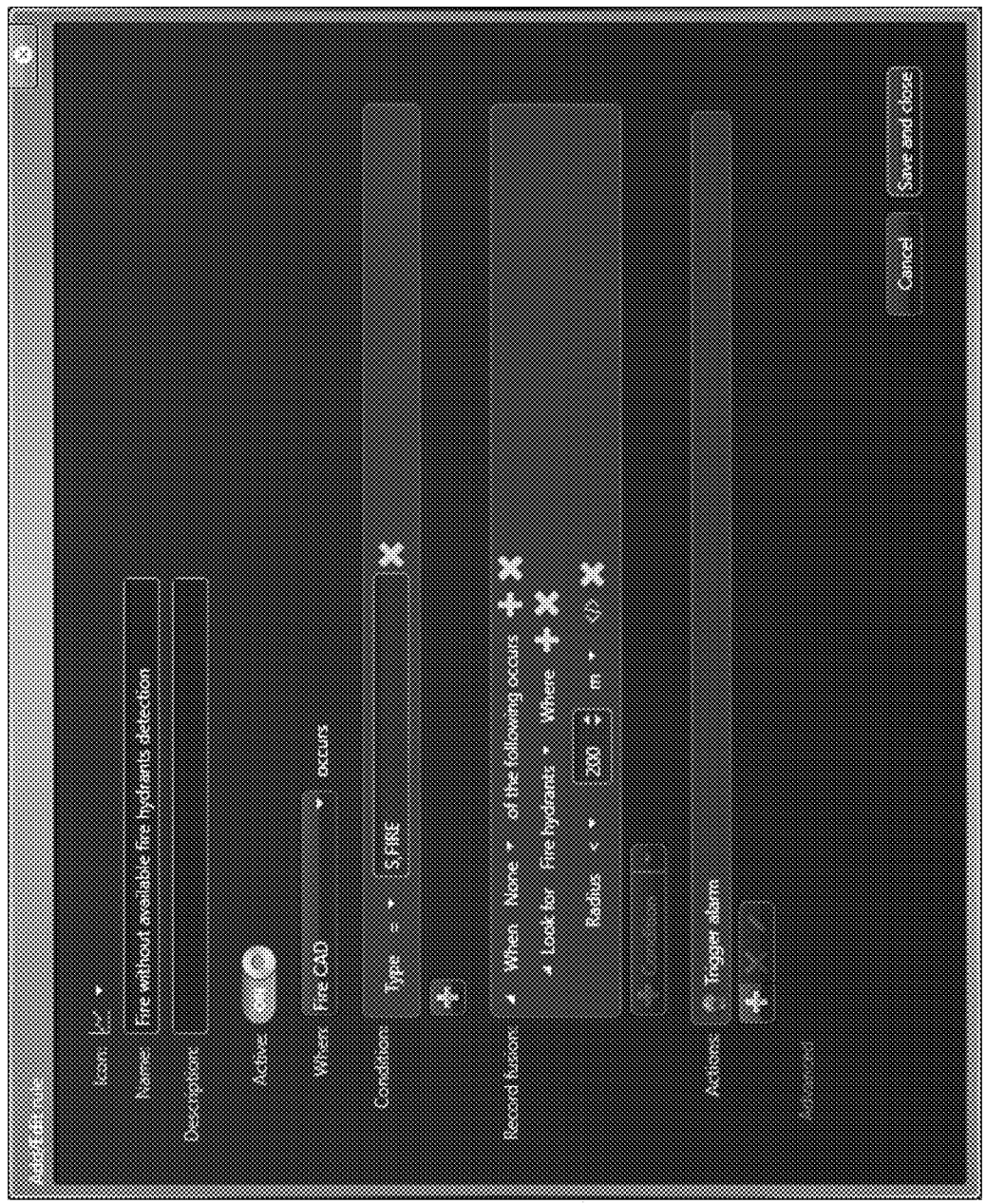
FIG. 23 is an example of a graphical user interface showing the properties of an exemplary trigger-based rule for alerting for an absence of fire hydrants in a region associated with a fire by a monitoring system.

The method 1300 may correspond to a trigger-based rule as defined herein, having as an initial condition that that occurrence record has an event type that corresponds to that of a CAD call event (an example of the trigger-based rule is provided at FIG. 23). Therefore, method 1300 defines a series of steps leading to the execution of the trigger-based rule and corresponding to the execution of the trigger-based rule.

An occurrence record is received at step 1310 by the monitoring system. The occurrence record has an event type and a geographic parameter. The geographic parameter may correspond to the location of the device that made the CAD call, or to a location identified in the CAD call. The occurrence record may also include a time parameter (e.g. the time of the CAD call).

The received occurrence record may be analyzed to determine if the received occurrence record satisfies the trigger condition of the trigger-based rule, that the event type of the received occurrence record corresponds to a CAD call event type at step 1320. In some embodiments, the received occurrence record may be analyzed to determine if the received occurrence record satisfies the trigger condition of the trigger-based rule, that the received occurrence record corresponds to an event indicative of a requirement for an emergency vehicle (such as a fire requiring a firetruck, an injury requiring an ambulance, a police unit, etc.) In some embodiments, the trigger condition may not be that the event type is that of CAD call event, but instead that the occurrence record corresponds to a fire-type event, which may have been generated by such devices as a smoke detector, an alarm system identifying the presence of a fire, etc., where the geographic parameter of the occurrence record may be the location of the corresponding device.

In other embodiments, where a first trigger condition is that the received occurrence record corresponds to a CAD call event, the trigger-based rule may be linked to another trigger condition, that the CAD call event be a fire-type CAD call event. As such, a further analysis of the received occurrence record may be performed to determine if the received occurrence record satisfies the additional trigger condition, that the CAD call event type of the received occurrence record matches a fire-type CAD call event type. The determination that the CAD call event is a fire-type CAD call event may be performed by analyzing, e.g., the transcript or audio file provided as part of the received occurrence record, where key words may be identified indicative of a fire, such as "fire", "smoke", "burning", "flames", etc. In other embodiments, the analysis of the type of incident reported in the CAD call may have been performed externally, and the categorization of the type of the CAD call may be included in the received occurrence record at step 1310.

Upon determining that the trigger condition of the trigger-based rule is met, a query is generated according to one or more query conditions of the trigger-based rule at step 1330, the query including a geographic range defined from the geographic parameter to retrieve fire hydrant objects having a location contained within the geographic range. The geographic range may define an area around the location corresponding to the geographic parameter of the received occurrence record, to identify possible fire hydrants in an area surrounding the location attributed to the fire-type event. The geographic range may be defined as an area with the location corresponding to the geographic parameter of the occurrence record as its center, with a diameter and radius set it in the trigger-based rule. The query may be directed to a data source including identifiers and/or locations of fire hydrants in a region of interest. The data source may be hosted and/or managed by, for instance, a fire department or a municipality.

The queried information on the fire hydrants is received, and analyzed to determine if no fire hydrants corresponding to the geographic range (e.g. a region) containing the location corresponding to the geographic parameter located at step 1340.

Upon determining that no fire hydrant objects are contained in the geographic range, a command for an alert is generated at step 1350 indicating an absence of fire hydrants in proximity to the location corresponding to the geographic parameter of the occurrence record.

Fire departments may be responsible for given regions, and the correlation between the fire department and the region for which the fire department is responsible for may be stored in a data source. As a result, in order to identify which fire department to send the command to generate an alert, an additional query may be generated and transmitted to a fire department data source to retrieve information on fire departments located near the region including the location of the geographic parameter of the received occurrence record. The queried data of the fire departments may include address information and identifiers (e.g. names) of the nearby fire departments.

The alert may be or may include a message identifying the location corresponding to the geographic parameter of the received occurrence record, and a string of characters indicating that the absence of fire hydrants in the neighbouring area. The message may be directed to a fire department or municipality nearby the location corresponding to the geographic parameter of the received occurrence record. The message may be directed to computing devices of vehicles (e.g., fire trucks, police units, etc.) responding to the fire. The alert may be or may include a vibration signal, an audio signal, etc. The message may also indicate the location of the closest fire hydrant to the location corresponding to the geographic parameter of the received occurrence record.

The command to generate an alert may be transmitted to one or more computing devices (such as computing device 200). The computing devices may be those of relevant authorities (e.g. fire fighters).

As such, a search may be performed, targeting a data source of computing devices associated with a relevant authority (e.g. a local police force, an ambulance service), the database including the identifiers, addresses, and optionally, the location information (e.g. geolocation data, i.e. GPS coordinates) of the corresponding computing devices. The identification information of the queried computing device(s) may be received at the monitoring system, and the command to generate the alert may be sent to the addresses of the computing device(s) corresponding to the query.

Figure 14:
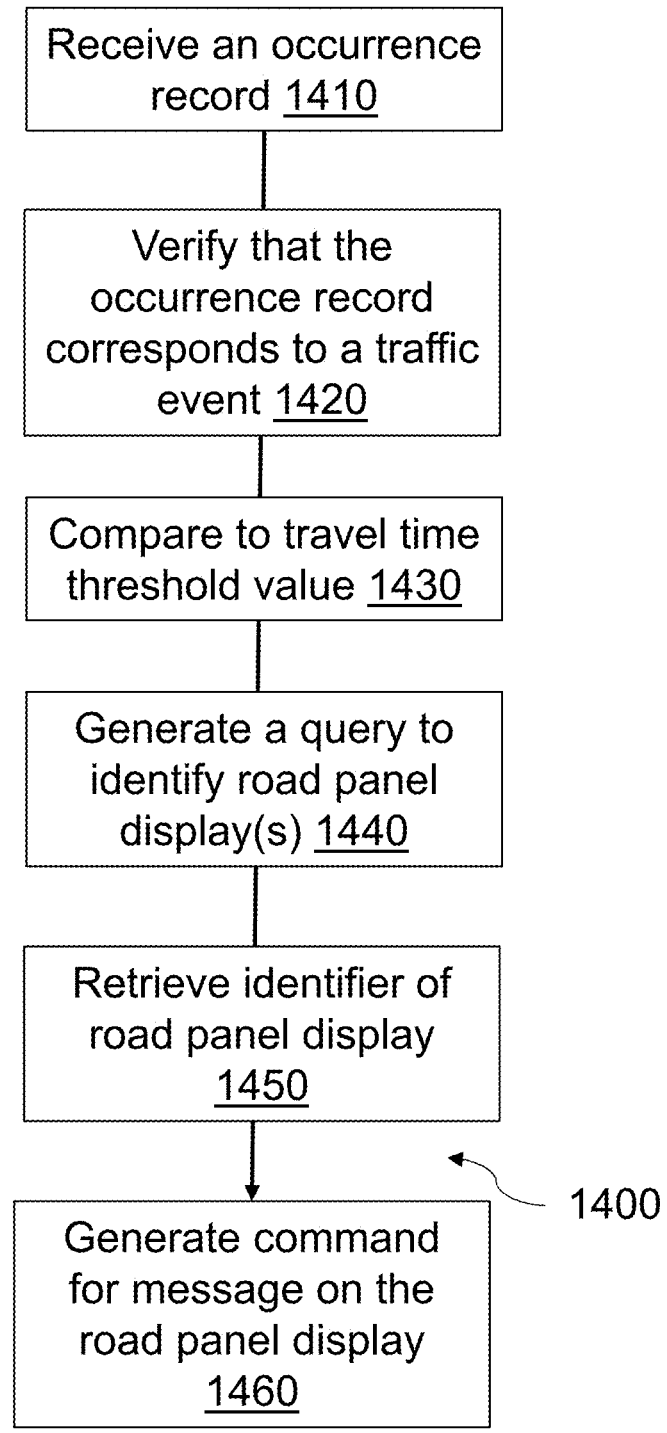
FIG. 14 is a flowchart diagram of an exemplary method of generating a notification on a road panel display indicative of a traffic state by a monitoring system.

Example 10: Generating a Notification on a Road Panel Display Indicative of a Traffic State by a Monitoring System Reference is now made to FIG. 14, illustrating an exemplary method 1400 of generating a notification on a road panel display indicative of a traffic state by a monitoring system. The present method 1400 determines the presence on a target road, and then identifies a road panel display in proximity to the road on which traffic is present, and generates a message on the identified road panel display.

The road panel display may include a computer-generated display, on which the information may be changed and updated. The road panel display may include a computer (including memory and a processor).

The method 1400 may correspond to a trigger-based rule as defined herein, having as an initial condition that that occurrence record has an event type that corresponds to that of a traffic event. Therefore, method 1400 defines a series of steps leading to the execution of the trigger-based rule and corresponding to the execution of the trigger-based rule.

An occurrence record is received at step 1410 by the monitoring system. The occurrence record has an event type.

The received occurrence record is analyzed to determine if the received occurrence record satisfies the trigger condition of the trigger-based rule, that the event type of the received occurrence record corresponds to a traffic event type at step 1420. An occurrence record corresponding to a traffic event type includes information on vehicle travel time for a road, defined herein to include highways, streets or other arteries used for vehicle travel. The occurrence record corresponding to a traffic event type also includes an identifier of the road in association with which the vehicle travel time information is being provided.

The identifier of the target road may include a string of characters corresponding to a name or number of the target road. The location of the target road can be determined from the identifier of the target road. In some examples, the identifier of the target road may include coordinates of the target road.

Exemplary vehicle travel time information may include an average speed of travel on the road at a given time (e.g. in km/h; miles/h), pictures of the traffic congestion on the artery, an average time for crossing the distance of the road, a direction (e.g., to differentiate northbound from southbound on a given road), etc.

In some embodiments, the occurrence record may be received from a data source that is adapted to generate the vehicle travel time information (e.g. to calculate the travel time information) or that provides data that the monitoring system can determine the travel time information therefrom. For example, the data source(s) may be one or more Bluetooth detector device, one or more LPR devices used to detect travel time, etc.

The identifier of the target road may include the name of the road, a code associated with the identity of the road, the coordinates of the road, information to identify the target road on a virtual map, etc.

The trigger-based rule is executed and the travel time information of the received occurrence record is compared to a vehicle travel time threshold value that has been set in the trigger-based rule to verify if a condition of the trigger-based rule is satisfied at step 1430. The condition of the trigger-based rule is satisfied if the travel time information of the received occurrence record is greater than or equal to the vehicle travel time threshold value. For instance, the vehicle travel time threshold value may be a minimum speed for the target road (e.g. 50 km/h for an autoroute). The vehicle travel time threshold value may be a maximum time taken to travel a given distance on the road (e.g. 30 minutes, etc.). It will be understood that the vehicle travel time threshold value is defined in the trigger-based rule as a value that may depend on the properties of the target road (such as the jurisdiction in which the target road is located; the nature of the road, i.e. if it is a street, a highway, etc.; the presence of construction, etc.)

Upon determining that the condition of the trigger-based rule is met, a query is generated based on the trigger-based rule at step 1440. The query may be directed to a data source including information on road panel displays for a given area. The query includes a geographic range associated to the identifier of the target road for identifying one or more road panel displays in proximity to the target road. The geographic range may define a region that includes the target road. The geographic range may be set or adjusted by an operator using a computer-generated map, where the operator selects a region encompassing the target road that is the subject of the query. In some embodiments, the geographic range may be defined from the coordinates of the target road and may be defined as a corridor defining a distance from the target road, or a space neighboring the target road.

The query retrieves at least one identifier of a road panel display having a location that is contained within the geographic range of the query at step 1450, indicative that the road panel display is in proximity to the target road. The identifier of the road panel display may include an address (e.g. IP address) of the road panel display, a passcode for communicating with the road panel display, a name of code identifying the control panel display, the dimensions and properties (such as the resolution, the identity of the operating system of the computer of the control panel display, the orientation of the control panel display, etc.) The identifier of the road panel display may also include a geographic parameter (e.g. coordinates) indicative of a location of the road panel display.

Provided the query returns at least one identifier of a control panel display that meets the conditions of the query panel, the execution of the trigger-based rule results in the generating of a command to display a message on the road panel display corresponding to the identifier at step 1460.

The message may include the vehicle travel time information included in the received occurrence record at step 1410. The message may also include identification of the target road, etc.

The command to generate the message may take into account the properties of the control panel display, as provided in the identifier of the queried road panel display. For instance, the command may be tailored to interact with the operating system of the control display panel, based on the dimensions and orientation of the control panel display, the resolution of the control panel display, and to take into account other information that may be displayed on the control panel display.

Figure 15:
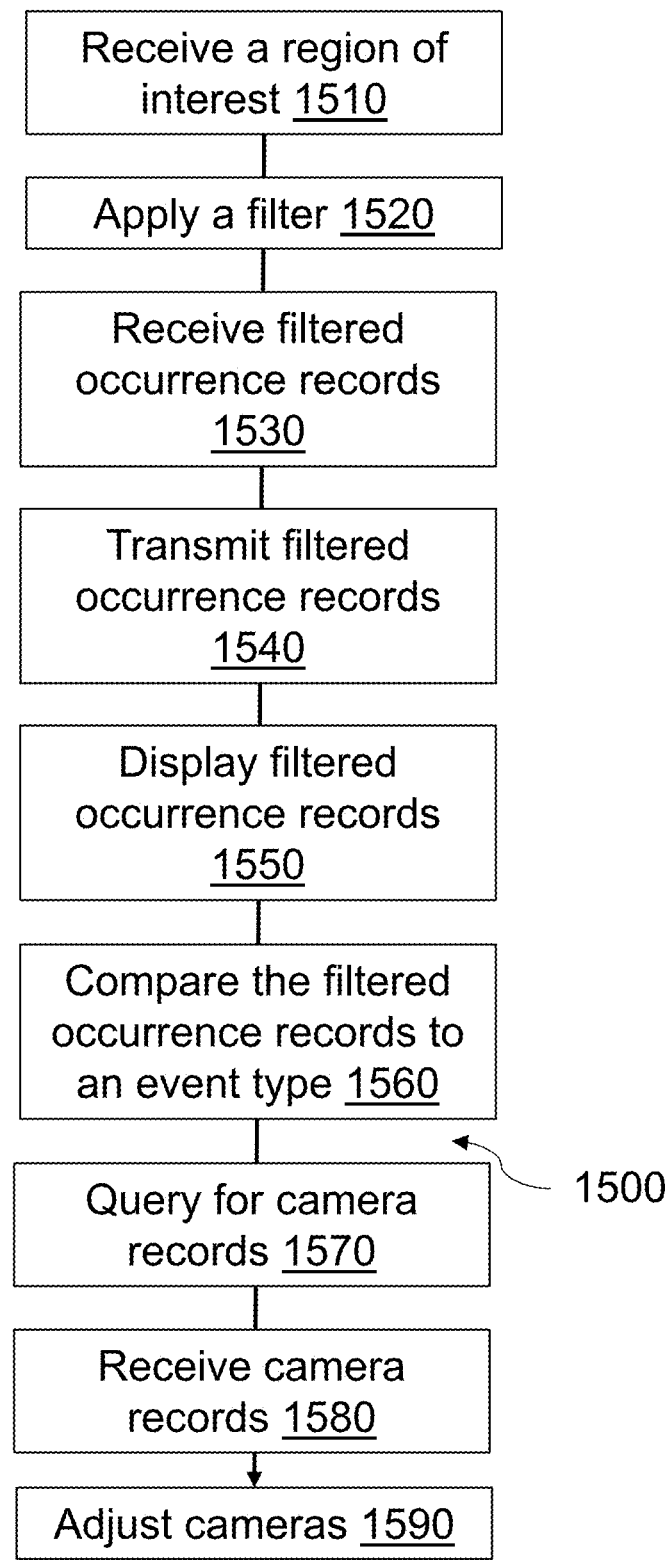
FIG. 15 is a flowchart diagram of an exemplary method of filtering occurrence records corresponding to events located in a region of interest by a monitoring system.

Example 11: Filtering Occurrence Records Corresponding to Events Located in a Region of Interest by a Monitoring System Reference is now made to FIG. 15, illustrating an exemplary method 1500 of filtering occurrence records corresponding to events located in a region of interest by a monitoring system. The filtering is advantageous when a plurality of occurrence records is being received across a region from a plurality of data sources corresponding to a plurality of different event types. As such, the quantity of information that is being received may be overwhelming for an operator, where some of the occurrence records may not be relevant for the specific task of the operator. As a result, the filtering option permits the selection and/or viewing of only specific occurrence records that are helpful for the task performed, e.g., by the operator. Moreover, the filtering also includes a region of interest to further limit the received or visible occurrence records to a specific region of interest, further narrowing the received or visible occurrence records to those that are helpful for, e.g., the operator. When the region of interest is associated to a particular event, this enables the monitoring system to home in on occurrence records that occur at or near the event. Furthermore, when the occurrence records are displayed as icons on a computer-generated map, populated in real time, applying the filter may remove occurrence records that are not relevant to the monitoring task, thereby removing occurrence records that are noise for the specific monitoring task.

A region of interest is received at step 1510. The region of interest may correspond, e.g., to a set of coordinates defining a perimeter, or to an area that has been defined on a two-dimensional map by, e.g., a selection by an operator. For example, the region of interest may correspond to one or more polygons to represent one or more areas (e.g., a park for a music concert). When the event to be monitored corresponds to a mobile event that follows a fixed route (e.g. a parade, a sporting event such as a marathon, cycling competition, a rally, etc.), the route for the event may be selected by the operator on the virtual map (e.g. displayed by the user interface module 109). A filter may be setup that is a geofence filter or region filter. The filter may identify the route that has been selected on the virtual map. The filter may define the region of interest as including the selected route, and tolerating, through a buffer parameter, a region that is on both sides (i.e. adjacent) of the selected route. For instance, the tolerance for the selected route may be set to, e.g., "20 meters" in the filter, whereby the region of interest could include a region within 20 meters from either side of the selected route, resulting in the region of interest being the corridor with a width defined by the tolerance set in the filter, and following the selected route. In some examples, the path of the event may not be selected on a virtual map, where instead a start location and an end location may be entered into a trajectory plotting application program, and the resulting plotted trajectory may correspond to the route for the event that is considered for the purpose of executing the filter for the occurrence record filtering. In some examples, the occurrence records that are being filtered may be CAD call events, where the discarded occurrence records may be certain CAD calls.

Figure 24A:
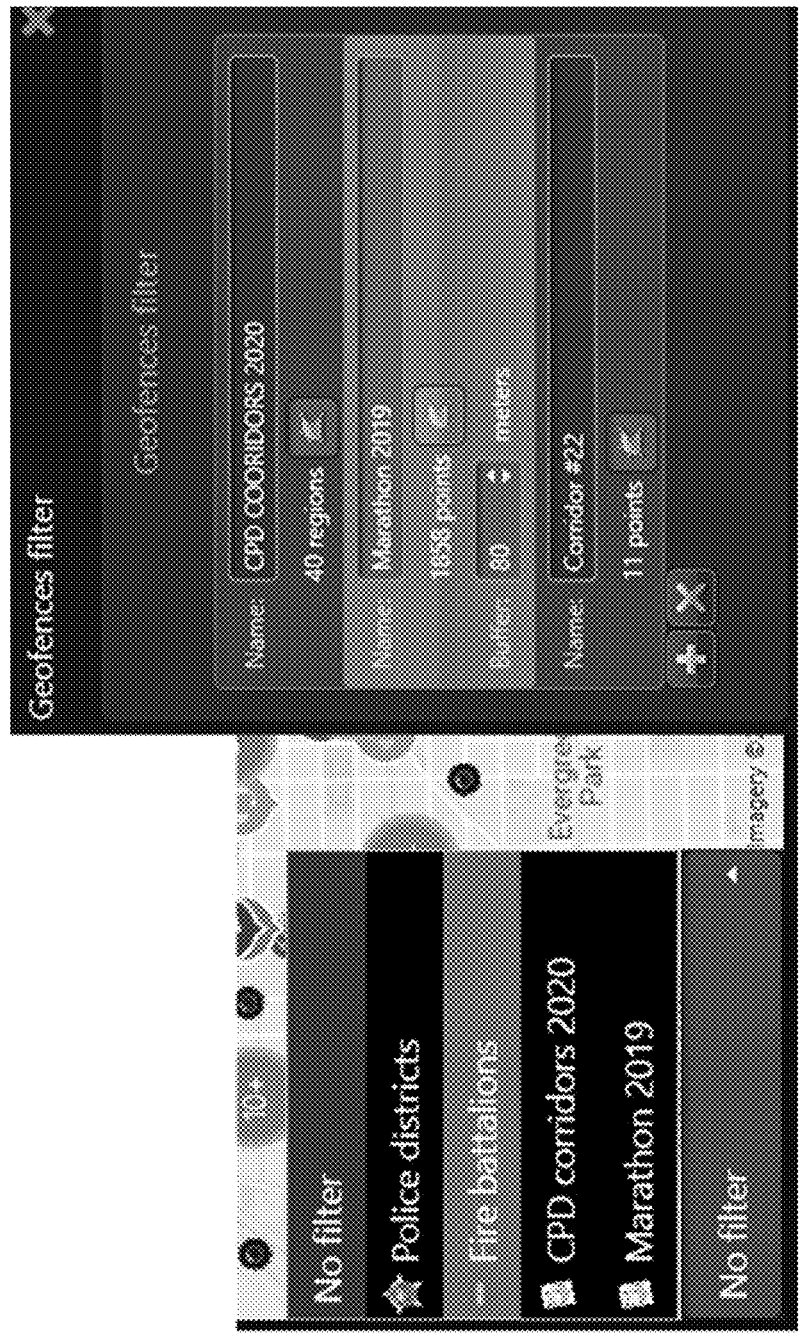
FIG. 24A is an example of a graphical user interface showing a window for setting an exemplary corridor defined from an exemplary route for filtering occurrence records corresponding to events located in a region of interest by a monitoring system.

The filter is then applied (an example of a filter is provided at FIG. 24A) that discards occurrence records that do not have a geographic parameter corresponding to a location that is contained within the region of interest at step 1520. The occurrence records have an event type and a geographic parameter. The geographic parameter may correspond to a location of a device that is the source of the occurrence record. For instance, the filter may correspond to a geofence filter or region filter.

The occurrence records that are received at step 1530 have a geographic parameter corresponding to a location that is contained within the region of interest as a result of applying the filter. As a result, the received occurrence records meet the restrictions imposed by the region of interest, thereby, e.g., facilitating the monitoring system's capacity to monitor the region of interest (and an event associated therewith) by removing the noise of the occurrence records with a geographic parameter corresponding to a location outside of the region of interest.

The filtered occurrence records may be transmitted to a command center computing device setup for monitoring the region of interest at step 1540 (e.g. a surveillance service or system). For instance, the command center may be configured to monitor this region of interest, that may be distinct from other surveillance systems that may be monitoring the region or an overlapping region. The command center may be composed of one or several linked computers for the purpose of monitoring.

Figure 24B:
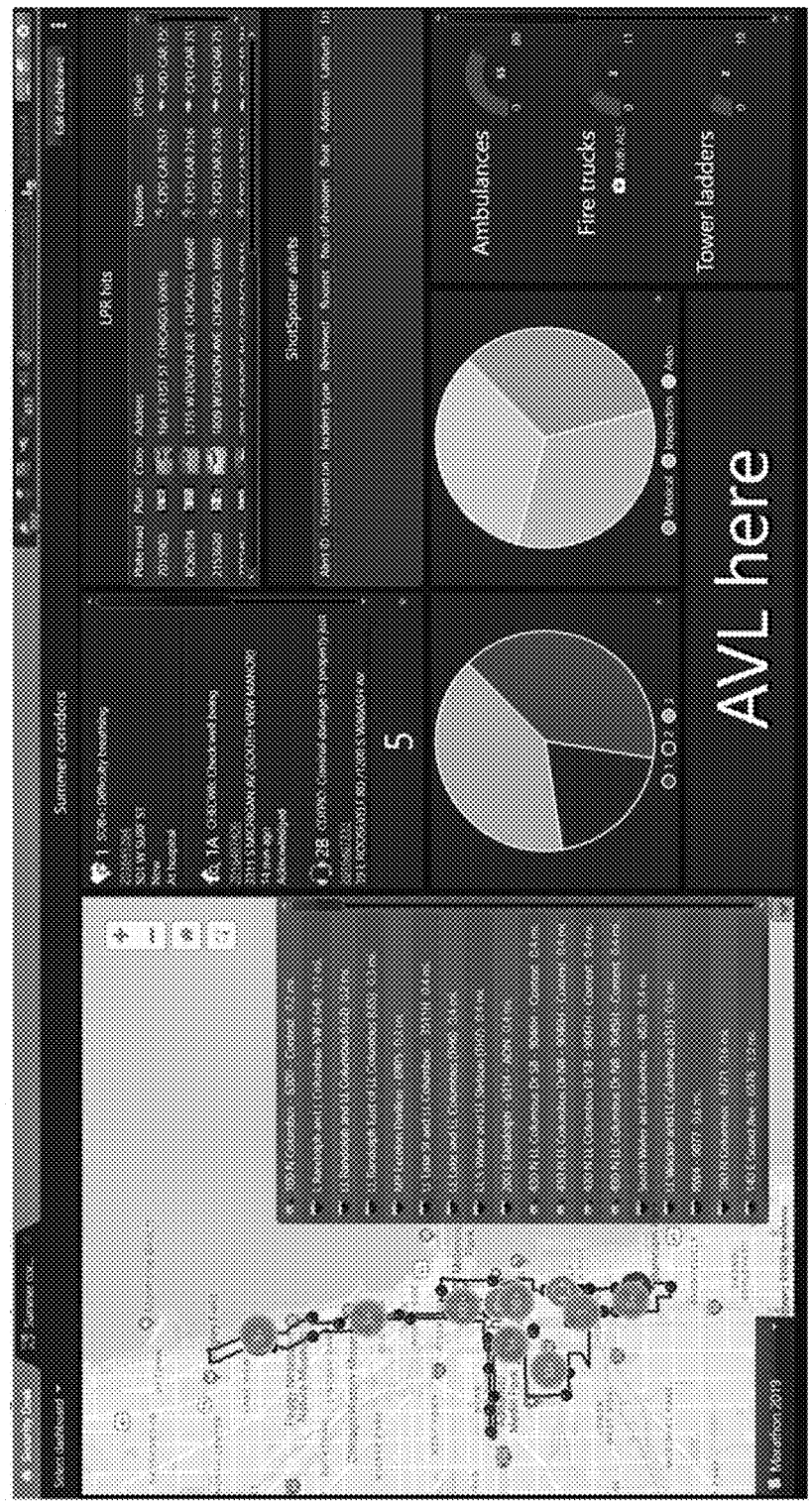
FIG. 24B is an example of a graphical user interface showing a map with the filtered occurrence records appearing as icons on the computer-generated map next to an exemplary region of interest that is in the form of a route for filtering occurrence records corresponding to events located in a region of interest by a monitoring system.
Figure 24C:
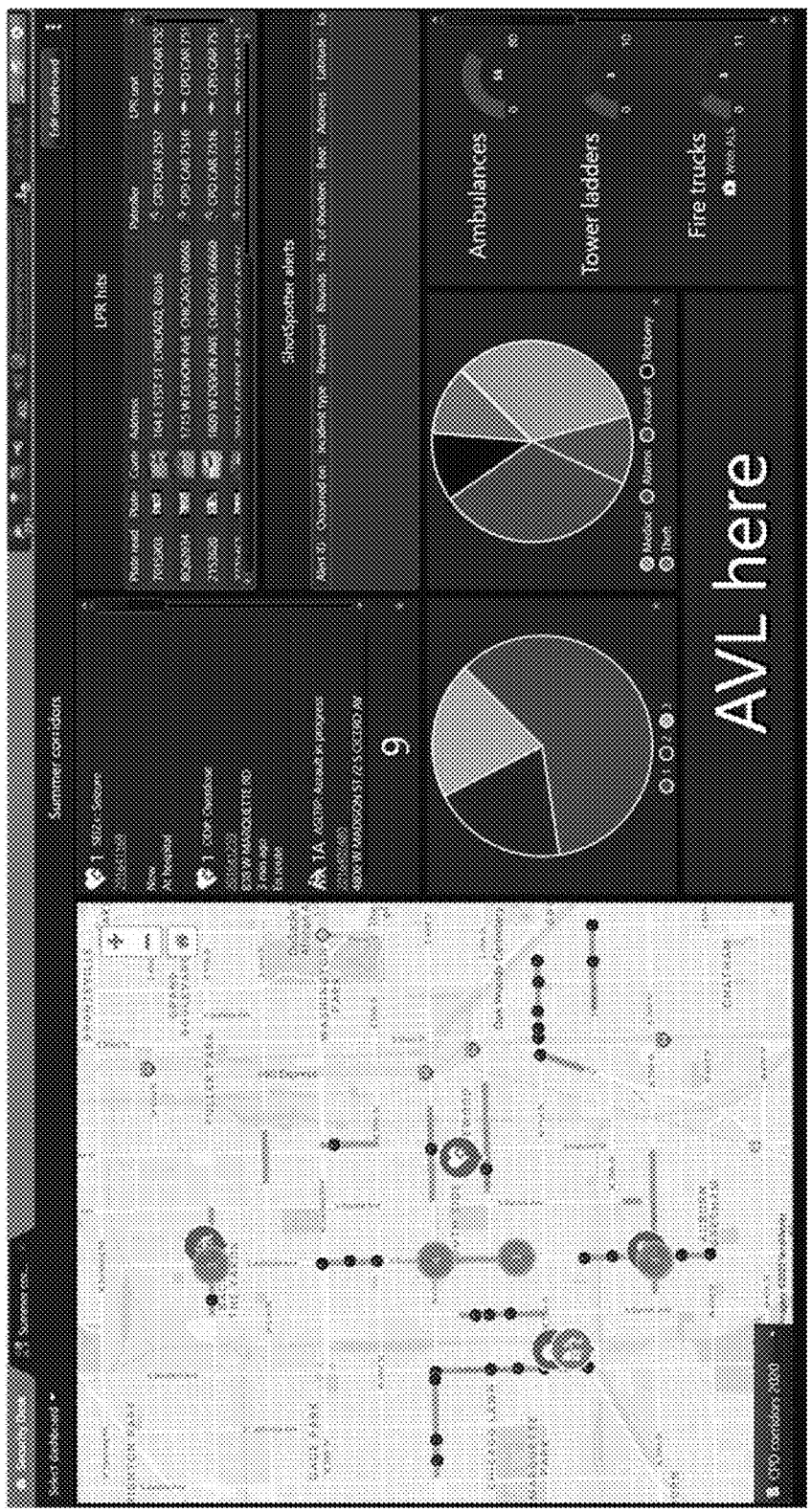
FIG. 24C is an example of a graphical user interface showing a map with exemplary filtered occurrence records appearing as icons on the computer-generated map next to an exemplary region of interest that is in the form of a route for filtering occurrence records corresponding to events located in a region of interest by a monitoring system.

The received filtered occurrence records may be displayed on a display device (e.g. display device 200) of the command center computing device setup at step 1550. The displaying of the filtered occurrence records may be provided on a computer-generated map of the geographic area. The filtered occurrence records may appear as icons on the map, where their location on the map is determined from the geographic parameter of the occurrence record, corresponding to a location that is representable on the map (examples of computer-generated maps are provided in FIGS. 24B-24C). The occurrence records that have been discarded as a result of the applying of the filtering do not appear as icons that are visible on the map. This removal of the discarded occurrence records results in the removal of visual clutter that would otherwise appear on a map that would be populated by every received occurrence record. When the region of interest is defined from a route as explained herein, then only the occurrence records with geographic parameters corresponding to a location on or next to the selected route would appear on the map. As such, surveillance of events occurring next to an event corresponding to the selected route is more effective.

In some embodiments, the filter may include a further parameter for the filtering that the received occurrence record corresponds to one or more set event types at step 1560. For instance, the additional parameter may specify that only occurrence records that, e.g., correspond to CAD call events, gunshot events, a fire event or explosion events satisfy the parameters of the filter. When the occurrence records appear on a computer-generated map as explained herein, the occurrence records appearing on the map are further limited, as only those that satisfy the event type parameter of the filter appear on the computer-generated map.

In some examples, a query may be generated based on the filter to identify cameras that are located in the region of interest at step 1570. The query is directed to a data source of camera records, where a camera record includes an identifier of the corresponding camera and a geographic parameter (e.g. GPS coordinates) corresponding to a location of the camera. The identifier of the corresponding camera may be the address (e.g. IP address) of the camera, a name or serial code for the camera, etc. The query contains a geographic constraint condition to return camera records that have a geographic parameter that satisfies the geographic constraint condition. The geographic constraint condition may be the region of interest, and/or one or more regions neighboring the region of interest (as the field of view of a camera may allow cameras further away from the region of interest to provide information on the region of interest). In some cases, a camera may not currently be recording or providing video data, and instructions can be sent to the camera or a server to instruct the recording of video data from the identified cameras.

One or more identifiers (e.g. IP addresses), enabling locating and communicating with the camera(s), for the respective camera record(s) that has/have a geographic parameter that satisfies the geographic constraint condition of the query is received at step 1580.

One or more commands may then be generated at step 1590, and transmitted to the one or more cameras corresponding to the one or more retrieved camera records, based on their respective identifiers, to adjust one or more of a pan, tilt and zoom of the camera such that the field of view of the camera is directed to the region of interest.

In some embodiments, e.g. when the event corresponding to the region of interest is over or when the requirement for more focused surveillance of the region of interest has ended, the filter applied by, e.g., the trigger-based rule, may be removed. Removal of the applied filter may be achieved by inactivating an active filter rule, by selecting an "off" option on a graphical user interface corresponding to the applied filter. The removal of the applied filter results in the return of occurrence records that would have otherwise been discarded as a result of the applied filter.

It should be appreciated that this example allows for occurrence records that are part of the filter to be ignored by a given system or command/operation center of multiple systems or command/operation centers that are not relevant to the region of interest being monitored. In some embodiments, another filter may be applied to the given system or command/operating center to further filter irrelevant events that do not pertain to the activities in the region of interest being monitored (e.g., a cat struck in a tree along a marathon path, when a marathon path is being monitored). This additional filter may be applied through a selection made by a user of an occurrence record that is to be filtered out (e.g. by selecting an icon corresponding to the occurrence record appearing on the computer-generated map that is to be filtered out).

Figure 16:
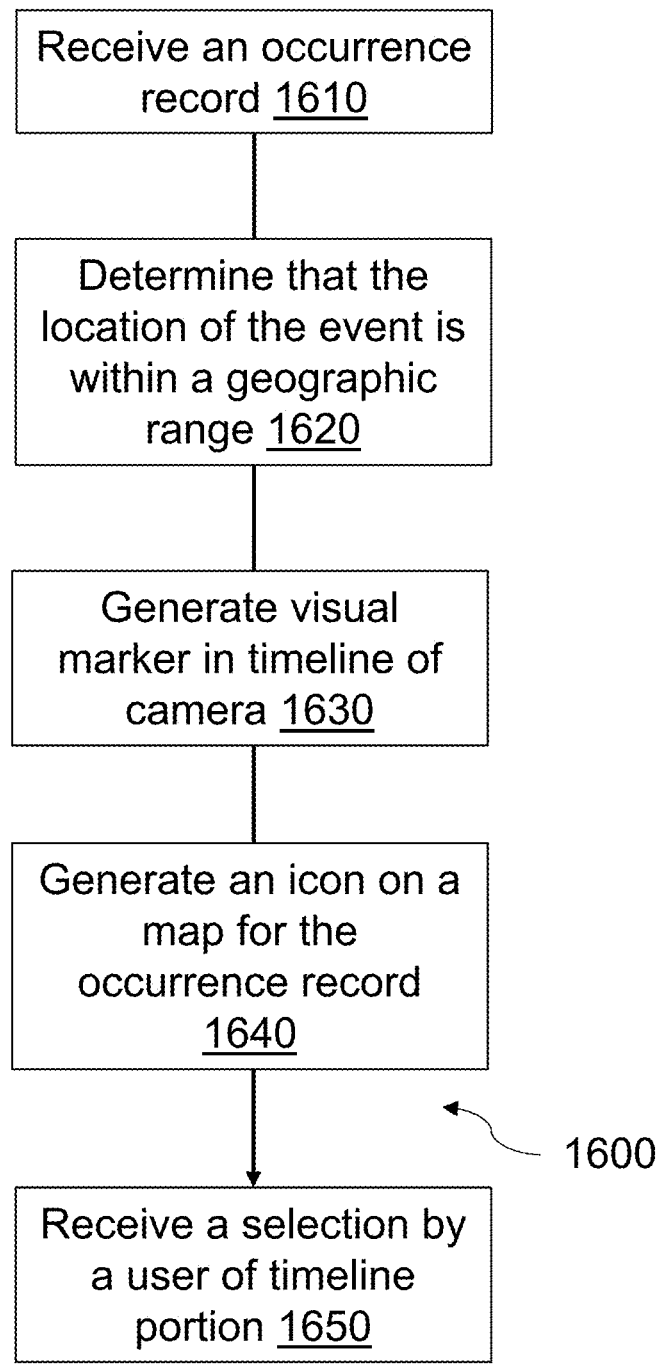
FIG. 16 is a flowchart diagram of an exemplary method of associating an event of an occurrence record to a timeline of a camera by a monitoring system.

Example 12: Associating an Event of an Occurrence Record to a Timeline of a Camera by a Monitoring System Reference is now made to FIG. 16, illustrating an exemplary method 1600 of associating an event of an occurrence record to a timeline of a camera by a monitoring system. The present method generates occurrence record information in the timeline such that an operator viewing the timeline of an image stream produced by a camera can view the occurrence record in the timeline at the time corresponding to the time parameter of the occurrence record. This provides the operator with a visual cue to review the image stream from the camera particularly around the time the occurrence record took place. Reference is made to PCT patent application No. PCT/CA2021/051514, filed on Oct. 27, 2021, incorporated herein by reference.

Figure 25A:
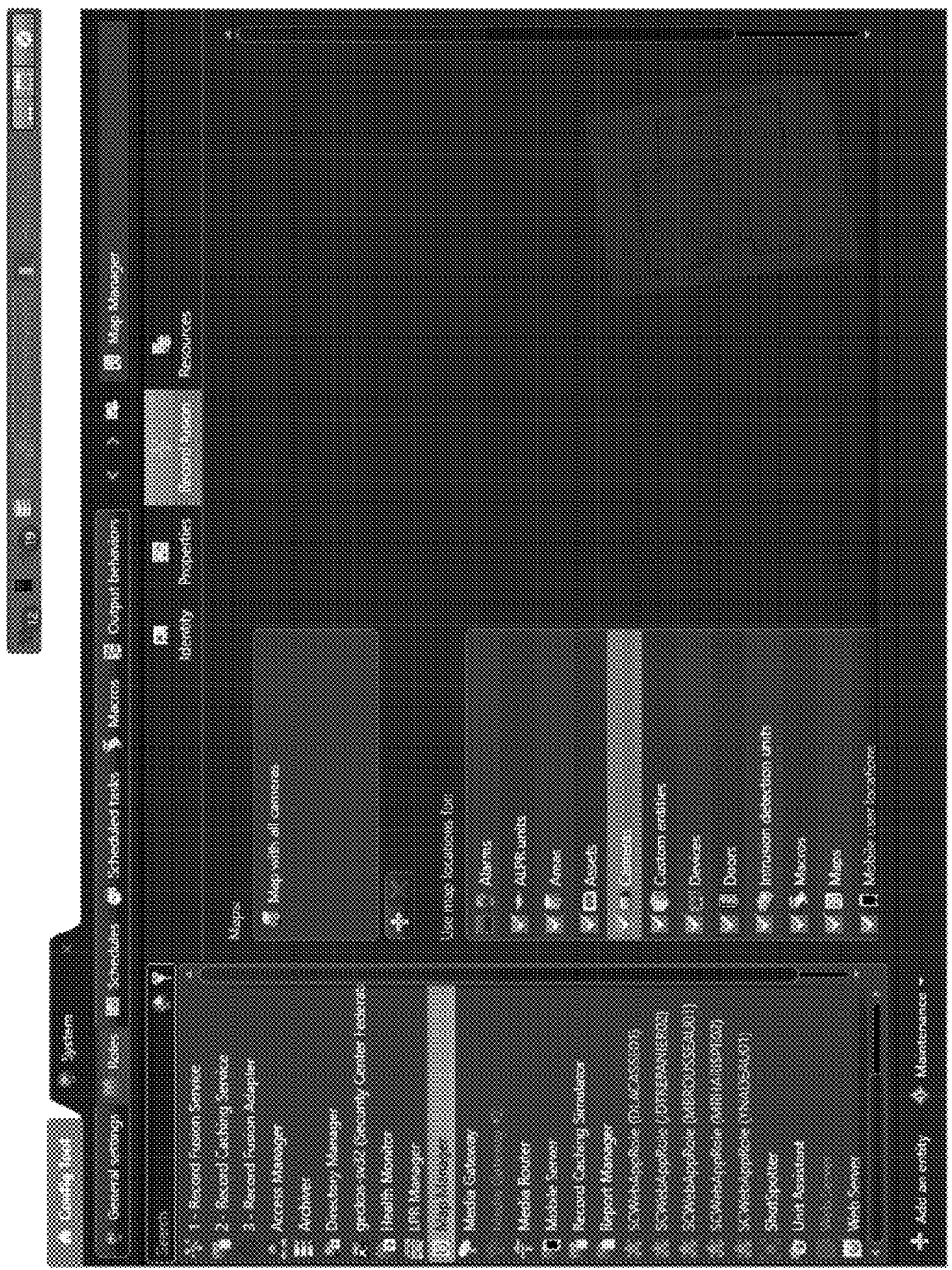
FIG. 25A is an example of a graphical user interface for selecting camera objects from objects associated with an exemplary monitoring system.

The monitoring has, or is associated to, one or more cameras that have produced or are producing an image stream. Each of the cameras has a location, e.g., defined by a series of coordinates. A map may be added as a source of correlation with one or more cameras (an example of cameras associating a map to cameras is shown in the example of FIG. 25A).

An occurrence record is received at step 1610. The occurrence record includes information on an event-type, a geographic parameter and a time parameter.

An analysis is performed of the occurrence record to determine if a location corresponding to the geographic parameter of the occurrence record falls within a geographic range that is defined from the location of the camera (e.g. a region in proximity to the camera) at step 1620. For instance, the geographic range may be defined from the location of the camera being the center of the area of the geographic range, the area having a fixed radius or diameter calculated from the location of the camera. The radius or diameter may be established from the maximum field of view of the camera, i.e. to capture events that fall within a field of view of the camera.

In some examples, the geographic range may be established from a selection made by a user of a portion of the computer-generated map, where the selection includes a location of the camera. The geographic range may be a predefined radial distance given by the user.

Figure 25B:
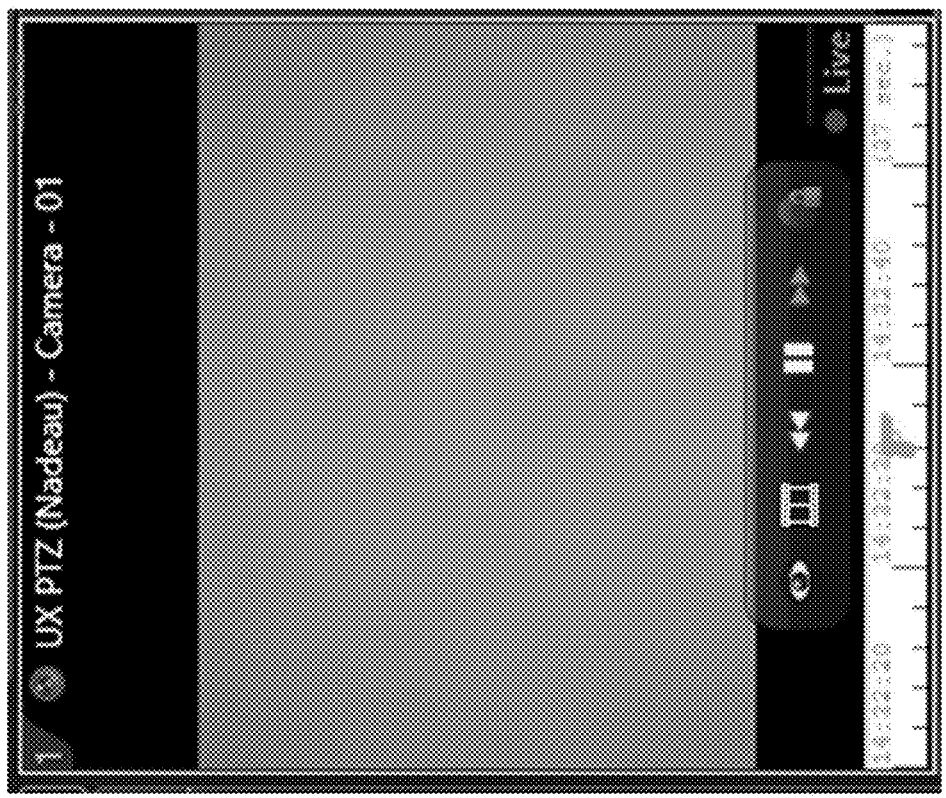
FIG. 25B is an example of a graphical user interface showing an exemplary timeline for an image stream generated by a camera with an exemplary visual marker appearing in the timeline corresponding to an occurrence record.

Upon determining that the location of the event of the occurrence record is within the geographic range, a visual marker is generated in the timeline of the camera at step 1630 (an example of a visual marker appearing in a timeline of an image stream is provided at FIG. 25B). When the image stream of the camera is played (e.g. playback), the visual marker appears as a timestamp in the timeline at the time of the event (based on the time parameter of the received occurrence record). The visual marker may alert a user viewing the image stream of the camera of the existence of the event in the image stream at the timestamp. This draws the user to a specific portion of the image stream that could provide information on the event that took place at that time, corresponding to the received occurrence record. The visual marker may be an icon that has visual characteristics representative of the event type of the received occurrence record. For instance, if the event type of the occurrence record is a gunshot event, then the icon may be of a gun. If the event type of the occurrence record is a fire event, then the icon may that of flames, or of a helmet of a firefighter.

In some examples, when the user interaction module 107 includes a computer-generated map generated on the graphical user interface, an icon corresponding to the occurrence record may also be generated on the computer-generated map at a location corresponding to the geographic parameter of the received occurrence record. The icon therefore corresponds to the received occurrence record. The appearance of the icon appearing in the computer-generated map may correspond to the appearance of the visual marker appearing in the timeline.

In some examples, the camera may also appear as an icon on the computer-generated map corresponding to the location of the camera (e.g. the coordinates defining the location of the camera) based on the geographic parameter of the camera.

In some embodiments, the user may further select a portion of the timeline of the image stream including the timestamp for the event of the correspondence record. This permits the user to isolate a portion of the video including the timestamp for the event of the correspondence record for further viewing.

Example 13: Moving a Camera Towards a Gunshot by a Monitoring System

Figure 17:
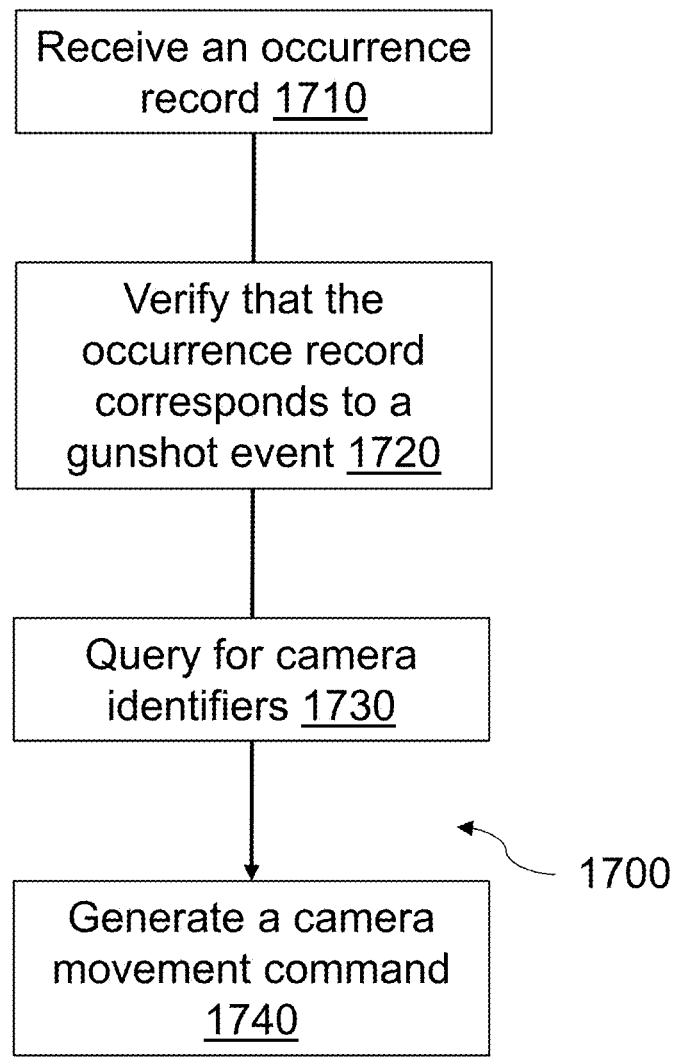
FIG. 17 is a flowchart diagram of an exemplary method of moving a camera towards a gunshot by a monitoring system.

Reference is now made to FIG. 17, illustrating an exemplary method 1700 of moving a camera towards a gunshot by a monitoring system. The present method 1700 identifies the presence of a gunshot through receipt of an occurrence record corresponding to a gunshot event, and directs a field of view of a neighboring camera to a location associated with the gunshot event based on the geographic parameter of the occurrence record.

Figure 26:
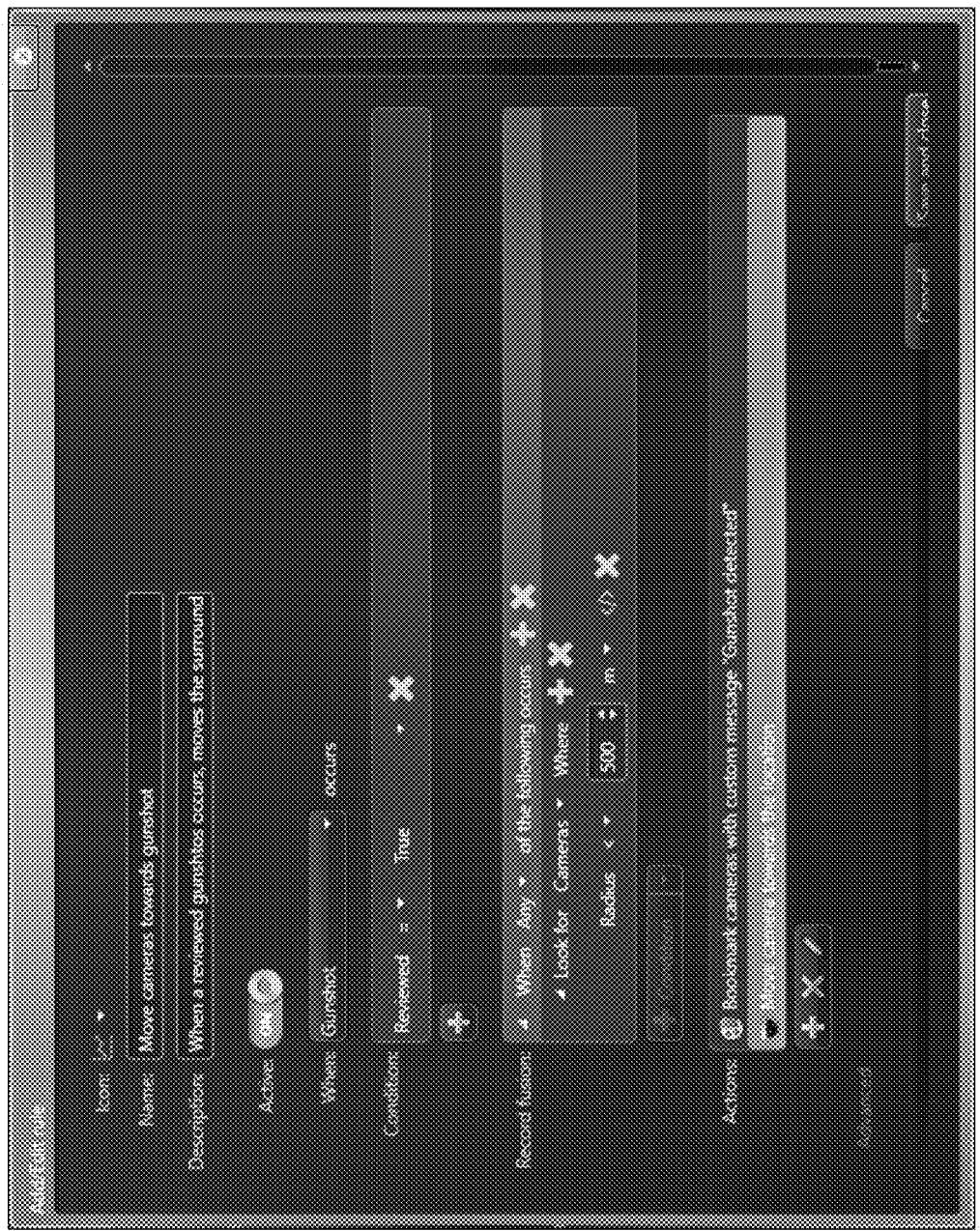
FIG. 26 is an example of a graphical user interface showing the properties of an exemplary trigger-based rule for moving a camera towards a gunshot by a monitoring system.

The method 1700 may correspond to a trigger-based rule as defined herein, having as an initial condition that that occurrence record has an event type that corresponds to that of a gunshot event (an example of a trigger-based rule is provided at FIG. 26). Therefore, method 1700 defines a series of steps leading to the execution of the trigger-based rule and corresponding to the execution of the trigger-based rule.

An occurrence record is received at step 1710 by the monitoring system. The occurrence record has an event type and a geographic parameter. The geographic parameter may correspond to the location of the device that registered the gunshot, such as a microphone-based gunshot sensor. The occurrence record may also include a time parameter (e.g. the time that the gunshot was detected). In some examples, the gunshot event may instead be associated with an occurrence record for a CAD-call event that is associated with a gunshot report (e.g. has key words in the audio file or string of characters corresponding to the call transcript associated with a gunshot, such as "gun" "shoot" "bullet", etc.)

The received occurrence record may be analyzed to determine if the received occurrence record satisfies the trigger condition of the trigger-based rule, that the event type of the received occurrence record corresponds to a gunshot event type at step 1720.

Upon determining that the trigger condition of the trigger-based rule is met, at least one query is generated according to one or more query conditions of the trigger-based rule that is not being executed. The at least one query includes a geographic range defined from the geographic parameter of the occurrence record. The geographic parameter of the occurrence record is indicative of a location of the gunshot. For instance, the geographic range may be defined from the location of the gunshot event from the geographic parameter of the received occurrence record, the location of the gunshot event being the center of the area of the geographic range, the area having a fixed radius or diameter.

In some examples, the geographic range may be established from a selection made by a user of a portion of the computer-generated map, where the selection includes a location of the gunshot event corresponding to the geographic parameter of the received occurrence record.

The query may be directed to a data source including identifiers of a plurality of cameras located in a specific region. The identifiers may include a name and/or serial code associated with the camera, an address for communicating with the camera (e.g. an IP address). Each of the location(s) of the camera(s) is compared with the geographic range of the query.

Identifiers of one or more cameras matching the query conditions are received at step 1730.

A command for camera movement is generated at step 1740, for causing the camera to adjust the field of view of the camera towards the location of the gunshot determined from the geographic parameter of the received occurrence record. The command may cause the adjustment of one or more of the zoom, pan and tilt of the camera. The command may be transmitted to the camera based on the identifier of the camera.

In this example of FIG. 17, the trigger condition is that the occurrence record corresponds to a gunshot event. However, in other embodiments, the trigger condition may be any other suitable event type. Accordingly, the method 1700 may be adapted to changed "gunshot event" to "event" depending on practical implementations. For example, the event may be a motion sensor event, an access control event, an LPR read or hit event, etc.

The examples and embodiments described herein may be modified, combined, and/or various steps or aspects of these examples and/or embodiments may be omitted where appropriate to do so.

Figure 2:
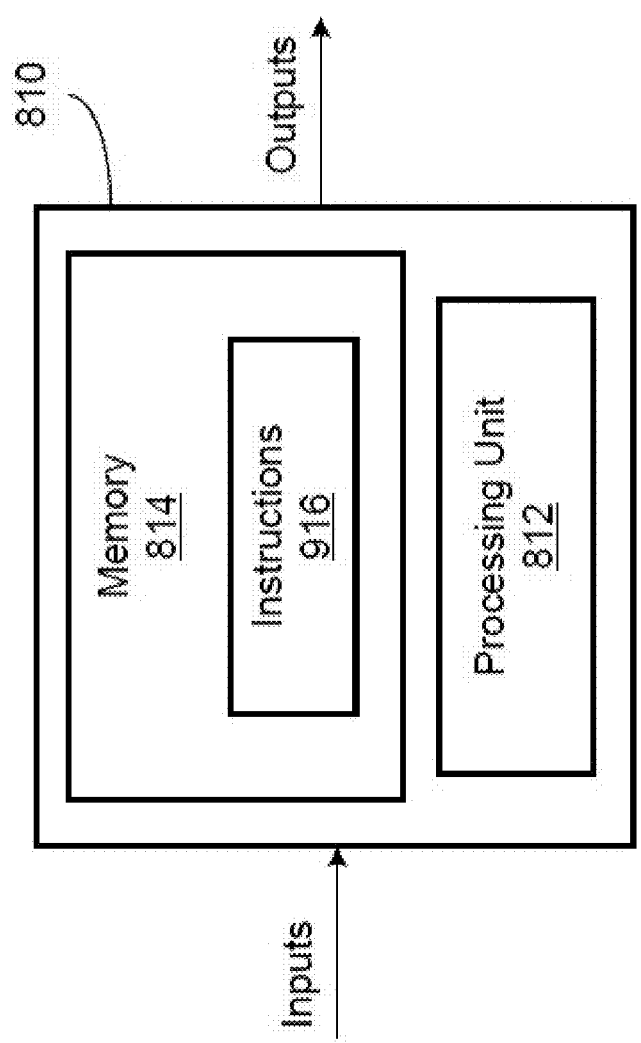
FIG. 2 is a block diagram of a computing device.

With reference to FIG. 2, the methods of the present disclosure may be implemented by one or more computing devices, such as a computing device 810 comprising a processing unit 812 and a memory 814 which has stored therein computer-executable instructions 816. Each of the system 100 and the client device 200 may each be implemented by and/or comprise at least one computing device, such as the computing device 810.

The processing unit 812 may comprise any suitable devices configured to implement the methods such that instructions 816, when executed by the computing device 200 or other as described herein to be executed. The processing unit 812 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 712 may be referred to as a "processor".

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may include any storage means (e.g., devices) suitable for retrievably storing machine-readable instructions 816 executable by processing unit 812.

The methods and systems described herein may be implemented in a high-level procedural or object-oriented programming or scripting language, or a combination thereof, to communicate with and/or assist in the operation of a computer system, for example the computing device 810. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of alerting one or more portable computing devices of a presence of a nearby target vehicle by a monitoring system, the method comprising:

receiving an occurrence record indicative of a license plate read event by a camera, the occurrence record including a geographic parameter corresponding to a location of the camera and a licence plate number of the license plate read event;

determining that the licence plate number corresponds to a target licence plate number of a plurality of target license plate numbers corresponding to a plurality of target vehicles;

searching for one or more portable computing devices that are within a pre-determined perimeter of the location of the camera and retrieving one or more identifiers corresponding to, respectively, each of one or more portable computing device that is identified within the pre-determined perimeter of the location of the camera;

transmitting a notification to each of the one or more portable computing devices corresponding to each of the one or more identifiers, the notification including the licence plate number, the notification is for alerting a recipient of the notification of a possible presence of the target vehicle in a vicinity of the recipient;

wherein the method further comprises receiving geolocation data from a plurality of mobile computing devices; and wherein searching for the one or more portable computing devices comprises identifying, from the plurality of mobile devices, the one or more computing devices within the pre-determined perimeter of the location of the camera based on the geolocation data.

2. The method as defined in claim 1, wherein each of the one or more portable computing devices are configured for running an application associated with the monitoring system; and wherein transmitting the notification to each of the one or more portable computing devices comprises transmitting the notification to each of the one or more portable computing devices through the application of each of the one or more portable computing devices.

3. The method as defined in claim 1, wherein determining that the license plate number corresponds to the target license plate number comprises comparing the occurrence record to a trigger-based rule comprising a trigger condition, wherein the trigger condition is met by the occurrence record when the occurrence record corresponds to a licence plate recognition event.

4. The method as defined in claim 3, wherein comparing the first occurrence record to the trigger-based rule comprises comparing the occurrence record to a plurality of trigger-based rules comprising the trigger-based rule, each trigger-based rule of the plurality of trigger-based rules comprising a respective trigger condition.

5. The method as defined in claim 1, wherein the licence plate number corresponds to the target licence plate number when the licence plate number is similar to the target licence plate number.

6. The method as defined in claim 1, wherein the licence plate number corresponds to the target licence plate number when the licence plate number is identical to the target licence plate number.

7. The method as defined in claim 1, wherein the perimeter corresponds to a radius from the location of the camera positioned in a center of a circle having the radius.

8. The method as defined in claim 1, wherein the perimeter corresponds to a geographic range set by an operator by defining an area on a map appearing on a graphical user interface.

9. The method as defined in claim 1, wherein the notification further comprises at least one of: a license plate image of the license plate, a context image of a vehicle with the license plate, a make of the vehicle, a model of the vehicle, a year of the vehicle, a vehicle colour and a vehicle speed.

10. The method as defined in claim 1, further comprising, prior to the receiving, analyzing an image obtained from the camera to identify the licence plate number, and generating the occurrence record.

11. The method as defined in claim 1, wherein the camera is a licence plate recognition (LPR) camera.

12. The method as defined in claim 1, wherein the one or more portable computing devices include computing devices that are integrated or attached to a patrol vehicle.

13. A computing device for alerting one or more portable computing devices of a presence of a nearby target vehicle by a monitoring system, the computing device comprising:

a processor; and memory including program code that, when executed by the processor, causes the processor to: receive an occurrence record indicative of a license plate read event by a camera, the occurrence record including a geographic parameter corresponding to a location of the camera and a licence plate number of the license plate read event;

determine that the licence plate number corresponds to a target licence plate number of a plurality of target license plate numbers corresponding to a plurality of target vehicles;

search for one or more portable computing devices that are within a pre-determined perimeter of the location of the camera and retrieving one or more identifiers corresponding to, respectively, each of the one or more portable computing devices that are identified within the pre-determined perimeter of the location of the camera;

transmit a notification to each of the one or more portable computing devices corresponding to each of the one or more identifiers, the notification including the licence plate number, the notification is for alerting a recipient of the notification of a possible presence of the target vehicle in a vicinity of the recipient; and receive geolocation data from a plurality of mobile computing devices;

wherein the program code that causes the processor to search for the one or more portable computing devices further causes the processor to, when executed by the processor, identify, from the plurality of mobile devices, the one or more computing devices within the pre-determined perimeter of the location of the camera based on the geolocation data.

14. The computing device as defined in claim 13, wherein the program code that causes the processor to determine that the license plate number corresponds to the target license plate number further causes the processor to compare the occurrence record to a trigger-based rule comprising a trigger condition, wherein the trigger condition is met by the occurrence record when the occurrence record corresponds to a license plate recognition event.

15. The computing device as defined in claim 14, wherein the program code that causes the processor to compare the first occurrence record to the trigger-based rule further causes the processor to compare the occurrence record to a plurality of trigger-based rules comprising the trigger-based rule, each trigger-based rule of the plurality of trigger-based rules comprising a respective trigger condition.

16. The computing device as defined in claim 13, wherein the licence plate number corresponds to the target licence plate when the licence plate number is similar to the target licence plate.

17. The computing device as defined in claim 13, wherein the licence plate number corresponds to the target licence plate when the licence plate number is identical to the target licence plate.

18. The computing device as defined in claim 13, wherein the perimeter corresponds to a radius from the location of the camera positioned in a center of a circle having the radius.

19. The computing device as defined in claim 13, wherein the perimeter corresponds to a geographic range set by an operator by defining an area on a map appearing on a graphical user interface.

20. The computing device as defined in claim 13, wherein the notification further comprises at least one of: a license plate image of the license plate, a context image of a vehicle with the license plate, a make of the vehicle, a model of the vehicle, a year of the vehicle, a vehicle colour and a vehicle speed.

21. The computing device as defined in claim 13, wherein the memory further includes program code that, when executed by the processor, causes the processor to, prior to the receiving, analyze an image obtained from the camera to identify the licence plate number, and generating the occurrence record.

22. The computing device as defined in claim 13, wherein the camera is a licence plate recognition (LPR) camera.

* * * * *